(12) United States Patent
McBride et al.

(10) Patent No.: US 11,569,077 B2
(45) Date of Patent: Jan. 31, 2023

(54) COMPACT ELECTROSTATIC ION PUMP

(71) Applicant: SRI International, Menlo Park, CA (US)

(72) Inventors: Sterling Eduardo McBride, Princeton, NJ (US); Joey J. Michalchuk, Lambertville, NJ (US); Christopher E. Holland, San Jose, CA (US); Ashish Chaudhary, Safety Harbor, FL (US); Winston K. Chan, Princeton, NJ (US)

(73) Assignee: SRI INTERNATIONAL, Menlo Park, CA (US)

( * ) Notice: Subject to any disclaimer, the term of this patent is extended or adjusted under 35 U.S.C. 154(b) by 415 days.

(21) Appl. No.: 16/629,528

(22) PCT Filed: Jul. 11, 2018

(86) PCT No.: PCT/US2018/041614
§ 371 (c)(1),
(2) Date: Jan. 8, 2020

(87) PCT Pub. No.: WO2019/014330
PCT Pub. Date: Jan. 17, 2019

(65) Prior Publication Data
US 2020/0343081 A1    Oct. 29, 2020

Related U.S. Application Data

(60) Provisional application No. 62/531,270, filed on Jul. 11, 2017.

(51) Int. Cl.
*H01J 41/20* (2006.01)
*F04B 37/14* (2006.01)
(Continued)

(52) U.S. Cl.
CPC .......... *H01J 41/20* (2013.01); *B03C 3/40* (2013.01); *B03C 3/41* (2013.01); *F04B 37/02* (2013.01);
(Continued)

(58) Field of Classification Search
CPC .... H01J 41/20; H01J 41/12; H01J 1/30; H01J 1/304; H01J 9/02; H01J 41/00;
(Continued)

(56) References Cited

U.S. PATENT DOCUMENTS 3,118,077 A    1/1964    Gabor
3,244,990 A    4/1966    Herb et al.
(Continued)

FOREIGN PATENT DOCUMENTS

CN    1891851 A    1/2007
CN    101288145 A    10/2008
(Continued)

OTHER PUBLICATIONS

Hot Cathode—https://en.wikipedia.org/wiki/Hot_cathode (Year: 2016).*
(Continued)

*Primary Examiner* — Peter J Bertheaud
(74) *Attorney, Agent, or Firm* — Shumaker & Sieffert, P.A.

(57) ABSTRACT

The disclosure includes an outer electrode and an inner electrode. The outer electrode defines an inner volume and is configured to receive injected electrons through at least one aperture. The inner electrode positioned in the inner volume. The outer electrode and inner electrode are configured to confine the received electrons in orbits around the inner electrode in response to an electric potential between the outer electrode and the inner electrode. The apparatus does not include a component configured to generate an electron-confining magnetic field.

32 Claims, 58 Drawing Sheets

(51) Int. Cl.

| | | |
|---|---|---|
| *H01J 41/12* | (2006.01) | |
| *H01J 9/02* | (2006.01) | |
| *H01J 1/304* | (2006.01) | |
| *H01J 41/00* | (2006.01) | |
| *H01J 1/30* | (2006.01) | |
| *H01J 41/14* | (2006.01) | |
| *H01J 41/16* | (2006.01) | |
| *H01J 41/04* | (2006.01) | |
| *H02K 44/00* | (2006.01) | |
| *B03C 3/40* | (2006.01) | |
| *G01L 21/34* | (2006.01) | |
| *F04B 37/02* | (2006.01) | |
| *B03C 3/41* | (2006.01) | |

(52) U.S. Cl.
CPC ............. *F04B 37/14* (2013.01); *G01L 21/34* (2013.01); *H01J 1/30* (2013.01); *H01J 1/304* (2013.01); *H01J 9/02* (2013.01); *H01J 41/00* (2013.01); *H01J 41/04* (2013.01); *H01J 41/12* (2013.01); *H01J 41/14* (2013.01); *H01J 41/16* (2013.01); *H02K 44/00* (2013.01)

(58) Field of Classification Search
CPC . H01J 41/04; H01J 41/14; H01J 41/16; F04C 37/14; F04C 35/04; F04C 49/06; B03C 3/40; B03C 3/41; F04B 37/02; F04B 37/14; G01L 21/34; H02K 44/00
See application file for complete search history.

(56) References Cited

U.S. PATENT DOCUMENTS

| | | | |
|---|---|---|---|
| 3,339,106 A | 8/1967 | Readhead | |
| 3,356,287 A * | 12/1967 | Winters | H01J 41/16 324/462 |
| 3,388,290 A | 6/1968 | Herb et al. | |
| 3,428,241 A * | 2/1969 | Eder | H01J 41/12 62/55.5 |
| 3,588,593 A | 6/1971 | Rabinowitz | |
| 5,324,172 A * | 6/1994 | Manini | H01J 7/18 417/51 |
| 5,424,605 A * | 6/1995 | Lovoi | H01J 31/127 313/422 |
| 5,591,061 A * | 1/1997 | Ikeda | H01J 9/027 445/6 |
| 7,400,207 B2 | 7/2008 | Lipp et al. | |
| 7,470,971 B2 | 12/2008 | McBride | |
| 7,714,283 B2 | 5/2010 | Makarov et al. | |
| 7,807,509 B2 | 10/2010 | McBride | |
| 7,955,551 B2 | 6/2011 | McBride et al. | |
| 8,080,778 B2 | 12/2011 | Mcbride | |
| 8,405,021 B2 | 3/2013 | Anderson et al. | |
| 8,415,612 B2 | 4/2013 | Mcbride et al. | |
| 2002/0148961 A1* | 10/2002 | Nakasuji | G01N 23/2251 250/311 |
| 2009/0123796 A1* | 5/2009 | Takahashi | H01M 8/0612 429/411 |
| 2010/0247333 A1 | 9/2010 | Qian et al. | |
| 2010/0270465 A1* | 10/2010 | Raptakis | H01J 49/0481 250/281 |
| 2013/0061655 A1* | 3/2013 | Schober | G04F 5/14 331/94.1 |
| 2014/0085014 A1* | 3/2014 | Schober | G04F 5/14 29/428 |
| 2015/0311048 A1 | 10/2015 | Nelson et al. | |
| 2017/0345630 A1* | 11/2017 | Raman | H01J 41/12 |

FOREIGN PATENT DOCUMENTS

| | | | |
|---|---|---|---|
| CN | 104701121 A | 6/2015 | |
| CN | 105047516 A | 11/2015 | |
| DE | 102009042417 B4 * | 11/2011 | F04B 37/14 |
| DE | 102009042417 B4 | 11/2011 | |
| GB | 1054133 A | 1/1967 | |

OTHER PUBLICATIONS

Response to Extended Search Report dated Mar. 5, 2021 from counterpart European Application No. 18831629.3, filed Sep. 28, 2021, 18 pp.

First Office Action and Search Report, and translation thereof, from counterpart Chinese Application No. 201880052444.6, dated Jun. 15, 2021, 20 pp.

Bills, D.G., "Electrostatic Getter-Ion-Pump Design," Journal of Vacuum Science and Technology, vol. 4, No. 4, 1966, 7 pp. (Applicant points out, in accordance with MPEP 609.04(a), that the year of publication, 1966, is sufficiently earlier than the effective U.S. filing date, so that the particular month of publication is not in issue.).

Douglas et al., "Orbitron Vacuum Pump," Review of Scientific Instruments, vol. 36, No. 1, Jan. 1965, 6 pp.

Feidt et al., "Conditions of electronic injection into a radial electrostatic field pump," Vacuum, vol. 22, No. 5, May 1972, 2 pp.

Fitch et al., "An orbitron-type ionization gauge with an external electron source," Vacuum, vol. 19, No. 5, Mar. 1969, 3 pp.

Mourad et al., "Orbitron Ionization Gauge," Review of Scientific Instruments, vol. 35, No. 6, Jun. 1964, 5 pp.

Nicolaescu et al., "Electron motion and confinement in the orbitip vacuum gauge II: Modeling results," Ultramicroscopy, vol. 79, Nos. 1-4, Sep. 1999, 8 pp.

Nixon et al., "(e,2e) ionization studies of the stable noble gases in a coplanar symmetric geometry," Physical Review A, vol. 87, No. 2, Feb. 2013, 11 pp.

Shi et al., "Helium-charged titanium films deposited by direct current magnetron sputtering," Thin Solid Films, vol. 479, Nos. 1-2, May 2005, 7 pp.

Tom et al., "Inert Gas Ion Pumping Using Differential Sputter Yield Cathodes," Journal of Vacuum Science Technology, vol. 6, No. 2, 1969, 4 pp. (Applicant points out, in accordance with MPEP 609.04(a), that the year of publication, 1969, is sufficiently earlier than the effective U.S. filing date, so that the particular month of publication is not in issue.).

Turner, D.J., "Electrostatic Ionization Pumps and Gauges-Criterion for Charged Particles Orbiting in a Logarithmic Field," Vacuum, vol. 14, No. 12, Dec. 1964, 2 pp.

Ehrhardt et al., "Differential cross sections of direct single electron impact ionization," Z. Phys. D—Atoms, Molecules and Clusters, vol. 1, Mar. 1986, 30 pp.

Filip et al., "Electrons motion and confinement in the orbitip vacuum gauge I: Theory," Ultramicroscopy, vol. 79, Nos. 1-4, Sep. 1999, 8 pp.

Kitching et al., "Chip-Scale Atomic Devices," Solid-State Sensors, Actuators, and Microsystems Workshop, Hilton Head Island, South Carolina, Jun. 2006, 6 pp.

Koops, H.W.P., "Proposal of a Miniaturized Orbitron Pump for MEMs Applications," Proceedings vol. 5838, Nanotechnology II, Jun. 2005, 36 pp.

Nikolopoulos et al., "Electron transparency of a Micromegas mesh," Journal of Instrumentation, vol. 6, Jun. 2011, 8 pp.

Salim et al., "Compact, microchip-based systems for practical applications of ultracold atoms," Quantum Information Process, vol. 10, No. 6, Sep. 2011, 20 pp.

Schultz, L., "Sputter ion pumps," Proceedings CERN Vacuum Technologies, 1999, 6 pp. (Applicant points out, in accordance with MPEP 609.04(a), that the year of publication, 1999, is sufficiently earlier than the effective U.S. filing date, so that the particular month of publication is not in issue.).

Communication pursuant to Rules 161(2) and 162 EPC from counterpart European Application No. 18831629.3, dated Feb. 21, 2020, 3 pp.

Response to Communication pursuant to Rules 161(2) and 162 EPC from counterpart European Application No. 18831629.3, dated Feb. 21, 2020, filed Aug. 13, 2020, 12 pp.

(56) References Cited

OTHER PUBLICATIONS

International Search Report and Written Opinion of International Application No. PCT/US2018/41614, dated Oct. 1, 2018, 11 pp.
International Preliminary Report on Patentability of International Application No. PCT/US2018/41614, dated Jan. 23, 2020, 9 pp.
Extended Search Report from counterpart European Application No. 18831629.3, dated Mar. 5, 2021, 15 pp.
Office Action from counterpart Chinese Patent Application No. 201880052444.6 dated Mar. 2, 2022, 19 pp.
Third Office Action and Search Report and translation thereof from counterpart Chinese Application No. 201880052444.6 dated Sep. 5, 2022, 27 pp.

* cited by examiner

COMPACT ELECTROSTATIC ION PUMP

GOVERNMENT RIGHTS

This invention was made with Government support under contract no. W31P4Q-15-C-0093 awarded by the United States Army Contracting Command. The Government has certain rights in this invention.

TECHNICAL FIELD

The disclosure relates to ion pump systems and, more particularly, ion pump systems for creating a vacuum.

BACKGROUND

Sputter ion pumps are vacuum pumps designed to remove ions from a gas medium using sputtering. As one example, a sputter ion pump may be fluidically coupled to a vacuum chamber. The sputter ion pump utilizes a strong electrical potential between an anode and a cathode to emit electrons from a cathode of the ion pump. The emitted electrons cause impact ionization of background gas species, which are field-accelerated by the electric potential, driving these ions into the cathode and removing the ions from the gas medium to create the vacuum. Sputter ion pumps typically use a magnetic field to confine electrons within the ion pump.

SUMMARY

In general, this disclosure describes compact ion pumps capable of creating a high vacuum with reduced magnetic interference. Example ion pumps are described that utilize an electrostatic field to confine electrons within the ion pump without using magnets or magnetic fields. In one example, an ion pump includes an inner electrode maintained at a positive electrostatic potential with an outer electrode. Electrons introduced into an inner volume of the outer electrode are confined within the inner volume by the positive electrostatic potential between the inner and outer electrodes. As the electrons orbit the inner electrode, the electrons impact and ionize gas molecules within the inner volume. The positive electrostatic potential further causes the gas ions to accelerate toward and adsorb into an inner surface of the outer electrode.

Ion pumps discussed herein may include other design and operational features directed toward improved ion pump performance. In some examples, the inner surface of the outer electrode includes features configured to reduce reemission of adsorbed gas molecules or ejection of atoms or molecules of the inner surface into the atmosphere of the ion pump, such as by shielding adsorbed gas molecules from accelerated gas ions. In some examples, the ion pump may include an aperture in the outer electrode and an electron source that are configured to introduce electrons into the inner volume at electron trajectories and electron energies that may increase an effective time of travel of the electrons and improve impact ionization of gas molecules by the electrons.

In this way, the ion pumps discussed herein may provide technical advantages for creating a high vacuum in a variety of uses and applications. For example, the ion pump may emit very low levels of magnetic interference compared to ion pumps that use magnetic fields to confine electrons, such that sensitive electronics or other sensors may be used in close proximity to the ion pump. As another example, the ion pump may confine electrons with a high time of travel, thereby using less power for a particular pumping speed. As another example, the ion pump may reduce reemission of adsorbed gas molecules or ejection of atoms or molecules of the inner surface into the atmosphere of the ion pump, thereby using less power for a particular pumping speed.

In some examples, an apparatus as described herein includes an outer electrode and an inner electrode. The outer electrode defines an inner volume and is configured to receive injected electrons through at least one aperture. The inner electrode positioned in the inner volume. The outer electrode and inner electrode are configured to confine the received electrons in orbits around the inner electrode in response to an electric potential between the outer electrode and the inner electrode. The apparatus does not include a component configured to generate an electron-confining magnetic field.

In another example, a system as described herein includes an electron source and an electrode assembly. The electron source is configured to inject electrons. The electrode assembly is coupled to the electron source. The electrode assembly includes an outer electrode and an inner electrode. The outer electrode defines an inner volume and is configured to receive injected electrons through at least one aperture. The inner electrode positioned in the inner volume. The electrode assembly is configured to electrostatically confine the electrons within an internal volume defined by the electrode assembly. The outer electrode and inner electrode are configured to electrostatically confine the received electrons in orbits around the inner electrode in response to an electric potential between the outer electrode and the inner electrode. The system does not include a component configured to generate an electron-confining magnetic field In another example, a method includes receiving, by an ion pump and from an electron source, electrons through at least one aperture. The ion pump includes an outer electrode and an inner electrode. The outer electrode defines an inner volume and is configured to receive injected electrons through the at least one aperture. The inner electrode positioned in the inner volume. The method further includes creating, by the ion pump, an electric potential between the outer electrode and the inner electrode. The electric potential is configured to confine the electrons in orbits around the inner electrode. The ion pump does not include a component configured to generate an electron-confining magnetic field The details of one or more examples are set forth in the accompanying drawings and the description below. Other features, objects, and advantages of the disclosure will be apparent from the description and drawings, and from the claims.

DETAILED DESCRIPTION

Ion pumps discussed herein may provide ultra-high vacuum (UHV) pumping in a compact design with a very low level of magnetic interference.

Figure 1:
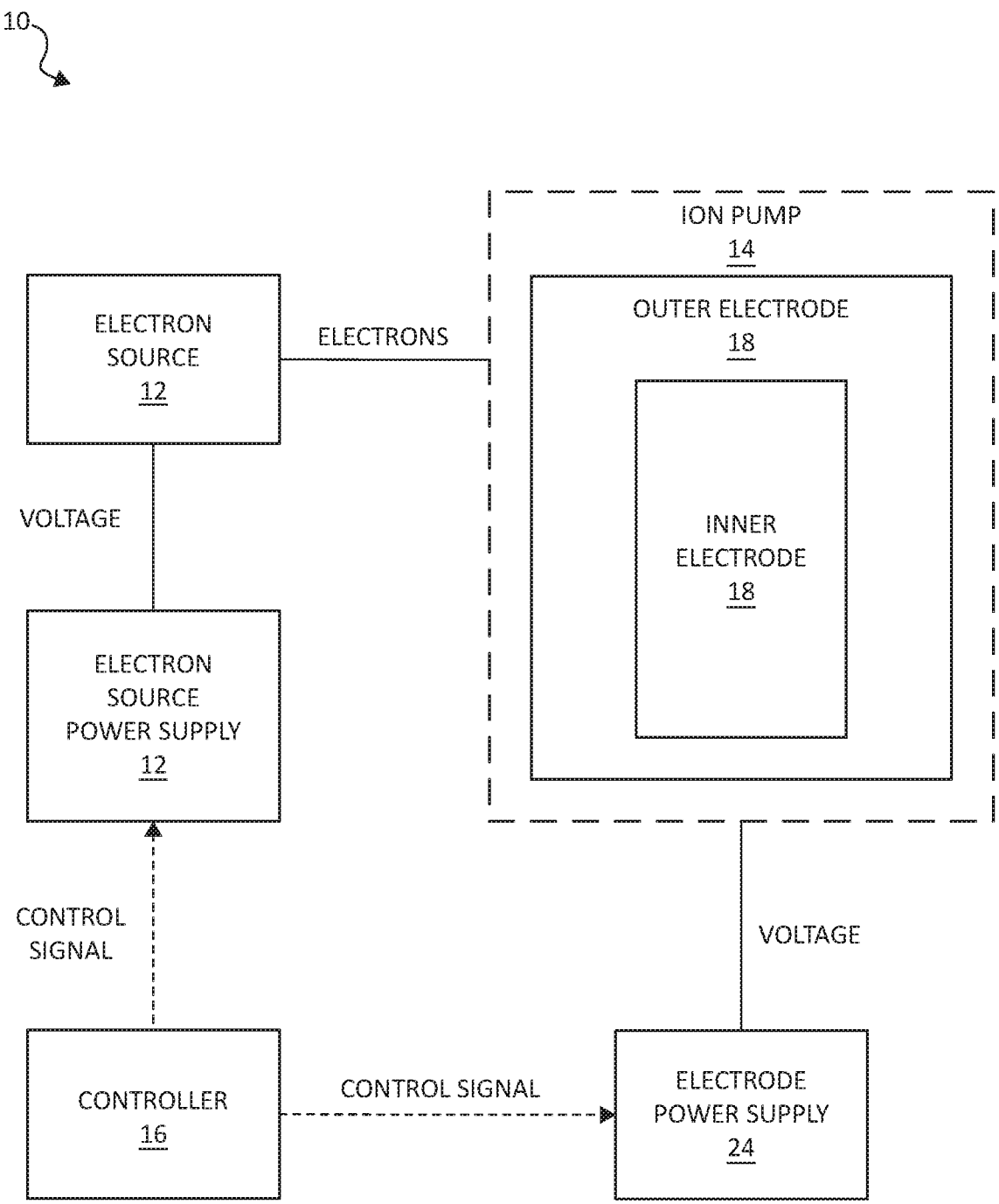
FIG. 1 is a conceptual and schematic block diagram illustrating an example ion pump system, in accordance with examples discussed herein.

FIG. 1 is a conceptual and schematic block diagram illustrating an example ion pump system 10, in accordance with examples discussed herein. Ion pump system 10 includes an electron source 12, an ion pump 14, a controller 16, an electron source power supply 22, and an electrode power supply 24; however, in other example ion pump systems, a greater or fewer number or combination of components may be used. For example, in some ion pump systems, electron source 12 may be integrally connected with ion pump 14, while in other examples, electron source power supply 22 and electrode power supply 24 may be integrated with electron source 12 and ion pump 14, respectively.

Ion pump 14 is fluidically coupled to electron source 12 and configured to receive electrons from electron source 12. For example, ion pump 14 may be configured to receive electrons through one or more apertures that define a direction of travel of injected electrons. Ion pump 14 is configured to be fluidically coupled to an environment, such as a vacuum chamber (not shown), and configured to receive gas molecules from the environment. Ion pump 14 is electrically coupled to electrode power source 24. In some examples, ion pump 14 may be communicatively coupled to controller 16 through electrode power supply 24, such that operational characteristics of ion pump 14, such as electron confinement and impact ionization, may be controlled through electrode power supply 24.

Ion pump 14 includes an inner electrode 20 and an outer electrode 18. Inner electrode 20 and, optionally, outer electrode 18 may be electrically coupled to electrode power supply 24 and configured to receive a voltage from electrode power supply 24. The received voltage from electrode power supply 24 creates an electric potential (e.g. electrostatic potential) between inner electrode 20 and outer electrode 18 within the inner volume of ion pump 14. In some examples, outer electrode 18 is grounded, such that only inner electrode 20 receives a voltage from electrode power supply 24.

Inner electrode 20 and outer electrode 18 may be generally coaxial or concentric. In some examples, outer electrode 18 defines a central axis extending from a top of outer electrode 18 to a bottom of outer electrode 18. Inner electrode 20 may be positioned at about the central axis and may extend parallel to the central axis. In some examples, an inner surface of outer electrode 18 may be generally or substantially cylindrical, barrel-shaped, egg-shaped, or spherical. In this way, inner electrode 18 and outer electrode 20 may be structured like a cylindrical capacitor.

Ion pump 14 is configured to electrostatically confine the electrons within an internal volume defined by ion pump 14 and adsorb the received gas molecules using the confined electrons. As will be described in FIG. 3 below, the positive electrostatic potential between inner electrode 20 and outer electrode 18 electrostatically confines electrons in orbits around inner electrode 20. As these electrons orbit inner electrode 20, they may impact and ionize the gas molecules. The resulting positively charged gas ions accelerate toward outer electrode 18 due to the positive electrostatic potential difference between inner electrode 20 and outer electrode 18. Upon impacting outer electrode 18, the gas ions may penetrate and embed into outer electrode 18 or cause sputtering of a getter material on outer electrode 18. The sputtered getter material may chemically react with reactive gases and/or bury inert gases. In this way, ion pump 14 may use an electrostatic potential difference to electrostatically confine electrons to cause impact ionization, accelerate the resulting gas ions to impact outer electrode 18, and remove the gas ions through ion penetration or adsorption resulting from sputtered getter material.

As an illustration, the pumping speed of ion pump 14 for an inert gas may be represented by the following equation:

$$S = N_e l_e \sigma P_S / 1000$$

In the above equation, S represents pumping speed, $N_e$ represents a number of injected electrons per second, $l_e$ represents a mean free path of electrons (cm), $\sigma$ represents an ionization cross-section (cm²), and $P_s$ represents a sticking probability of a gas ions that strike outer electrode 18. To a first order approximation, not considering external electronics, the power consumed in ion pump system 10 ($P_{pump}$) is determined by the electron beam current ($I_e$) and ion current ($I_{ion}$) such that $P_{pump}=(I_e+I_{ion})*V$, where V is the electrical potential difference between inner electrode 20 and outer electrode 18. For low pressure systems (Pressure<$10^{-9}$ torr), $I_{ion}$ is expected to be small, on the order of nanoamperes, so even with kilovolt potentials, the second term adds minimally to the system power consumption (microwatts). Therefore, the power consumption is dominated by the electron beam current required within ion pump system 10. As such, a power consumption of electron source 12 (corresponding to a number of injected electrons) for a given pumping speed may be reduced by any of increasing a path length and/or effective time of flight of electrons, increasing an ionization cross-section, and/or increasing a sticking probability of a gas ion.

Electron source 12 is configured to emit electrons. Unlike a traditional ion pump, ion pump system 10 uses externally injected electrons rather than generation of electrons from a cathode that defines part of a boundary of the pump. Electron source 12 is fluidically coupled to electrode assembly 14, such that at least a portion of the electrons emitted from electron source 12 are injected into ion pump 14. A variety of electron sources may be used including, but not limited to, cold-cathode electron beam sources, such as Spindt cathodes, micro-tips, carbon nanotubes, and chemical vapor deposition (CVD) diamond films; thermionic electron beam sources, photoelectric electron beam sources; and the like. Electron source 12 is electrically coupled to electron source power supply 22. In some examples, electron source 12 may be communicatively coupled to controller 16 through electron source power supply 22, such that characteristics of electron source 12, such as electron energy, may be controlled through electron source power supply 22.

Electron source 12 may consume a significant amount of power compared to other components of ion pump system 10, as electrons may be emitted at high energies. In some examples, electron source 12 is a Spindt cathode electron beam source. Spindt cathode electron beam sources may be energy efficient electron sources capable of operating at a wide range of temperatures. Spindt cathodes may include MEMs-fabricated cold-cathode arrays that emit electrons. For example, Spindt cathodes may include microfabricated metal field emitter tips formed on a conducting base electrode by thin-film deposition processes. Each emitter tip may have a concentric aperture in an accelerating grid electrode or gate that is insulated from the base electrode by a thin dielectric layer. Spindt cathode electron beam sources may emit electrons using a modest voltage, such as 50-100 volts, and may operate at a wide range of temperatures, such as 5-750 K. In some examples, the Spindt cathode electron beam source may include a focusing grid or electrode set configured to narrow a divergence of the electron beam, such as from 25° half-width to less than 2° half-width. Spindt cathodes may be substantially free of detrimental effects for ion pumps, such as thermal or photo-desorbed outgassing from walls or back reaction with gas species.

In some examples, electron source 12 is configured to emit electrons having a particular divergence or range of divergences. For example, as will be explained in FIG. 5, electron trajectory may influence path length and/or effective time of flight of electrons injected into ion pump 14. As such, electrons that exhibit a lower divergence may be less likely to collide with a wall of outer electrode 18 and/or inner electrode 20 or escape through an opening of ion pump 14, resulting in a higher effective time of flight. In some examples, electrons source 12 is configured to emit electrons having a divergence of less than 20°.

In some examples, electron source 12 is configured to emit electrons having a particular electron energy or range of electron energies. As will be explained in FIG. 3, ionization cross-section of a gas may be a function of electron energy, such that selection of an appropriate electron energy for a target background gas may increase an ionization cross-section and thereby increase a likelihood that an electron will ionize a gas molecule of the background gas. Electron energy may also be associated with an ability or tendency of electrons to couple into electron orbits. As such, electron source 12 may be configured to receive power, such as from electron source power supply 22, representing a particular electron energy or range of electron energies and emit electrons having the particular electron energy or range of electron energies. In some examples, electron source 12 is configured to emit electrons having electron energies between about 10 eV and about 200 eV, such as between about 70 eV and about 150 eV.

In some examples, electron source 12 is configured to emit electrons having a particular emission timing, such as a pulse, burst, or other gated emission. For example, as will be explained in FIG. 2, ion pump 14 may be configured to receive electrons during a first state and confine electrons during a second state. As such, electron source 12 may be configured to periodically receive power during the first state, thereby emitting electrons into ion pump 14, and cease to receive power during the second state, thereby ceasing emission of electrons into ion pump 14. In some examples, electron source 12 is configured to emit electrons having an injection duration of between about 10 ns and about 1 µs and an injection period of between about 1 µs and about 1 ms. The injection duration and/or injection period may be selected according to electron life time in the ion pump, where the electron life time corresponds to a number of orbits before the electrons drop for their orbits and collide with the pump electrodes.

System 10 includes a controller 16. Controller 16 is communicatively coupled to electron source power supply 22 and/or electrode power supply 24.

Controller 16 is configured to control an electrostatic potential difference between outer electrode 18 and inner electrode 20, such as through electrode power supply 24. For example, controller 16 may be configured to send electrode control signals to electrode power supply 24 that corresponds to a positive electrostatic potential between inner electrode 20 and outer electrode 18.

In some examples, controller 16 may control the electrostatic potential difference based on particular ion energies or ranges of ion energies that result from the electrostatic potential difference. For example, as explained above, a pumping speed of ion pump 14 may be increased by increasing a sticking probability of gas ions to outer electrode 18. A sticking probability of gas ions in ion pump 14 may be increased by increasing a sputtering rate of outer electrode 18, as sputtering may lead to bonding of getter material with reactive gases or burying of inert gases by getter material. The sputtering rate of a getter material may be a function of ion energy, such that selecting an electrostatic potential difference that corresponds to an ion energy associated with a higher sputtering rate may increase the pumping speed of ion pump 14. In some examples, the electrostatic potential difference is configured to produce ion energies of helium in the inner volume between about 500 eV and about 3 keV. In some examples, the ion energies are at least 1 keV. In some examples, the particular ion energies or ranges of ion energy that result from the electrostatic potential difference may be selected for a sputtering yield of the getter material, wherein the sputtering yield is the number of getter material atoms that are sputtered for each incident ion.

In some examples, controller 16 is configured to control the electrostatic potential difference based on particular electron energies or ranges of electron energies that are injected into ion pump 14. For example, for a particular electron energy, a range of electrostatic potential differences may result in an improved time of flight (e.g., an increased average path length) of the electrons having the electron energy.

In some examples, controller 16 is configured to control an electron energy of electron source 12, such as through electron source power supply 22. For example, controller 16 may be configured to send electron source control signals to electron source 12 that represent an electron energy, an injection duration, or other electron emission characteristic of electron source 12. In some examples, controller 16 is further configured to control the electron source to emit electrons having an electron energy between about 70 eV and about 150 eV.

The maximum electric charge orbiting around inner electrode 20 may be less than the maximum bound positive charges on inner electrode 20 (to reduce or substantially prevent space-charge issues from distorting the trapping potential). The bound charge on a cylindrical capacitor is given by $Q_e = 2\pi\varepsilon_0 V_0 L/\ln(R_o/R_a)$, where Vo is the potential difference between inner electrode 20 and outer electrode 18 in volts, L is the height of outer electrode 18 in meters, and Ro/Ra is the ratio of the radius of the outer and inner electrodes 18 and 20. Taking a limit of the circulating electron charge to be 2× less than the bound charge (to reduce or substantially prevent space-charge distortions of the trapping potential), an upper limit on the pumping speed can be obtained. Recasting the pump speed equation, with Ne_max=Qe/2e, the pump speed can be expressed as S=(Q$_e$/2e)v$_e$σP$_s$/1000, where e is the electric charge and ye is the electron velocity in cm/s and determined by geometric factors of the pump.

Table 1 shows the pump geometry and pumping speed for an example ion pump with an outer volume of about 30 cm$^3$ as well as for an example ion pump with an outer volume of about 1 cm$^3$, with the last column for a geometry chosen for initial SIMION® modeling to be discussed below) SIMION® is a field and particle trajectory simulator software available from Scientific Instrument Services, Inc., Ringoes, N.J.). All pumps promise a pumping speed greater than 0.01 l/s. Note that the outer pump volume assumes 1-mm thick walls; the larger pump volumes and higher pumping speed are due to an increased inner electrode surface area and pump height. Also note that the 1 cm$^3$ ion pump is calculated to consume less than 5 mW power, without the electronics, assuming an electron trajectory of about 100 meters.

TABLE 1

| Parameter | Units | 30 cm$^3$ ion pump | 1 cm$^3$ ion pump | SIMION® miniature pump model |
|---|---|---|---|---|
| Outer pump volume | cm$^3$ | 30 | 1 | 0.25 |
| Inner pump volume | cm$^3$ | 20 | 0.39 | 0.06 |
| Power, assuming 100 m electron path | mW | 100 | 5 | 3 |
| Pumping speed (helium) | l/s | 0.1 | 0.01 | 0.01 |
| Operating pressure | torr | <10$^{-9}$ | <10$^{-9}$ | <10$^{-9}$ |
| V$_{inner\ electrode}$-V$_{outer\ electrode}$ | V | 1200 | 1200 | 1200 |
| R$_a$, radius of inner electrode | mm | 1 | 0.5 | 0.05 |
| R$_o$, radius of outer electrode | mm | 15 | 5 | 2.5 |
| Pump height | mm | 25 | 5 | 3 |

This shows that the ion pump architecture described herein provides great promise in terms of desired volume and pumping speed, all without cold-atom-distorting magnetic fields. From a given pumping speed, one can obtain a bound for pump power consumption by looking at the trade between electron beam current and electron mean-free path, N$_e$l$_e$. For electron orbits of about 100 meters (104 orbits for a 1 cm$^3$ external volume pump), it can be shown that about 4 µA of electron beam current is needed to sustain the pumping speed, giving a pump power consumption of less than 5 mW, not including external electronics. This is in contrast short-path-length linear configurations, where 10's of milliamperes of beam current and 10 of watts of power are used.

Further operation of controller 16 will be described in FIG. 8.

Figure 2:
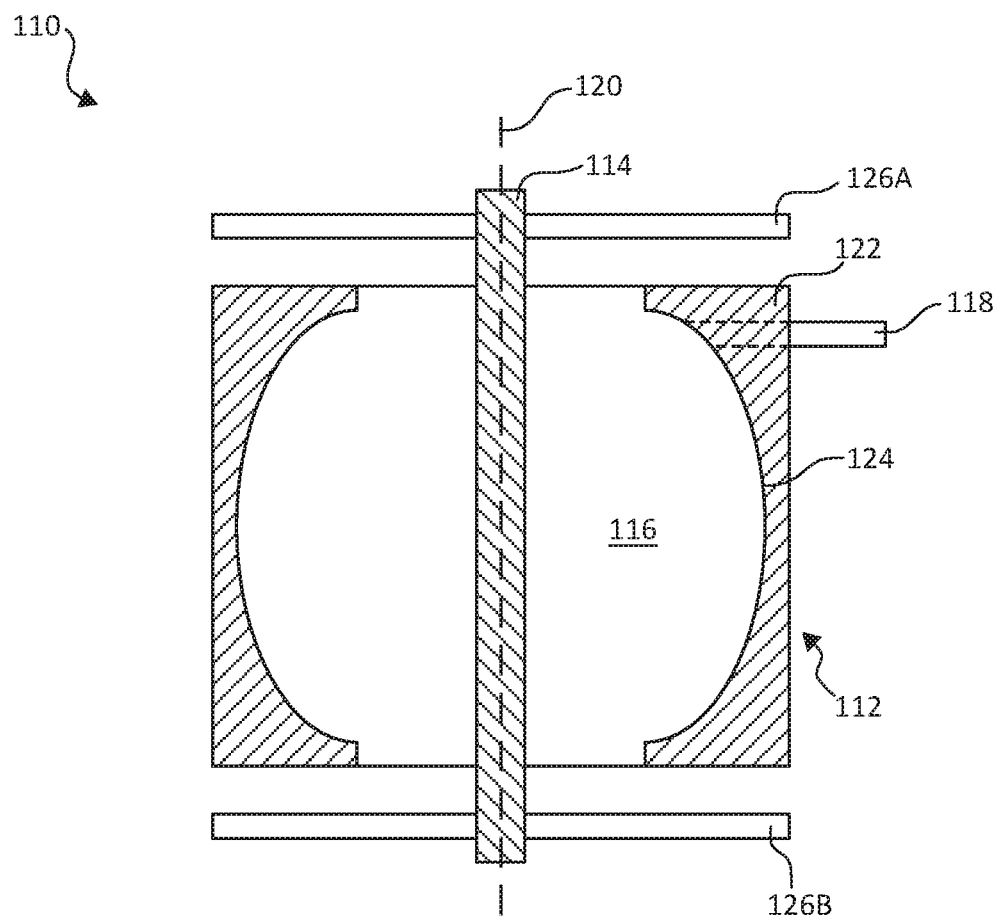
FIG. 2 is a side-view diagram illustrating an example ion pump, in accordance with examples discussed herein.

Ion pumps described herein may have various configurations and characteristics to improve a pumping operation of the ion pump, such as to improve pumping speed, reduce pumping power, or reduce a pump size. FIG. 2 is a side-view diagram illustrating an example ion pump 110, in accordance with examples described herein. Ion pump 110 includes an outer electrode 112 and an inner electrode 114. Ion pump 110, outer electrode 112, and inner electrode 114 may be operably similar to ion pump 14, outer electrode 18, and inner electrode 20 of ion pump system 10 of FIG. 1.

Outer electrode 112 and inner electrode 114 are configured to confine received electrons in orbits around inner electrode 114 in response to an electrostatic potential between outer electrode 112 and inner electrode 114. Outer electrode 112 defines an inner volume 116. Outer electrode 112 is configured to receive injected electrons through at least one aperture 118. For example, the at least one aperture 118 may include an inlet for receiving electrons, such as from electron source 12 of FIG. 1, and an outlet for discharging the received electrons into inner volume 116. Example ion pump 110 includes a single aperture 118; however, more than one aperture may be used, such as an aperture at or near a top of outer electrode 112 and an aperture at or near a bottom of outer electrode 112. Outer electrode 112 includes a wall 122 defining an inner surface 124 and the at least one aperture 118 extending through wall 122. Outer electrode 112 further defines a central axis 120 extending from a top of outer electrode 112 to a bottom of outer electrode 112. Aperture 118 defines a direction of travel of electrons around central axis 120. Inner electrode 114 is positioned in inner volume 116, such that electrons confined within inner volume 116 may orbit around inner electrode 114. In some examples, inner electrode is positioned at about central axis 120.

In some examples, aperture 118 may be configured to reduce distortions in the electrostatic potential caused by an outlet of aperture 118 into inner volume 116. For example, the outlet of aperture 118 intersects inner surface 124 and creates an area on inner surface 124 without a material of outer electrode 112. This area may locally distort the electrostatic potential and result in a changed orbit for electrons passing near the outlet of aperture 118. In some instances, the orbits of electrons passing near the outlet of aperture 118 may be diverted to such an extent that the electrons impact outer electrode 112 or inner electrode 114 and effective time of flight is reduced.

In some examples, aperture 118 may be positioned proximate at least one of the top or the bottom of outer electrode 112. For example, electron density may be lower near a top or bottom of outer electrode 112, such that the outlet of aperture 118 may distort fewer electron orbits. Features of ion pump 110 that may lower an electron density at a top or bottom of outer electrode 112 include, but are not limited to, negatively charged end caps 126, a concave inner surface 124, and other features that direct electrons away from a top or bottom of outer electrode 112.

In some examples, aperture 118 may be sized to reduce distortions caused by the outlet of aperture 118. For example, a reduced size of the outlet of aperture 118 may result in smaller distortions to electron orbits near the outlet of aperture 118 and, consequently, longer effective time of flight. In some examples, a diameter of the outlet of aperture 118 may be less than 1 mm. In some examples, the diameter of the outlet of aperture 118 may be less than 10% of a maximum diameter of inner surface 124.

In some examples, aperture 118 may be configured with a mesh over the outlet of aperture 118. As previously mentioned in FIG. 1, an electron source, such as electron source 12, may be configured to emit electrons in a pulsed or gated manner. The mesh may be electrically insulated from outer electrode 112 and coupled to a power source, such as electrode power source 22 of FIG. 1. During a pulse of electrons by the electron source, the mesh may be at a first electrical state having a positive charge, such that electrons emitted from the electron source may be accelerated toward the mesh. Once the electrons pass into inner volume 116 and the pulse of electrons stops, the mesh may be at a second electrical state having a charge that is the same as or similar to outer electrode 112 (e.g., ground), such that electron orbits are less distorted near the mesh. As such, the time of flight of electrons may be increased for a corresponding power consumption of the electron source.

In the example of FIG. 2, ion pump 110 includes a top end cap 126A proximate to the top of outer electrode 112 and a bottom end cap 126B proximate to the bottom of outer electrode 112 (collectively referred to as "end caps 126"). End caps 126 may be configured to define inner volume 116 of ion pump 110, such as by directing background gases into a top or bottom of outer electrode 112. In some examples, end caps 126 may be configured to assist in confining electrons within inner volume 116. For example, as explained above, electrons may escape out the top or bottom of outer electrode 112. As such, end caps 126 may be configured to receive a negative charge that repels electrons and directs electrons near the top or bottom of outer electrode 112 back into inner volume 116.

Confinement of electrons and acceleration of ionized gases through application of an electrostatic potential may enable ion pump 110 to have a compact size relative to ion pumps that utilize magnetic fields. In some examples, ion pump 110 has an outer volume of less than about 30 cubic centimeters. In some examples, ion pump 110 has an outer volume of less than about 1 cubic centimeter. In some examples, ion pump 110 does not include a component configured to generate an electron-confining magnetic field. For example, measurable magnetic fields generated by ion pump 110 may be limited to magnetic fields generated from circulating electrons. In some examples, ion pump 110 is configured to produce a magnetic field strength less than 1 G, such as less than 10 µG.

Outer electrode 112 includes inner surface 124 facing inner volume 116. Inner surface 124 of outer electrode 112 may have a variety of shapes. In some examples, inner surface 124 may have a generally cylindrical shape having a radial component corresponding to a general orbital plane of electrons in inner volume 116. For example, electrons may orbit around inner electrode 114 at central axis 120, such that inner surface 124 may have a radial component to accommodate the orbits of the electrons. In some examples, inner surface 124 may be cylindrical, barrel-shaped, egg-shaped, spherical, or other shape having a radial component around an axis.

In some examples, inner surface 124 may have a shape that is configured to reduce leakage of electrons out of ion pump 110. For example, end caps 126A and 126B are spaced from outer electrode 112 such that background gasses from outside ion pump 110 may enter into inner volume 116. However, these spaces may also allow electrons to escape from inner volume 116. To reduce this leakage, inner volume 124 may have a diameter of inner surface 124 at an axial middle of outer electrode 112 that is greater than a diameter of inner surface 124 at the top of outer electrode 112 and a diameter of inner surface 124 at the bottom of outer electrode 112. The smaller diameter top and bottom of outer electrode 112 may provide for a smaller area for the electrons to escape. In some examples, inner surface 124 may be curved near the top and bottom of outer electrode 124, as shown in FIG. 2. This curvature may affect a shape of the electrostatic field, directing orbiting electrons away from the respective top or bottom of outer electrode 112, thereby reducing escaped electrons.

Inner surface 124 includes a getter material configured to adsorb gas ions from inner volume 116. In some examples, wall 122 has multiple layers, and the getter material is in a layer of wall 122 at inner surface 124; in other examples, the getter material is a same material throughout wall 122. Factors used to select a getter material include, but are not limited to, sputtering yield, reactivity, and the like. A variety of getter materials may be used including, but not limited to, aluminum, titanium, hafnium, zirconium, silver, copper, tantalum, or gold.

In some examples, the getter material may be configured to adsorb gas molecules through chemisorption. In chemisorption, reactive gas molecules form chemical bonds with the getter material. The getter material may be a metal with a high reactivity, such as titanium, hafnium, or zirconium. The reactivity of the getter material may represent a high electropositivity of the getter material. In some examples, the getter material is a metal such as titanium that is chemically reactive with most gases when it is deposited on a surface as a pure metallic thin film. A variety of reactive gases may be pumped by the getter material including, but not limited to, carbon dioxide, carbon monoxide, nitrogen, water vapor, hydrogen, oxygen, and the like.

In some examples, the getter material may be configured to adsorb gas molecules through physisorption. In physisorption, inert gas molecules may be captured by the getter material, such as through burial of the gas molecule in the getter material, trapping of the gas molecule in the getter material (e.g., through sputtering and subsequent coating by the getter material), and/or diffusion of the gas molecule through a defect in the getter material (e.g., into interstitials). The getter material may be a material with a high sputtering yield, such as titanium, silver, copper, or gold. The sputtering yield of the getter material may represent a number of ejected particles of the getter material per gas ion at a particular ion energy striking the getter material at normal incidence. In some examples, the getter material has a sputtering yield of greater than about 0.01, wherein the sputtering yield represents a number of ejected particles from the getter material per helium ions at an ion energy of 0.5 keV striking the getter material at normal incidence. A variety of inert gases may be pumped by the getter material including, but not limited to, helium, argon, neon, xenon, and the like.

In some examples, ion pump 110 includes more than one type of getter material. For example, certain surfaces of ion pump 110 may be more conducive to adsorbing reactive gases, while other surfaces of ion pump 110 may be more conducive to adsorbing inert gases, such as due to ion energy of gas ions, angle of incidence of gas ions, shielding from gas ions, or the like. In some examples, inner surface 124 includes a first getter material and a second getter material. The first getter material may be more exposed to higher energy ions, and thus may have a higher reactivity than the second getter material. The second getter material may be less exposed to higher energy ions or may be exposed to ions having an ion energy more appropriate for sputtering, and thus may have a higher sputtering yield than the first getter material.

Figure 3:
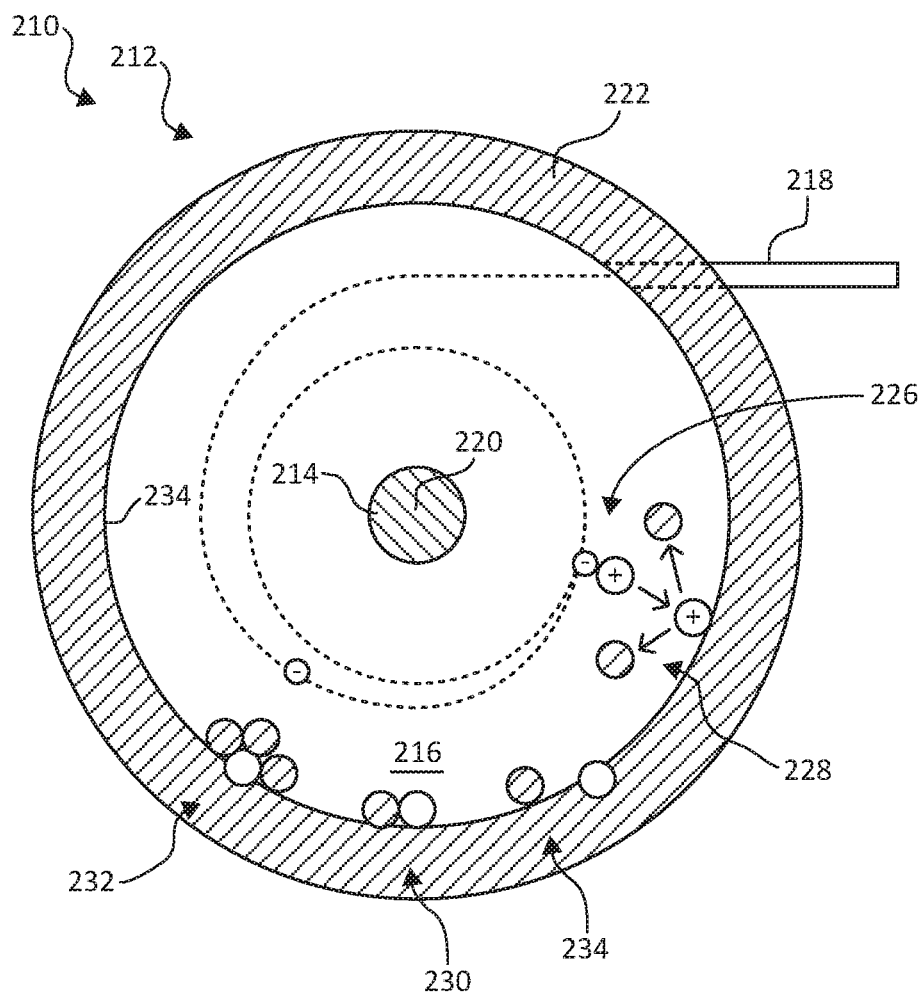
FIG. 3 is a top-view diagram illustrating pumping operation of an example ion pump using a getter material, according to examples of the disclosure.

FIG. 3 is a top-view diagram illustrating pumping operation of an example ion pump 210 using a getter material, according to examples of the disclosure. Like-named components of ion pump 210 may be operably similar to like-named components of ion pump 110 of FIG. 2, such that an outer electrode 212, an inner electrode 214, an inner volume 216 of outer electrode 212, an aperture 218 through outer electrode 212, a central axis 220 of outer electrode 212, a wall 222 of outer electrode 212, and an inner surface 224 of outer electrode 212 may correspond to outer electrode 112, inner electrode 114, inner volume 116, aperture 118, central axis 120, a wall 122, and inner surface 124 of FIG. 2.

Electrons from an electron source (not shown) are injected into inner volume 216 through aperture 218 into orbits around inner electrode 214. These electrons travel in orbits around inner electrode 214 until the electrons either collide with a component of ion pump 210 or encounter neutral gas molecules. These neutral gas molecules may include reactive gases and/or inert gases. Upon encountering the neutral gas molecules, the electrons ionize the gas molecules on impact, as shown at impact ionization event 226. The electrons may have electron energies that are selected for improved impact ionization cross-section of the gas species. For example, electron energies suitable for helium and nitrogen may in a range of about 70 eV to about 150 eV. As discussed above, the electron characteristics, such as electron energy and/or electron trajectory, may be selected to increase an effective time of flight of electrons, such that electrons are more likely to cause impact ionization with the neutral gas molecules.

Once ionized, these gas ions carry a positive charge and are accelerated toward inner surface 224 of outer electrode 212 under the influence of the electrostatic potential between inner electrode 214 and outer electrode 212. For example, the positive electrostatic potential of inner electrode 214 may accelerate the positive gas ions away from inner electrode 214. This electrostatic potential drives the gas ions into inner surface 224. Impact of a gas ion into the getter material of inner surface 224 may cause one or more processes to occur.

In some instances, such as where the gas ion has sufficient ion energy, gas ions may impact the getter material with sufficient energy to cause sputtering of fresh, reactive getter material on inner surface 224, as shown at sputtering event 228. This sputtered getter material may deposit on line-of-sight surfaces of the site of sputtering event 228, including surfaces of inner electrode 214, outer electrode 212, and other exposed surfaces that form part of a body of ion pump 210. For example, sputtered getter material may form thin film coatings on surfaces in a line of sight of the site of sputtering event 228 at a near cosine distribution of sputtered atoms. An ion energy for efficient sputtering of titanium by helium ions may in a range of about 500 eV to about 3 keV.

Ion pump 210 pumps background gas molecules through chemisorption and physisorption, as described in FIG. 2 above. In some instances, reactive gases may be pumped primarily through chemisorption of the gas molecules that form chemical bonds with the getter material, as shown at chemisorption event 230. For example, the getter material may provide a highly reactive film for bonding to the reactive gas species. In some instances, inert gases such as helium may be pumped primarily by physisorption of the gas molecules by outer electrode 312, inner electrode 214, and other internal exposed surfaces of ion pump 210. Ionized inert gas atoms may neutralize and become buried by sputtered getter material, such as through physisorption burial event 232. For example, an inert gas atom may be buried by freshly sputtered getter material. In some examples, ionized inert gas molecules may neutralize and become embedded in the getter material, such as through physisorption embedding event 234. For example, an inert gas atom may penetrate into one or more atomic layers of the getter material and embed in a lattice of the getter material.

Figure 4:
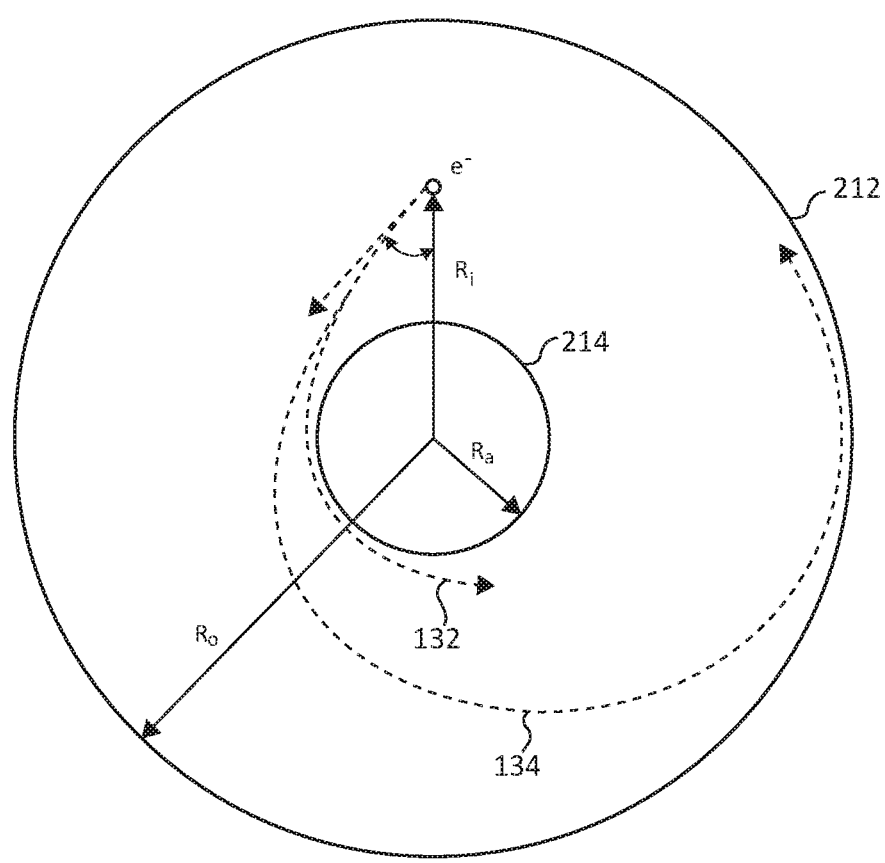
FIG. 4, which is a top-view diagram illustrating example cycling orbits of electrons with various energies within an example ion pump, according to examples of the disclosure.

In some examples, ion pump 210 may increase a pumping speed by increasing sputtering of the getter material. As described above, sputtering may be caused by the bombardment of inner surface 224 by ionized gas particles. The sputtered material deposits in all the interior surfaces of ion pump 210 that are in line of sight of the site of the sputtering event, following a near cosine spatial distribution. As such, any of an angle of bombardment, an ion In some examples, a cylindrical grid may be positioned between outer electrode 212 and inner electrode 214. The positive electrostatic potential between outer electrode 212 and inner electrode 214 may produce ion energies that vary based on a distance of ion formation from inner electrode 214, as the electrostatic potential may logarithmically decrease with a radial distance from inner electrode 214 to outer electrode 212. For example, a gas ion created by an ionization event near inner electrode 214 may have an ion energy that is significantly higher than a gas ion created by an ionization event near outer electrode 212. Such a logarithmic potential distribution between the inner electrode 214 and outer electrode 212 may be sufficient to allow for stable cycling orbits of electrons with various energy and angular momentum, without the use of magnetic fields for electron trapping. For example, as shown in FIG. 4, which is a top-view diagram illustrating example cycling orbits of electrons with various energies within an example ion pump, according to examples of the disclosure. As shown in FIG. 4, outer electrode 212 has an outer electrode radius $R_o$, inner electrode 214 defines an inner electrode radius $R_a$, and electrons are injected at an injection radius $R_i$ and an injection angle θ. A lower energy electron may have a minimum orbit 132 and a higher energy electron may have a maximum orbit 134. The minimum orbit 132 and maximum orbit 134 are defined by impact with inner electrode 214 and outer electrode 212, respectively, and thus define useful minimum and maximum electron energies for a given voltage applied to inner electrode 214, injection radius $R_i$, injection angle θ, and geometry of inner electrode 214 and outer electrode 212.

As a result, the gas ions created further from inner electrode 214 may cause a reduced amount of sputtering in the getter material of inner surface 224. To increase ion energies of the gas ions with a reduced dependence on radial distance from inner electrode 214, a positively charged grid may be positioned between outer electrode 212 and inner electrode 214 to accelerate the positively charged gas ions toward outer electrode 212. The positively charged grid may separate a region of gas ionization (i.e. between the grid and inner electrode 214) and a region of gas ion acceleration (i.e. between the grid and outer electrode 212). As such, the grid may increase ion energies for ions far from inner electrode 214 and/or have a moderating effect on ions near inner electrode 214, such as to optimize/improve sputtering yield.

In some instances, the gas ions may cause secondary electron emission upon impact with inner surface 214. These secondary electron emissions may contribute to the ionization process as ionizing electrons, in addition to injected electrons from the electron source, such as electron source 12 of FIG. 1.

Figure 5:
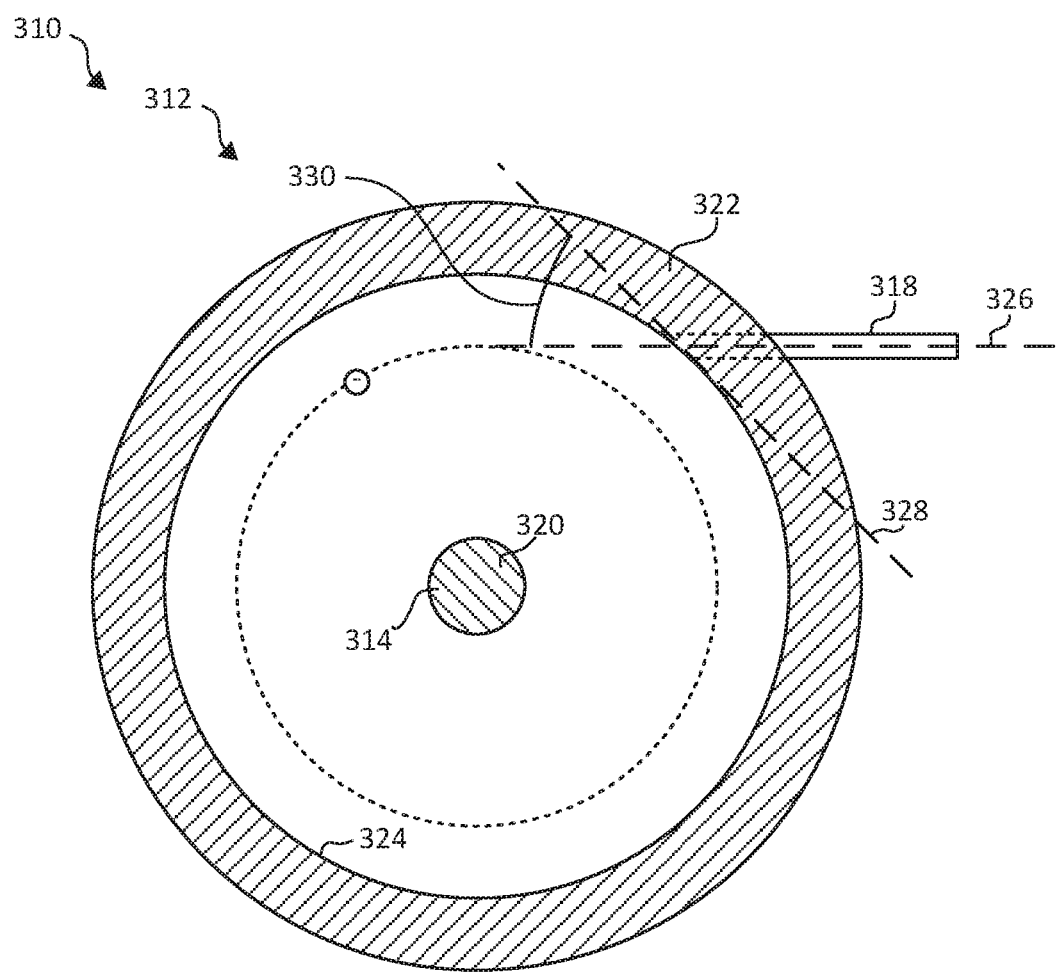
FIG. 5 is a top-view diagram illustrating electron injection angle for an ion pump, in accordance with examples described herein.

As discussed above, chemisorption and/or physisorption of background gases may occur through impact ionization of electrons with the background gas molecules. As such, ion pumps as discussed herein may increase a pumping speed through efficient electron impact ionization of gas molecules. Electron impact ionization may be increased by increasing an effective time of flight of electrons injected into an ion pump. FIG. 5 is a top-view diagram illustrating electron injection angle for an ion pump 310, in accordance with embodiments described herein. Like-named components of ion pump 310 may be operably similar to like-named components of ion pump 110 of FIG. 2, such that an outer electrode 312, an inner electrode 314, an inner volume 316 of outer electrode 312, an aperture 318 through outer electrode 312, a central axis 320 of outer electrode 312, a wall 322 of outer electrode 312, and an inner surface 324 of outer electrode 312 may correspond to outer electrode 112, inner electrode 114, inner volume 116, aperture 118, central axis 120, a wall 122, and inner surface 124 of FIG. 2.

Aperture 318 defines an aperture axis 326 extending through aperture 318. Aperture axis 326 intersects a tangent 328 of inner surface 324 at an azimuthal injection angle 330 in a radial plane and an elevation injection angle (not shown) in an axial plane, such that electrons entering inner volume 316 enter at generally the azimuthal injection angle and elevation injection angle. Azimuthal injection angle 330 and/or elevation injection angle may be selected to inject the electrons into inner volume 316 at a high electron stability. A stable orbit may be defined by certain operating parameters of ion pump 310, such as electron energy of the electrons and the electrostatic potential between outer electrode 312 and inner electrode 314. Certain azimuthal injection angles and elevation injection angles may be associated with a higher number of electrons in stable orbits. In some examples, azimuthal injection angle 330 is less than about 45 degrees. In some examples, azimuthal injection angle 330 is between about 15 degrees and about 30 degrees.

In some examples, aperture 318 may inject electrons having elliptical orbits. For example, gas molecules that are ionized near inner electrode 314 may have higher ion energies than gas molecules that are ionized further away from inner electrode 314. As such, electrons in elliptical orbits may, for at least a portion of the paths of the electrons, cause ionizations that are closer to inner electrode 314. Additionally, or alternatively, elliptical orbits may provide better fill of inner volume 316, resulting in higher ion energy distributions.

Figure 6:
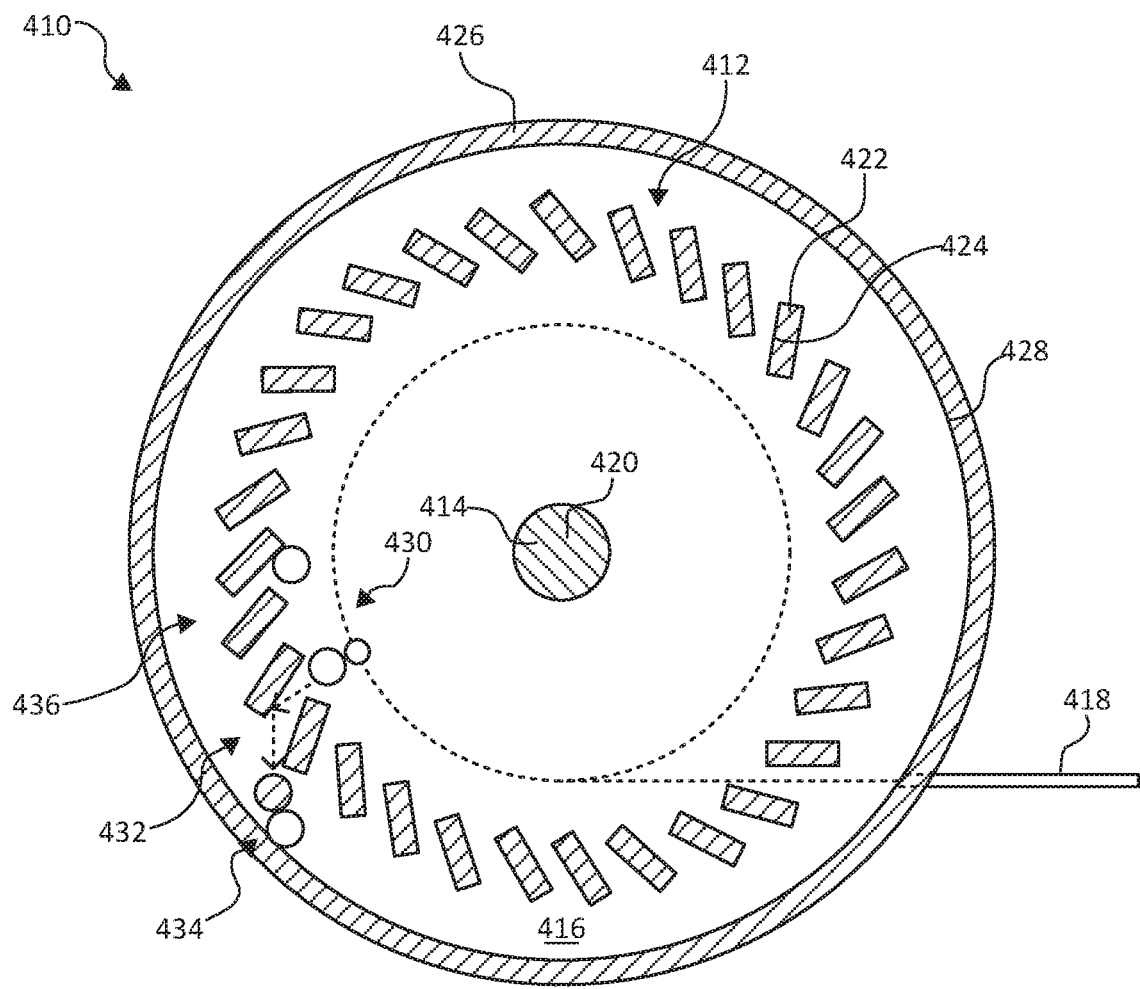
FIG. 6 is a top-view diagram illustrating an example ion pump that includes a segmented outer electrode and a pump enclosure, in accordance with examples described herein.

As discussed above, ion pumps discussed herein may accelerate gas ions toward an outer electrode to embed the gas ion and/or cause sputtering of the getter material. However, in some instances, the gas ion may eject previously buried inert gas atoms, reemitting the inert gas atoms into the gas phase. As such, ion pumps discussed herein may include a segmented and/or occluded outer electrode configured to reduce reemission of adsorbed gas atoms and increase pumping speed. FIG. 6 is a top-view diagram illustrating an example ion pump 410 that includes a segmented outer electrode 412 and a pump enclosure 426, in accordance with embodiments described herein. Unless otherwise specified, like-named components of ion pump 310 may be operably similar to like-named components of ion pump 110 of FIG. 2, such that an outer electrode 412, an inner electrode 414, an inner volume 416 of outer electrode 412, an aperture 418 through outer electrode 412, a central axis 420 of outer electrode 412, a wall 422 of outer electrode 412, and an inner surface 424 of outer electrode 412 may correspond to outer electrode 112, inner electrode 114, inner volume 116, aperture 118, central axis 120, a wall 122, and inner surface 124 of FIG. 2.

In addition to providing a getter material for adsorbing gas ions, outer electrode 412 is configured to shield adsorbed gases from impact ionization. Outer electrode 412 includes a plurality of fins 422 axially distributed around central axis 420. In the example of FIG. 6, the plurality of fins 422 are oriented substantially parallel to central axis 420; however, in other examples, the plurality of fins may have a curved, spiraling, or other shape. Each of the plurality of fins includes a fin surface 424. In addition to outer electrode 412, ion pump 410 includes an enclosure 426. Enclosure 426 includes an enclosure surface 428.

The plurality of fins 422 are configured to receive an impact of a gas ion and sputter getter material to areas of ion pump 14 that have a reduced likelihood of impact from a gas ion, such as enclosure surface 428. As illustrated in FIG. 6, an electron ionizes a gas molecule, as shown by impact ionization event 430. The resulting gas ion is accelerated toward one of the plurality of fins 422 and causes sputtering of getter material at a fin surface of the corresponding fin, as shown in sputtering event 432. The sputtered getter material is deposited within a line of sight of sputtering event 432, but outside a line of sight of impact ionization event 430. The sputtered getter material may trap an inert gas molecule, as shown in physisorption event 434, with a reduced likelihood that the inert gas molecule may be impacted by a gas ion and reemitted into inner volume 416. The sputtered surface and/or the back of the plurality of fins may include freshly sputtered getter material, which may be bond to a reactive gas molecule, as shown in chemisorption event 436. The bonded reactive gas atom may have a lower likelihood of reemission than an inert gas atom at an equivalent spot.

In addition to shielding adsorbed gas molecules from reemission, the plurality of fins 422 may be configured to increase a sputtering yield of outer electrode 412. The sputtering yield of the getter material may be a function of angle of incidence of the gas ion on fin surface 424, such that the sputtering yield may generally increase with increasing angle of incidence of the gas ions from normal. For example, the sputtering yield may increase at approximately $1/\cos \varphi$ for incidence angles less than 70° from normal of fin surface 424, where $\varphi$ is the angle of incidence of the gas ion from normal. Each of the plurality of fins 422 may be axially rotated to increase an effective angle of incidence for gas ions in inner volume 416. This increased angle of incidence may increase an amount of sputtering of the getter material and/or cause the getter material to sputter at angles that place the sputtered getter material at locations with a reduced likelihood of impact from a gas ion, such as enclosure 426.

In some examples, a number of fins of the plurality of fins 422 may be selected to improve electron travel. For example, the plurality of fins 422 may cause distortions in the electrostatic potential of outer electrode 412, such that electrons traveling near the plurality of fins 422 may have distorted orbits. A higher number of smaller fins may produce reduced distortions in orbits near outer electrode 412, such as by having smaller troughs between fins.

In such examples, fin surface 424 may include an electrode getter material and enclosure surface 428 may include an enclosure getter material, different from the electrode getter material. In some examples ions can pass through or bounce from fins 422, impacting enclosure surface 428 and producing sputtering of enclosure getter material. By applying an electrostatic potential applied between fins 422 and enclosure 426, these ions may be further accelerated, which may increase their energy and increase the sputtering of the enclosure getter material. In some examples, the electrode getter material includes at least one of titanium, hafnium, and zirconium, while the enclosure getter material includes at least one of silver, copper, and tantalum.

Figure 7:
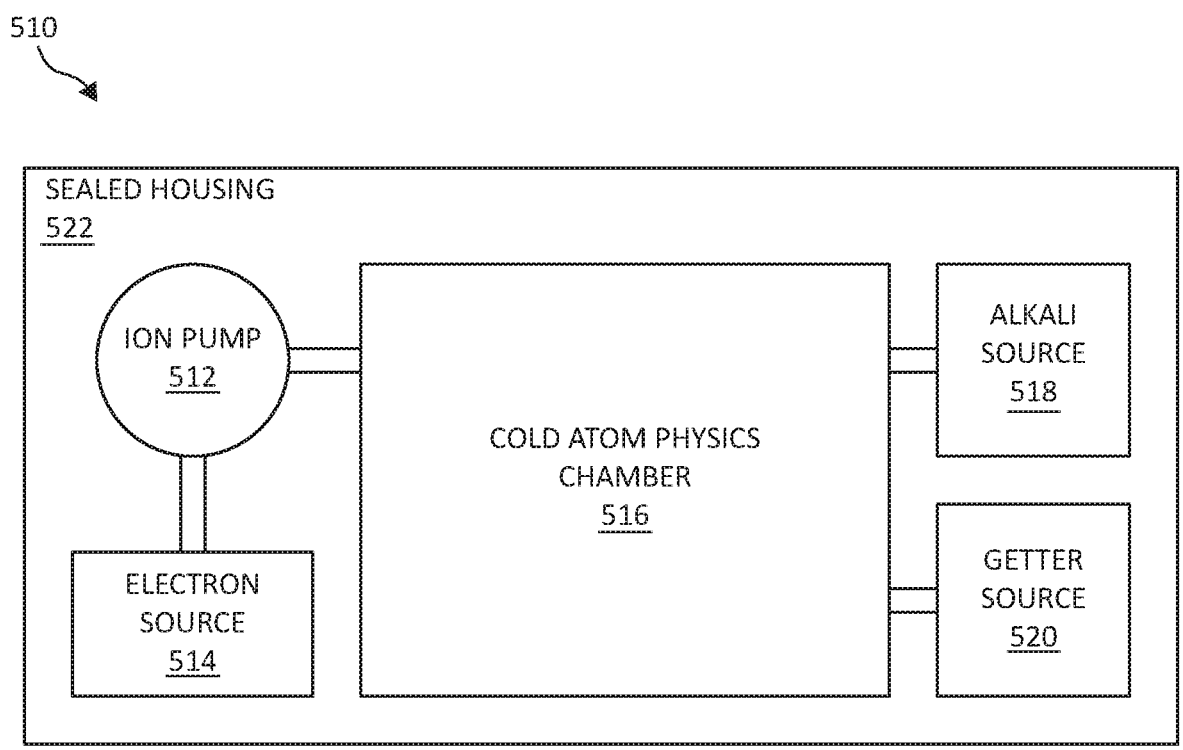
FIG. 7 is a conceptual and schematic block diagram illustrating an example cold atom sensor that uses an electrostatic ion pump, in accordance with examples described herein.

Ion pumps described herein may be used in a variety of applications, such as an atomic clock, a gyroscope, an accelerometer, a navigation unit, or an ultra-low vacuum sensor. In some examples, the ion pumps described herein may allow implementations of atomic clocks, gyroscopes, accelerometers, navigation units, or ultra-low vacuum sensors in a man-portable size and weight. In some examples, ion pumps described herein may be used in cold atom sensors. Cold atom sensors may be used in compact inertial navigation systems with global positioning system (GPS)-level precision in GPS-denied environments. For example, a cold-atom sensor may establish and maintain a physics package of the cold atom sensor at ultra-high vacuum (UHV) conditions, i.e., $P<10^{-9}$ torr, to achieve needed sensor performance. Due to permeation of helium and other gases, cold atom systems utilize active pumping of gases from the sensor volume. FIG. 7 is a conceptual and schematic block diagram illustrating an example cold atom sensor 510 that uses an electrostatic ion pump, in accordance with embodiments described herein. Cold atom sensor 510 includes an ion pump 512, an electron source 514, a physics chamber 516, an alkali source 518, and a getter 520 contained in a sealed housing 522. By using an electrostatic ion pump as described herein, sensor 510 may have a reduced volume, such as less than about 25 cubic centimeters.

Sealed housing 522 defines sensor 510 and is configured to contain components of sensor 510 in a sealed environment. For example, sealed housing 522 may be a planar, monolithic substrate with micromachined or etched cavities that are covered by glass plates to form chambers. The chambers are fluidically coupled to each other by microchannels and apertures to form an arrangement of interconnected chambers for differential pumping of a range of pressures, such as 10-7 to 10-10 torr. For example, the substrate may be a silicon substrate and the glass plate may be a Pyrex glass plate anodically bonded to the silicon substrate to form a seal configured for very low vacuum pressures. Such a sealed housing 522 may allow robust ultra-high vacuum-compatible anodic bonding, material handling, and bake-out processes that allow direct integration of sealed housing 522 with other glass/silicon cold atom vacuum cells and systems, without use of helium-impermeable glasses or ceramics. In some embodiments, glasses and ceramics may be used, such as alumino-silicate glasses, sapphire, and the like.

The chambers may house the various components of sensor 510, such as ion pump 512, cold atom physics chamber 516, and various optics associated with cold atom physics chamber 516. Cold atom physics chamber 516 is fluidically coupled to ion pump 512, such that cold atom physics chamber 516 may be at a very high vacuum. Within such a vacuum, laser-confined "cold atoms" allow precision sensing with high resolution, sensitivity, and long-life operation because the sensing elements the quantum states of the alkali-atoms are free from deleterious interactions with the ambient environment, including interactions with buffer gases, cell walls, or magnetic fields, all of which distort the sensing atomic states. In some examples, cold atom physics chamber 516 may define a volume on the order of tens of cubic centimeters, such as about 25 cm$^3$.

Sensor 510 includes various chambers that include getter materials selected to adsorb particular gases. Alkali metal source 518 is configured to dispense atoms or elements used as the sensing element in the physics chamber. Source 518 can dispense alkali metals such as rubidium, cesium, sodium; alkali earth metals such as calcium, strontium; and lanthanoids such as ytterbium. Gas getter 520 is configured to adsorb gases, including inert and reactive gasses. Getter 520 can also absorb excess alkali atoms from alkali source 518 by the proper choice of material; such materials are gold. As such, gas getter 520 may remove contaminant gases that may deteriorate the pressure of the various chambers of sensor 510.

Ion pump 512 may be similar to or substantially the same as ion pump 14, ion pump 110, ion pump 210, ion pump 310, or ion pump 410. Ion pump 512 may be relatively low size, weight, power, and cost (SWAP-C) and capable of evacuating cold atom physics chamber 516 to ultra-high vacuum (e.g., pressures of less than $10^{-9}$ ton). Ion pump 512 may directly integrate with cold atom physics chamber 516, e.g., by being formed as part of the same substrate or sealed housing 522 and does not produce magnetic fields that distorts physics being performed in cold atom physics chamber 516. In this way, ion pump 512 and sensor 510 may enable compact systems such as inertial navigation systems or the like.

In some examples, ion pump 512 may define an internal volume on the order or ones of tens of cubic centimeters (e.g., about 30 cm$^3$) and a pumping speed of helium atoms of on the order of tenths of liters per second (e.g., about 0.1l/s). Such an ion pump 512 may have relatively low power consumption, such as less than about 100 mW, assuming a mean electron path of about 100 meters. In other examples, ion pump 512 may define an internal volume on the order of less than a cubic centimeter and a pumping speed of helium atoms of on the order of hundredths or tenths of liters per second (e.g., about 0.01 l/s). Such an ion pump 512 may have relatively low power consumption, such as less than about 10 mW, assuming a mean electron path of about 100 meters.

Figure 8:
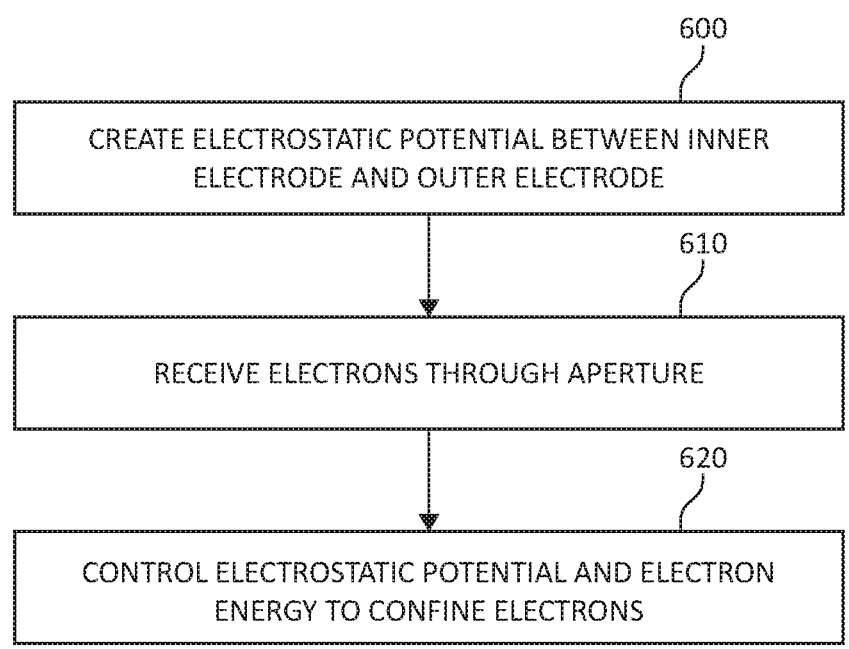
FIG. 8 is a flowchart of an example technique for removing gas molecules from a fluid medium using an electrostatic ion pump, in accordance with examples described herein.

FIG. 8 is a flowchart of an example technique for removing gas molecules from a fluid medium using an electrostatic ion pump, in accordance with embodiments discussed herein. The method of FIG. 8 will be described with reference to FIG. 1; however, other systems may be used to perform the method of FIG. 8.

The method includes creating, by ion pump 14, an electrostatic potential between outer electrode 18 and inner electrode 20 (600). For example, controller 16 may send a control signal to electrode power supply 24 to send a voltage to ion pump 14 to produce the electrostatic potential between outer electrode 18 and inner electrode 20. Controller 16 may select the electrostatic potential to produce ion energies for sputtering a getter material of outer electrode 18, such as in a range from 0.5 keV to 3 keV.

The method further includes receiving, by ion pump 14 and from electron source 12, electrons through at least one aperture of outer electrode 18 (610). For example, controller 16 may send a control signal to electron source power supply 22 to send a voltage to electron source 12 to emit electrons. In some examples, controller 16 may select electron energies to increase an ionization cross-section of the electrons in ion pump 14.

The method further includes controlling the electrostatic potential and electron energy to confine the electrons in orbits around inner electrode 20 (620). For example, controller 16 may receive, such as from an external computing device, a signal representing a desired pump speed. In response to receiving the signal, controller 16 may send control signals to any one of electron source power supply 22 and/or electrode power supply 24 to control the electron energy of the electrons, a timing of electron emission of the electrons, the electrostatic potential between outer electrode 18 and inner electrode 20 to produce the desired pump speed, and/or the timing of the electrostatic potential (e.g., pulsed operation to reduce a duty cycle).

Figure 9:
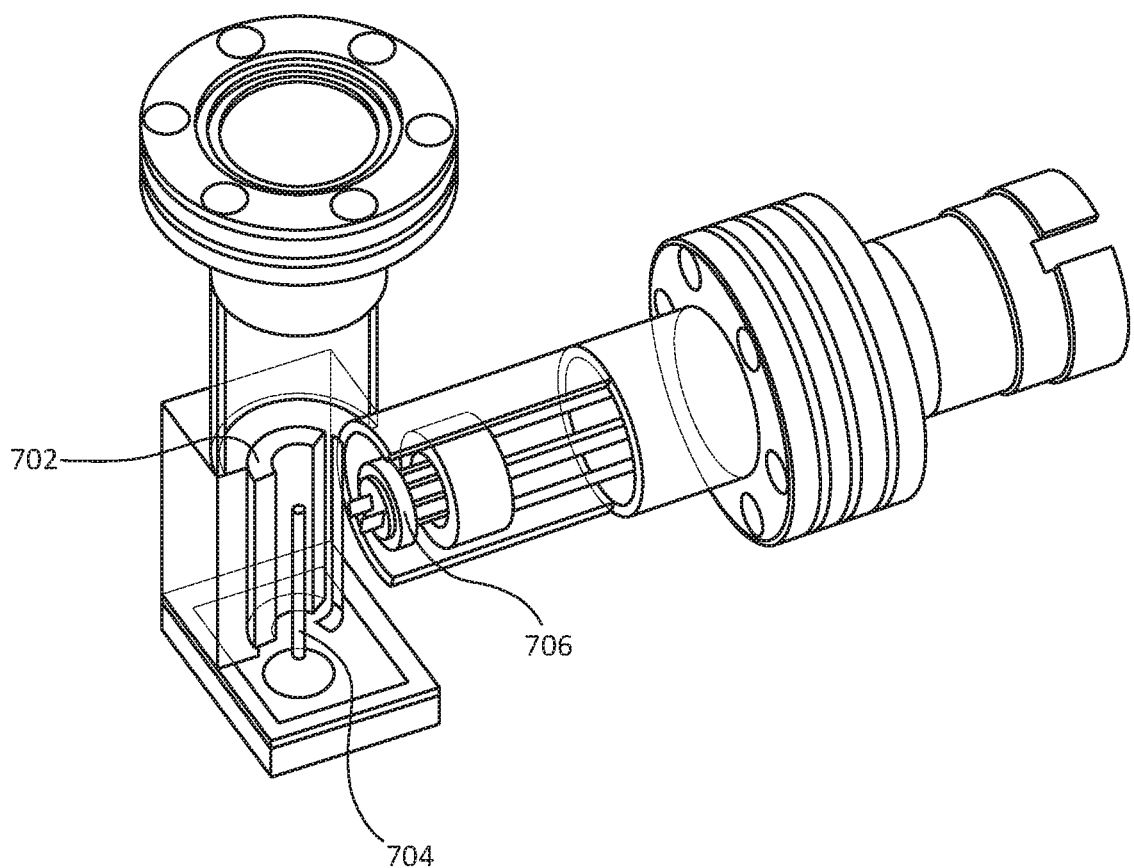
FIGS. 9 and 10 are conceptual drawings of a proof-of-concept ion pump.
Figure 10:
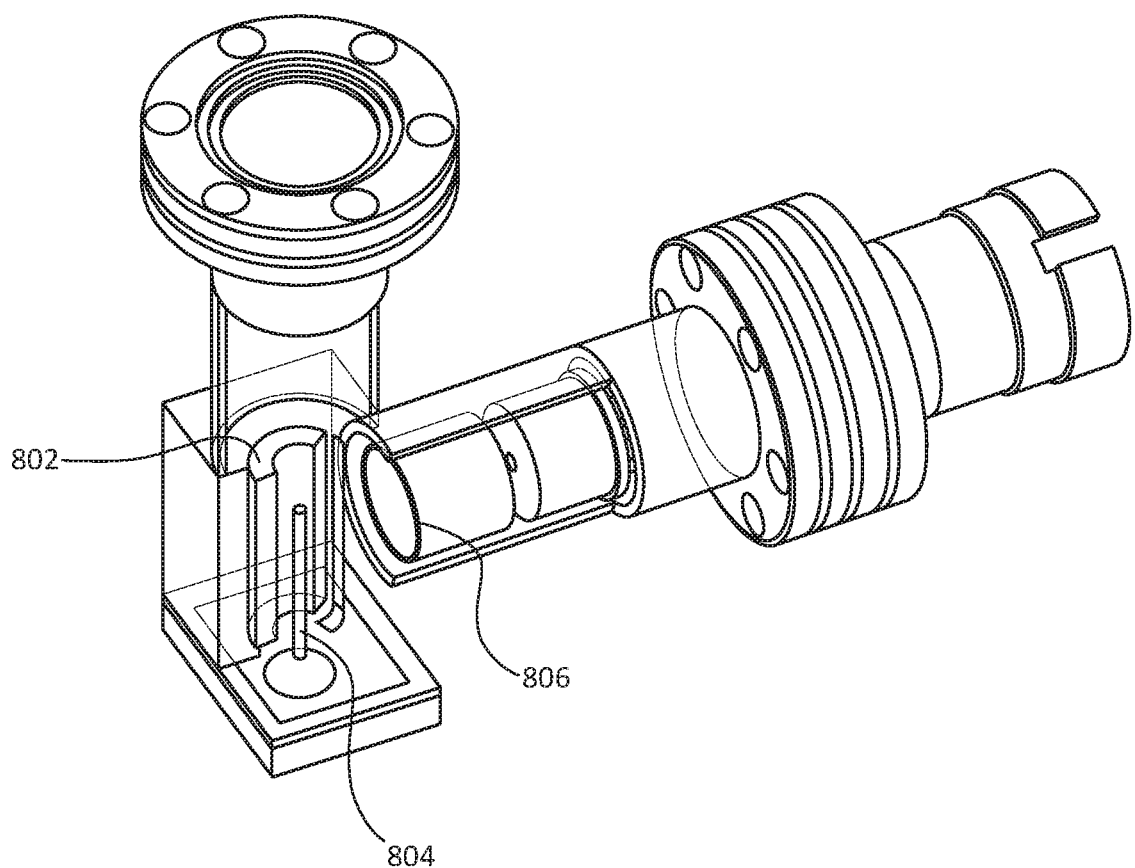

FIGS. 9 and 10 are conceptual diagrams of a proof-of-concept ion pump. FIG. 9 illustrates incorporation of a Spindt cold cathode 706 as the electron source (mounted on a TO-5 header for ease of handling) for the ion pump including outer electrode 702 and inner electrode 704. FIG. 10 illustrates incorporation of a hot filament electron source 806 for the ion pump including outer electrode 802 and inner electrode 804. The design philosophy for the proof-of-concept pump is to: 1) utilize known fabrication methods for efficient pump construction; 2) use similar materials and components, wherever possible, that would be implemented in a future miniaturization program effort, including Pyrex and silicon, further reducing risk when transitioning into a miniaturization phase; and 3) roughly match the pump volume to the existing vacuum characterization station to allow for a meaningful measurement of pumping speed. The proof-of-concept pump does not utilize helium-impermeable glasses in the development prototype but focuses on materials readily known to form high-quality ultra-high vacuum bonds.

The ion pump characterization may be made by measuring the pumping speed and background pressure by typical differential-pumping techniques using commercial ion gauges with helium and nitrogen as the sources of background gas for pumping.

SIMION® field and particle trajectory simulator software and CPO Charged Particle Optics software, both available from Scientific Instrument Services, Inc., Ringoes, N.J., may be utilized to investigate the design trade space and scaling issues, to guide the detailed geometry of the pump, and to validate pumping results. With input from SolidWorks CAD drawings, SIMION® and CPO may be used to select the proof-of-concept design based on details of the electron injection and end-cap geometries, with efficient electron injection and trapping as a guide for success. SIMION® and CPO may also be used to understand design tolerances of proof of concept, including electron injection tolerance to angle and energy distributions. SIMION® and CPO may be utilized to understand any issues when scaling to sub-$cm^3$ dimensions, including the pump tolerance to electron injection angle and energy on the trapping path length, and to understand the ion-energy distribution at the outer electrode. CPO may be used to understand the bounds posed by space-charge issues.

Table 2 below summarizes the power consumption of the ultimately envisioned magnet-free ion pump. With 40% efficiency DC-DC voltage converters, the entire UHV pump system consumes under 12.5 mW, including high-voltage electronics.

TABLE 2

| Item | Current (μA) | Voltage (V) | Power (mW) |
|---|---|---|---|
| Electron beam current cycling inside pump | 4 | 1200 | 4.8 |
| Ion current, (inside pump (P < $10^{-9}$ torr) | 0.01 | 1200 | 0.012 |
| Spindt cathode to injection aperture in outer electrode | 10 | 10 | 0.1 |
| Ion pump power consumption | | | 4.91 |
| Total power consumption, including power supplies | | | 12.5 |

Underlying the calculation of the power budget is the need for long-path-length electron trajectories to maintain pumping speed greater than about 0.01 l/s. For this case the assumption is electron trajectories of about 100 meters to meet the size, weight, power, and performance metrics. Increased path-length trajectories translate to more efficient pumping and lower power consumption. This is the reason that understanding the trade space to miniaturization is important, including modeling and analysis intended to maintain large path-length orbits against variations in injected electron energy and angle as a function of pump dimension.

The operation of the pump uses two power supplies, one for the anode and one for the Spindt cathode e-beam source. The anode uses a high-voltage power supply that for a miniature pump may be about 1.2 kV and current of about 4 μA (for a power consumption of about 5 mW). The Spindt cathode uses a power supply in the range of about 60 V to about 100 V and a power output of only about 0.1 mW.

Commercially offered high-voltage power supplies (DC-DC converters) present 40% efficient outputs. For example, targeting the Spindt cathode supply voltage, miniature power supplies are available from XP EMCO, Sutter Creek, Calif., that can be adjusted from 0 to 100 V and have an efficiency of 40% at the maximum rated power output. These are proportional DC-to-DC converters with a maximum voltage input of 5 VDC, so 3.3 VDC operation is suitable. In principle, this power supply will be able to operate at 3.3 VDC and provide a 66-V output to drive the Spindt cathode.

Figure 11:
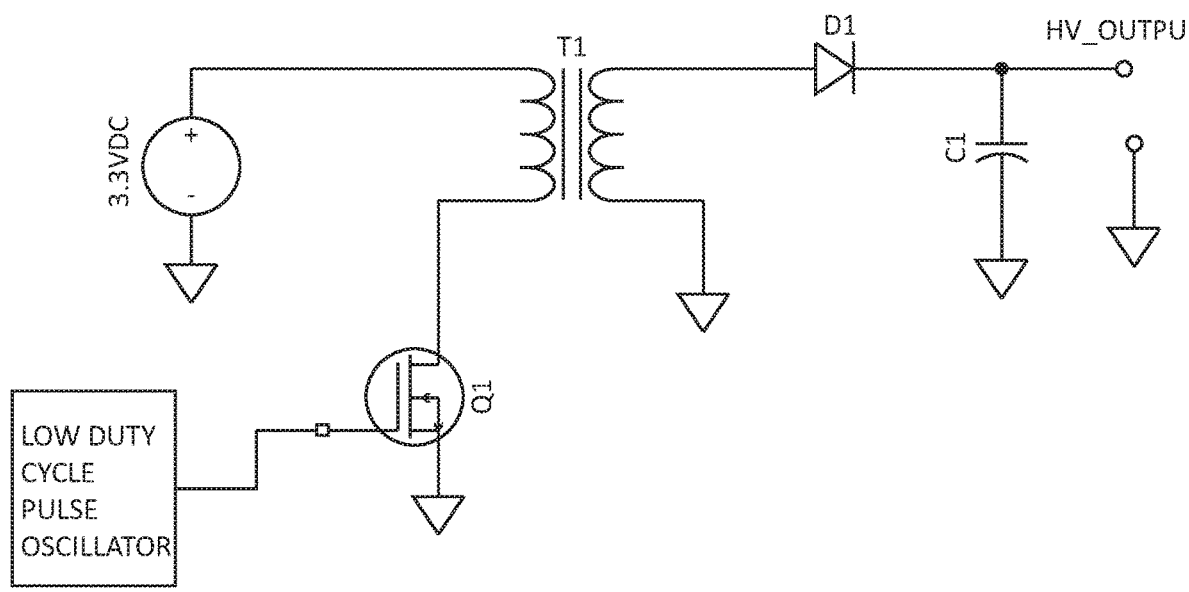
FIG. 11 is a circuit diagram of an example custom power supply with a 3.3 VDC input.

For the anode supply voltage, an example COTS miniature high-voltage power supply (DC-DC converter) is available from XP EMCO with 5 VDC input voltage, and variable output voltages from 0 V up to 2 kV and currents up to 2 μA. FIG. 11 is a circuit diagram of an example custom power supply with a 3.3 VDC input. Such a design may include a low duty cycle pulse oscillator driving a MOSFET that switches the 3.3 VDC power supply, coupled to a high-voltage transformer and a rectifier/multiplier matrix. An example of a voltage multiplier is the Cockcroft-Walton (CW) generator that produces a high DC voltage from a low AC voltage. Preliminary calculations show the potential of designing a high-voltage power supply with 1.2-kV and 4-μA output with efficiencies greater than 40% for fix output voltage. One aspect to attaining high efficiency is to switch the MOSFET at a very low duty cycle. A similar design as in FIG. 11 can be also used for the Spindt cathode e-beam power supply.

Figure 12B:
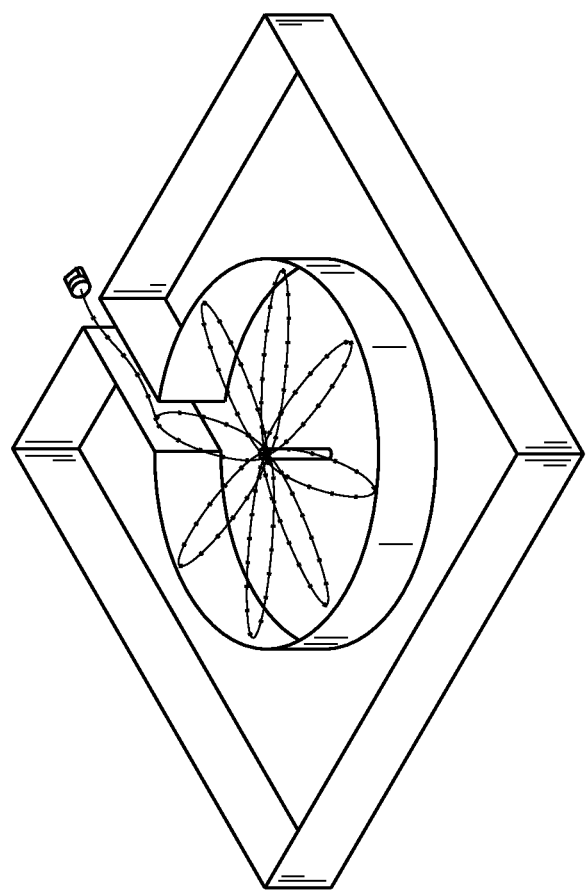
FIG. 12B is a diagram showing initial SIMION® results for an idealized simulation based on injection of electrons from an external electron-beam source within electron energy and angular momentum conditions yielding electron kinetic energy swings of 10 eV to 150 eV.
Figure 12A:
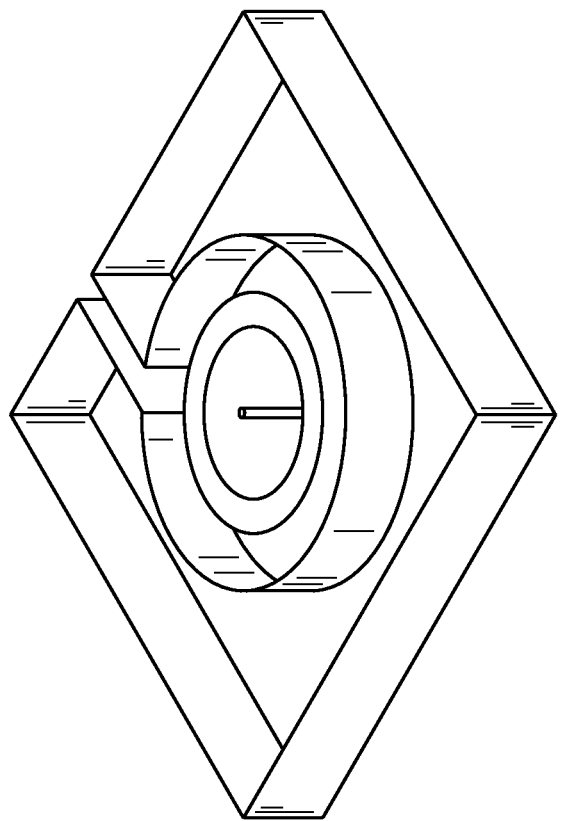
FIG. 12A is a diagram showing initial SIMION® results for an idealized simulation in which the starting energy and angular momentum of the electron were matched to that required for orbit in an example ion pump.

Long-path-length electron orbits facilitate low power consumption of the ion pumps, as described above. SIMION® simulations were used to investigate how long the electrons can be trapped in small-scale logarithmic-potential traps, in geometries with dimensions comparable to the example 1 $cm^3$ external volume ion pump described herein. The first model was an idealized simulation in which the starting energy and angular momentum of the electron were matched to that required for orbit. The result of this simulation is shown in FIG. 12A. This idealized simulation showed very long circular-orbit propagation lengths (greater than 50 km). FIG. 12B is a diagram showing initial SIMION® results for the idealized simulation based on injection of electrons from an external electron-beam source within electron energy and angular momentum conditions yielding electron kinetic energy swings of 10 eV to 150 eV yet resulting in greater than 20-meter path lengths.

Figure 13:
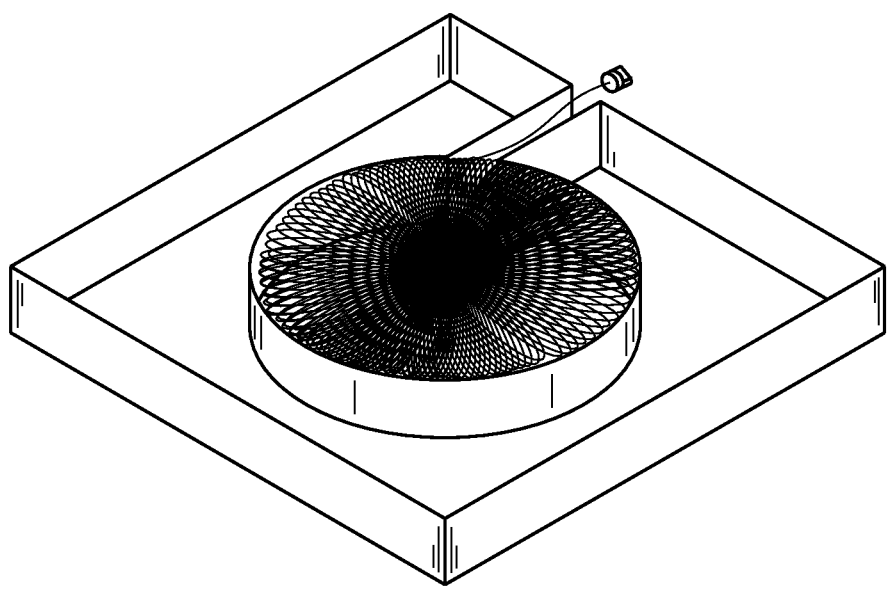
FIG. 13 is a diagram showing results of additional SIMION® simulations in which different parameters were varied to obtain long-path-length orbits based on injection of electrons from an external e-beam source.

FIG. 13 is a diagram showing results of additional SIMION® simulations in which different parameters were varied to obtain long-path-length orbits based on injection of electrons from an external e-beam source. This modeling shows that the trapping orbits are elliptical, not circular, as in the first idealized model shown in FIG. 12A. Elliptical orbits may be ultimately preferred, providing better volumetric fill and resulting in higher ion energy distributions. The simulations also predict electron energies in the range of 70 eV to 150 eV, suitable for impact ionization. This result shows electron trapping for greater than 20 meters. As seen in Table 2 (above), about 100-meter electron trajectories provide the lever-arm to realize the low-size, weight, and power ultra-high vacuum magnet-free ion pump. With mean free paths of 10's to 100's of km at these low-pressure regimes, it may be possible to design pump volume for even longer trajectories.

The pumping speed also may depend on the sputtering yields of the outer electrode gettering material. Table 3 shows the experimental sputtering yields as a function of the ion energy for normal incidence for materials of interest, with titanium being the most common material. The sputtering yield is defined as the ratio of the average number of ejected to the number of incoming particles. The sputtering yield also increases as $1/\cos(\Phi)$ for $\Phi$ less than 70°, where $\Phi$ is the ion angle of incidence with respect to the normal and decreases very rapidly to zero $\Phi$ greater than 70°.

TABLE 3

| Outer electrode material | Ion | 0.5 keV ion energy | 1 keV ion energy | 1.5 keV ion energy | 3 keV ion energy | 6 keV ion energy |
|---|---|---|---|---|---|---|
| Ti | $^4He^+$ | 0.04 | 0.07 | 0.08 | 0.07 | — |
| Ti | $N^+$ | — | 0.25 | 0.3 | 0.35 | — |
| Ag | $^4He^+$ | — | 1 | — | 0.5 | — |
| Ag | $N^+$ | — | — | — | — | 4 |
| Cu | $^4He^+$ | — | 0.6 | — | — | — |
| Cu | $N^+$ | — | — | — | — | 1.5 |

Figure 14:
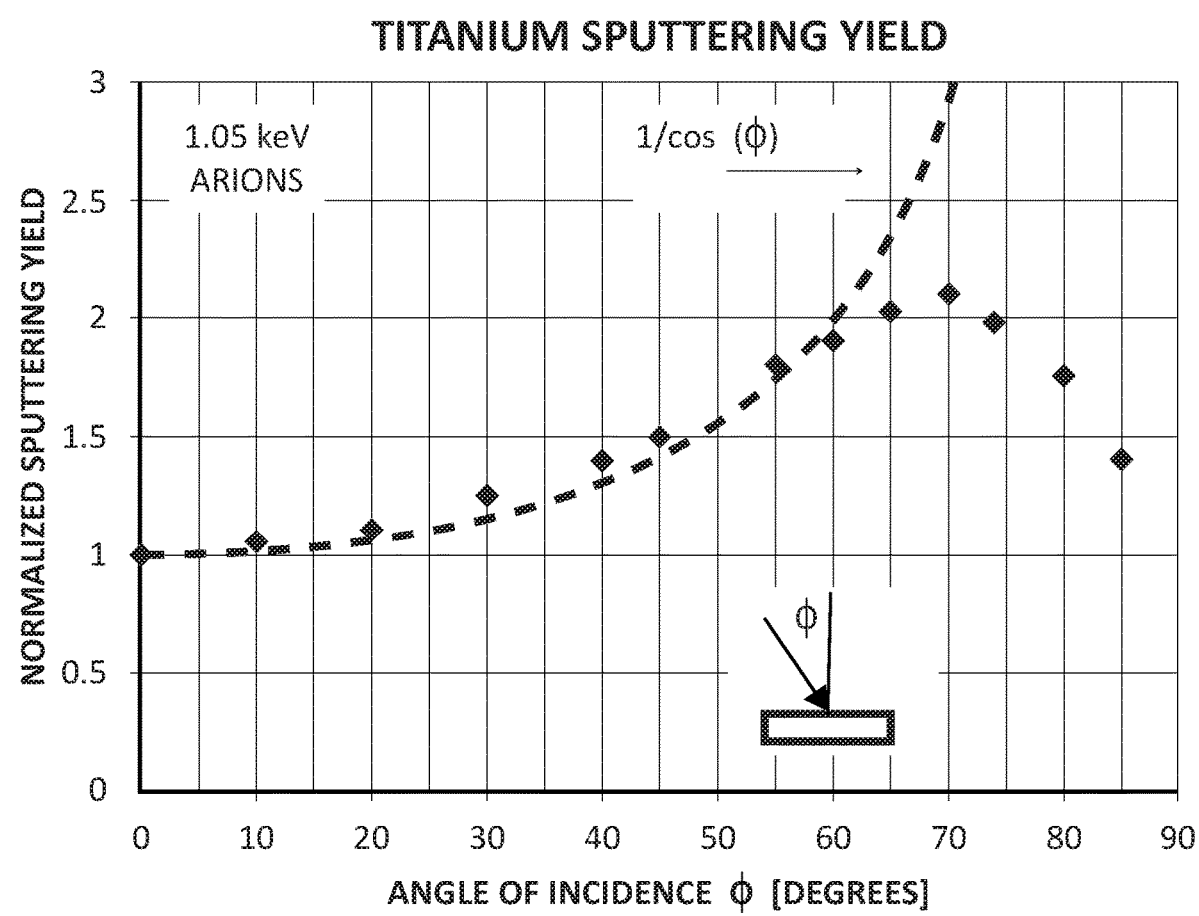
FIG. 14 is a plot showing sputtering yield of titanium as a function of the angle of incidence for Ar ions.
Figure 15:
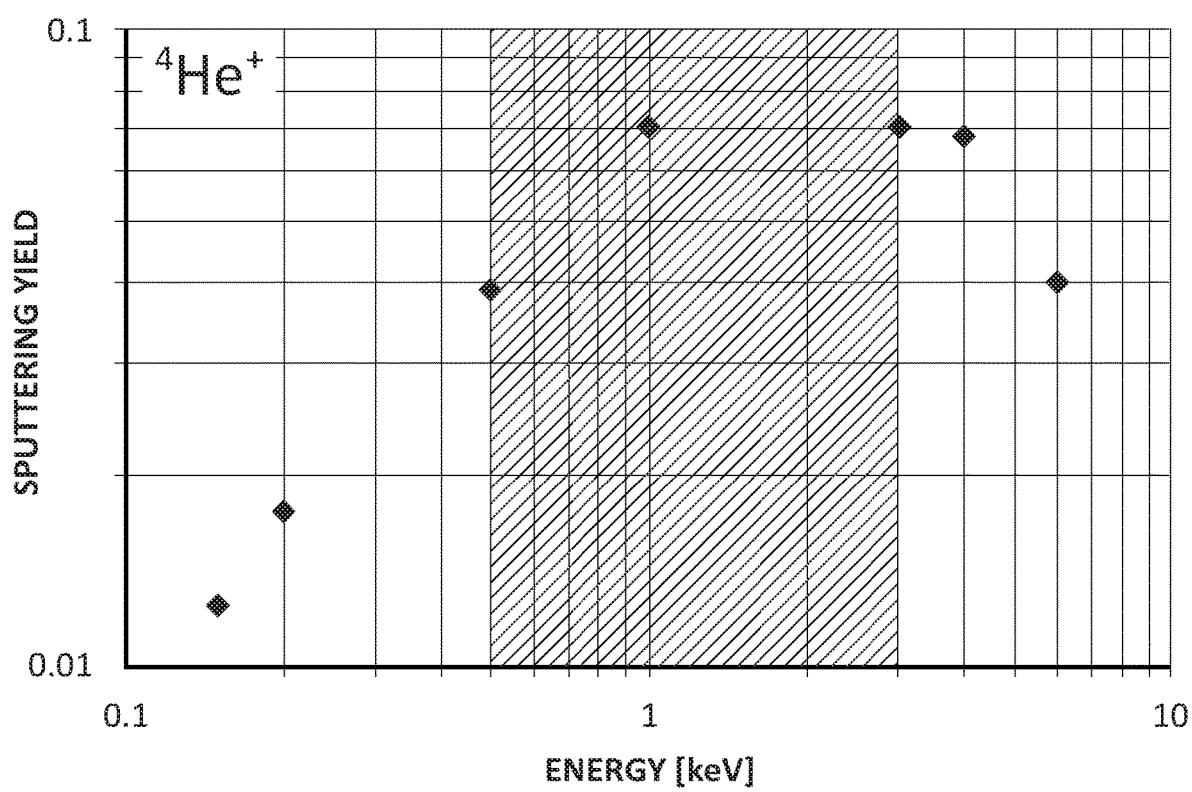
FIG. 15 is a plot showing sputtering yield of titanium as a function of the helium ion energy for $^4He^+$ ions.

FIG. 14 is a plot showing sputtering yield of titanium as a function of the angle of incidence for Ar ions. FIG. 14 shows that the sputtering yield increased by a factor of about 2 for an angle of about 70°. Helium also shows the same behavior as a function of the angle of incidence. Hence, it is advantageous to sputter at angular incidence to improve the pump performance. The potential between the inner electrode and the outer electrode provides the energy for accelerating the ions. In traditional sputtering mini ion pumps with magnets, the typical accelerating potential is about 3.3 kV, and the electrode gettering material is titanium. In the ion energy range of 1 keV to 3 keV, the sputtering yield of titanium for helium ions ($^4He^+$) is approximately constant and has a value of about 0.07, which is about 20% of the sputtering yield of nitrogen at 3 keV. Note that for traditional sputtering ion pumps with magnets, the pumping speed for helium is about 20% to 25% of the pumping speed for nitrogen, correlated to the sputtering rate difference. For the ion pumps described herein, there is no need to have ion energies above 1.5 keV for sufficient helium pumping. Furthermore, as shown in FIG. 15, the sputtering yield of titanium for helium ions starts decreasing for energies greater than 3 keV.

Figure 16:
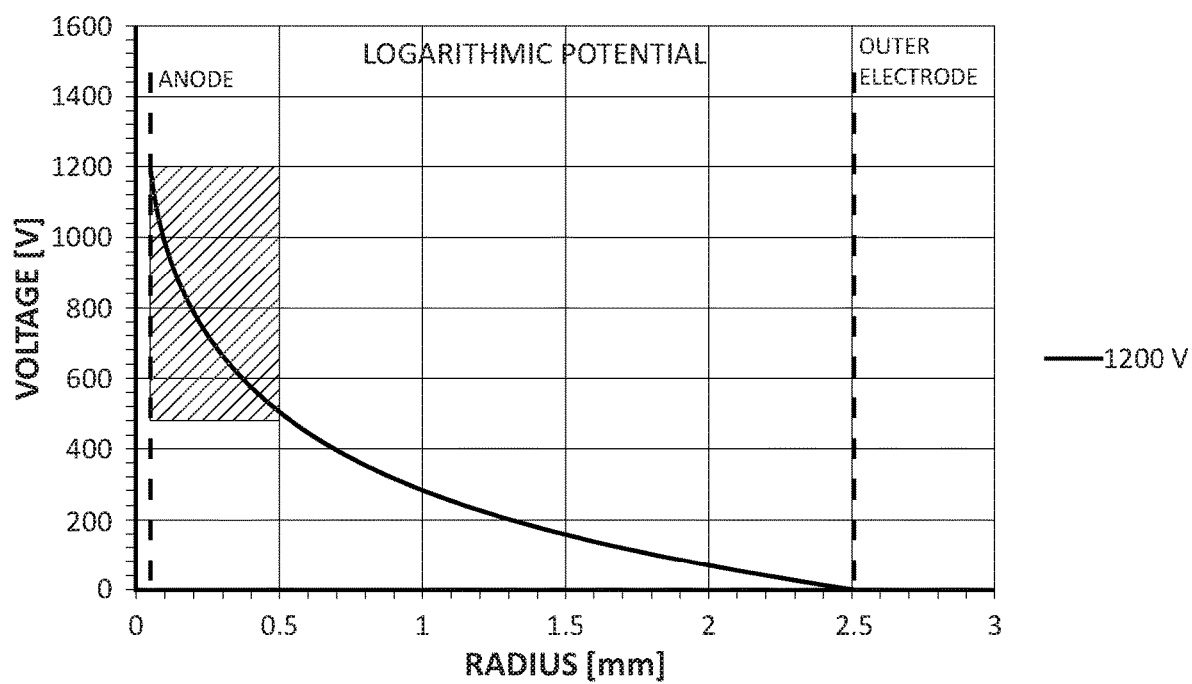
FIG. 16 shows the calculated logarithmic potential from the inner electrode to the outer electrode in a magnet-free ion pump, with similar parameters as shown in the SIMION® miniature pump model from Table 1.

FIG. 16 shows the calculated logarithmic potential from the inner electrode to the outer electrode in a magnet-free ion pump, with similar parameters as shown in the SIMION® miniature pump model from Table 1. Note that the energy that the ion will be accelerated to depends on where, radially, the ion is formed. Formation closest to the inner electrode allows for higher ion energies, favoring sputtering. Considering 500 eV as the minimum energy for efficient sputtering, corresponding to about 50% of the peak sputtering yield of titanium by helium (see FIG. 16) ions, the radius for ion acceleration is about 0.5 mm (dark shaded area) for 1200 V. This logarithmic potential, which provides such powerful benefits for long electron path-length trajectories, also provides the main detriment for gettering. That is, on average, the ions will have less than full energy, and hence lower sputtering rates when impacting the outer electrode.

This detriment may be addressed in one or more of a variety of ways. For example, elliptical electron orbits, as shown in FIGS. 12B and 13 may be used to favor ionization of gas molecules close to the inner electrode (providing the ion increased acceleration across the electric field).

Figure 17:
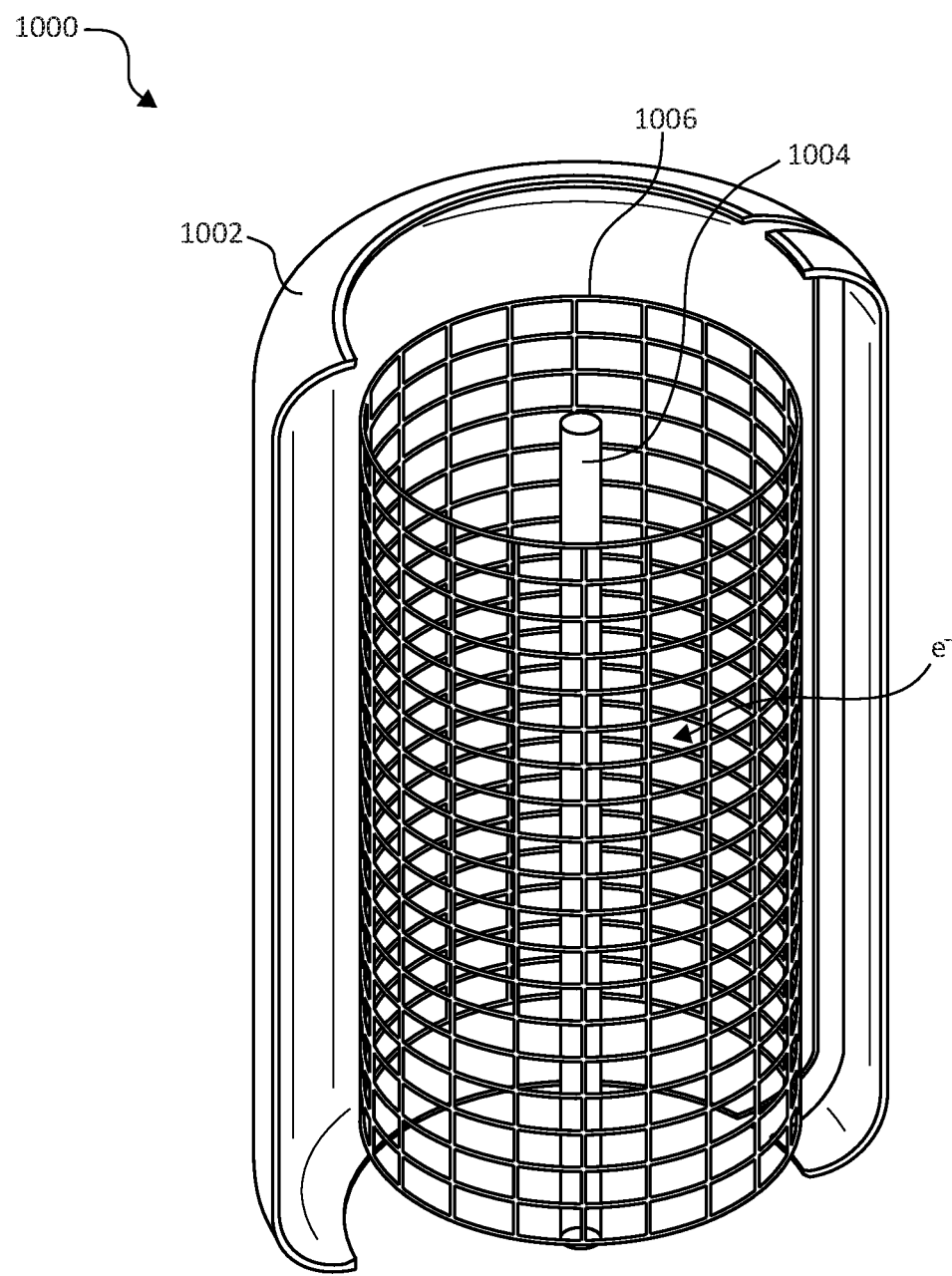
FIG. 17 is a rendered diagram of an example ion pump that includes a cylindrical grid between an inner electrode and an outer electrode.

As another example, a grid may be included between the inner electrode and outer electrode, as described with reference to FIG. 3. FIG. 17 is a rendered diagram of an example ion pump 1000 that includes a cylindrical grid 1006 between an inner electrode 1004 and an outer electrode 1002. Grid 1006 allows the separation of regions for gas molecule ionization (in the region from inner electrode 1004 to grid 1006) independent from ion acceleration to outer 1002 electrode (in the region from grid 1006 to outer electrode 1002). Such a structure may allow for full ion energy gain, independent of the location of ion formation.

Figure 18:
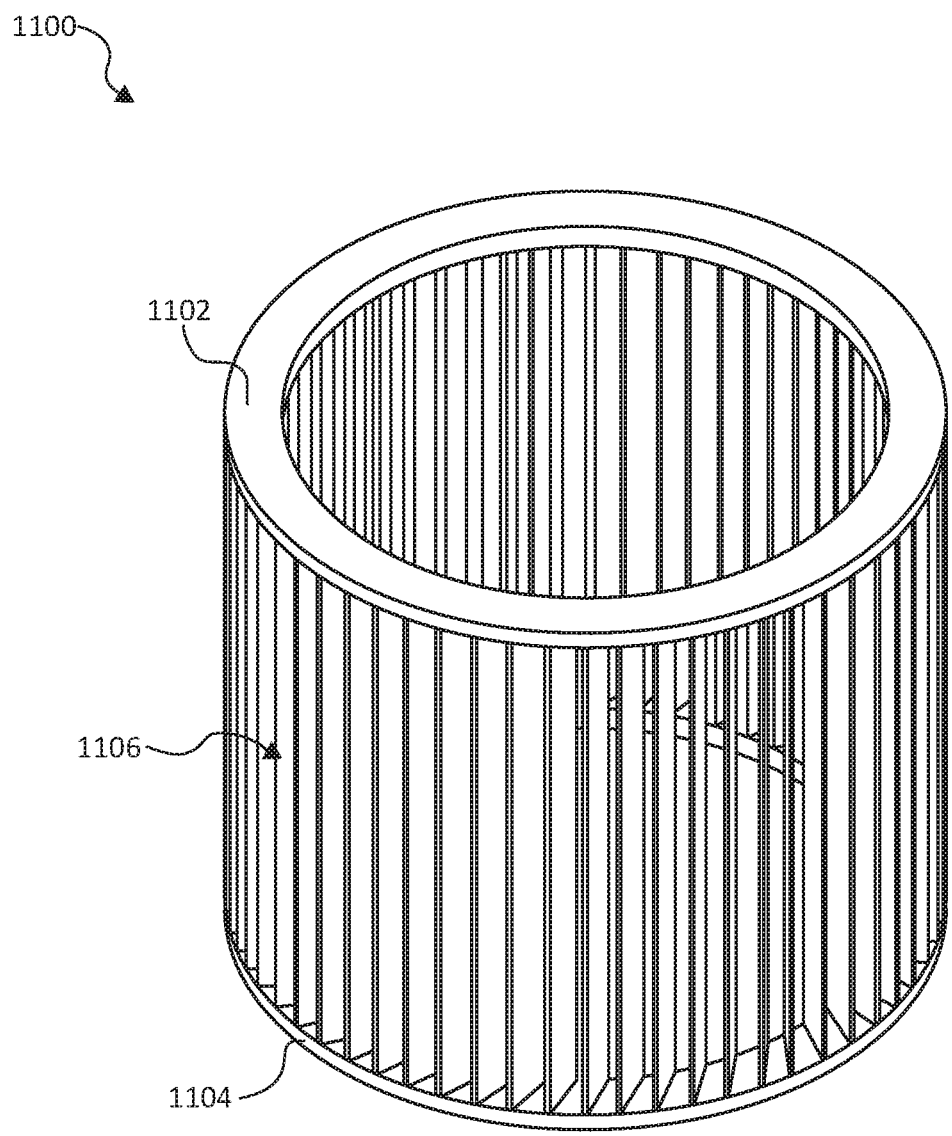
FIG. 18 is a perspective view of a rendered diagram of an outer electrode of an ion pump that includes a finned configuration.
Figure 19:
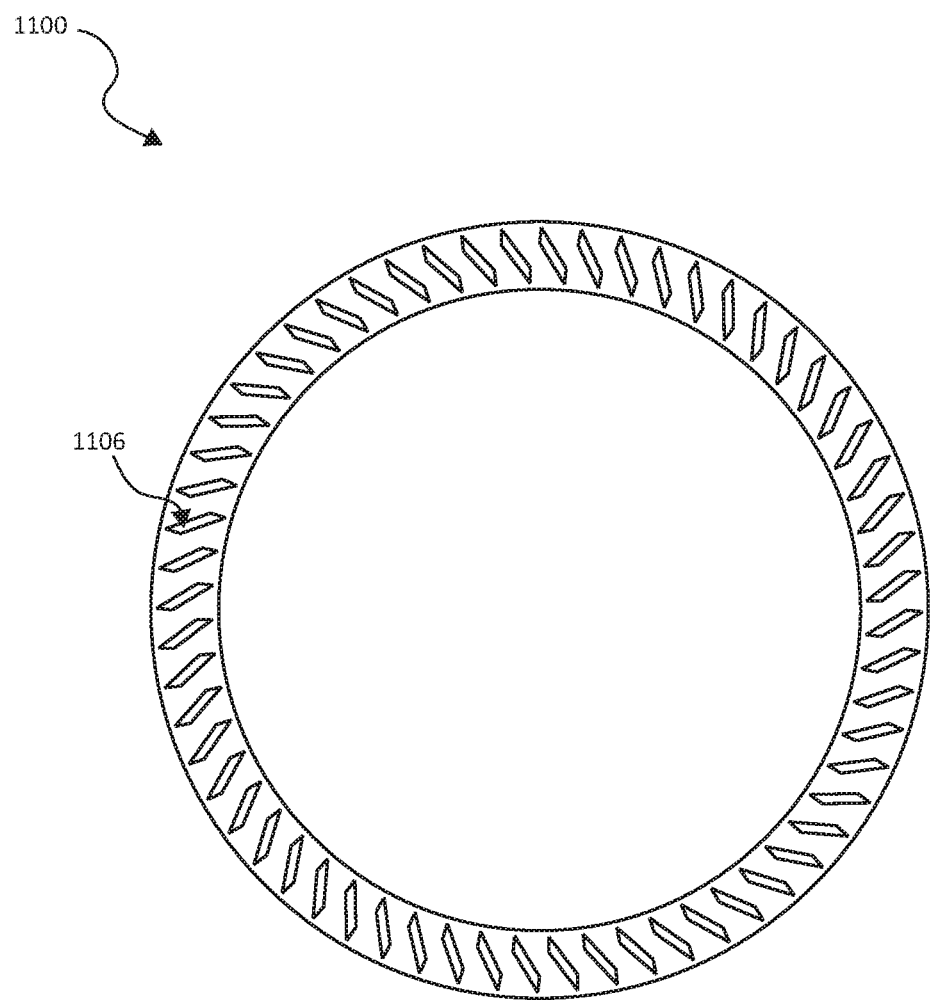
FIG. 19 is a cross-sectional view of the rendered diagram of the outer electrode of FIG. 19.

To reduce or substantially minimize reemission of buried inert gases, a segmented or finned outer electrode, which may be referred to as an occluded configuration, may be used. FIG. 18 is a perspective view of a rendered diagram of an outer electrode 1100 of an ion pump that includes a finned configuration. FIG. 19 is a cross-sectional view of the rendered diagram of the outer electrode 1100 of FIG. 18. As shown in FIGS. 18 and 19, outer electrode 1100 may include a top ring 1102, a bottom ring 1104, and a plurality of fins 1106 extending between top ring 1102 and bottom ring 1104. As best seen in FIG. 19, each of the plurality of fins 1106 are angled with respect to the circumference (inner or outer circumference) of top ring 1102 and bottom ring 1104, and gaps are present between adjacent fins of plurality of fins 1106. However, in some examples, a radius from the center of the circle defined by outer electrode 1100 to an outer circumference of top ring 1102 at any angular position about the center will intersect a fin of plurality of fins 1106. Plurality of fins 1106 result in the highly energetic ions impacting outer electrode 1100 (e.g., a fin of outer electrode 1100) at an angle, and the surface which the highly energetic ions impact being partially occluded by an adjacent fin of plurality of fins 1106. This may result in at least some of the sputtered getter material depositing on the back side (outer side) of the adjacent fin, out of the line of sight from the highly energetic ions. This configuration may increase sputtering yield due to the ion incidence in an angle with respect to the normal to the fin. 3D printing techniques of metals such as titanium enable the fabrication of these complex structures at a relatively low cost.

Figure 20:
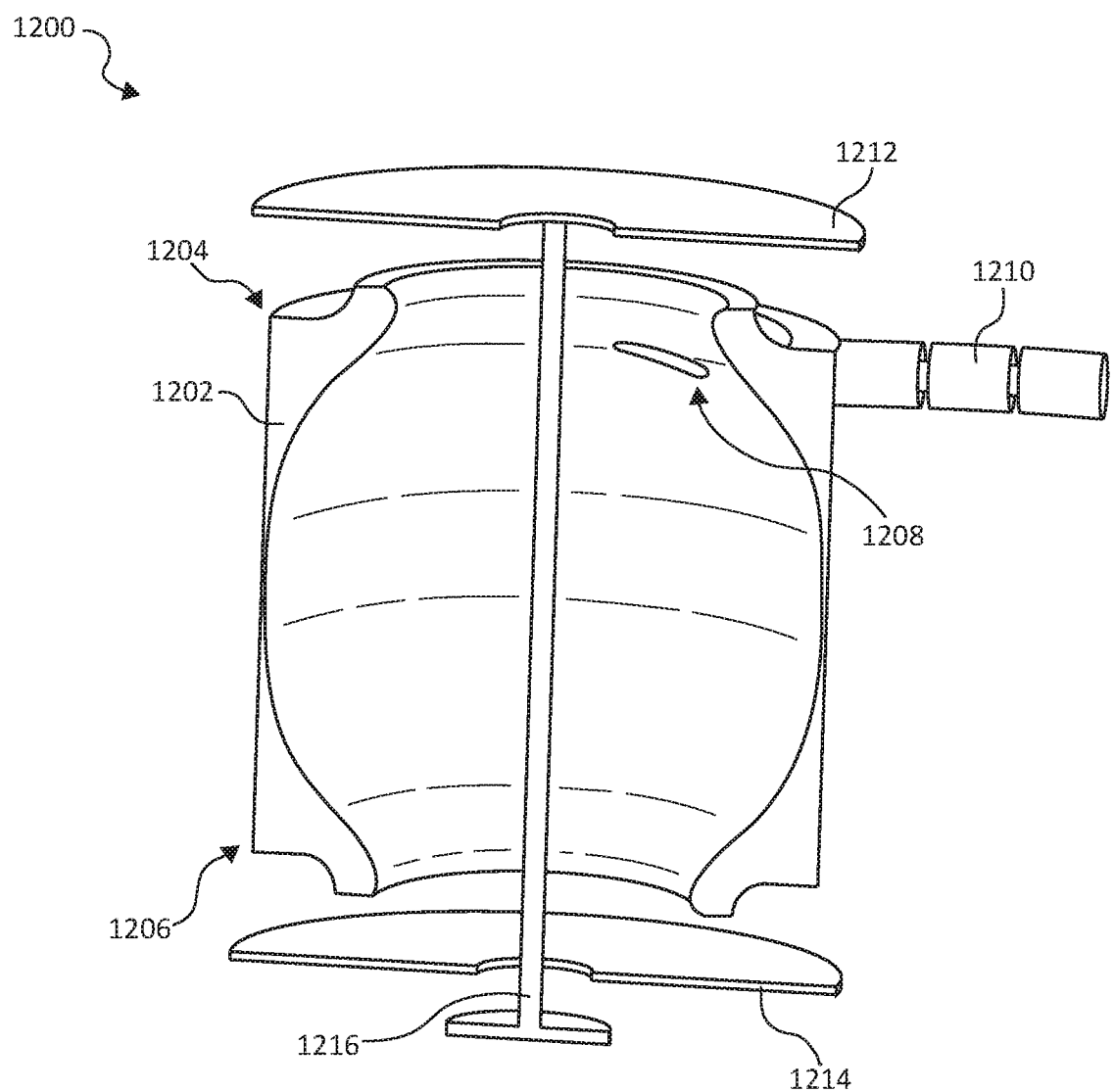
FIG. 20 is a conceptual cross-sectional diagram of an example outer electrode that has a shape of a portion of a three-dimensional ellipse or oval.

In some examples, the generally cylindrical shape of the inner wall of an outer electrode may include a barrel-type shape, such as a portion of a three-dimensional ellipse or oval or a cylinder with top and bottom ends that taper toward the central axis of the cylinder. For example, FIG. 20 is a conceptual cross-sectional diagram of an example ion pump 1200 that includes an outer electrode 1202 that has a shape of a portion of a three-dimensional ellipse or oval. Outer electrode 1202 includes a top portion 1204 and a bottom portion 1206 in which the inner wall of outer electrode 1202 tapers inward toward the central axis of outer electrode 1202. Outer electrode 1202 also defines an aperture 1208 through which electrons are injected into the inner volume of ion pump 1200 defined by outer electrode 1202. Aperture 1208 may be located at any position of outer electrode 1202. In the example of FIG. 19, aperture 1208 is located in top portion 1204 of outer electrode 1202. Aperture 1208 is connected to a channel defined by channel walls 1210. The location of aperture 1208 and the presence of the curved inner wall of outer electrode 1202 may combine to extend the time of flight of injected electrons. The channel is connected to an output of an electron source.

Ion pump 1200 also includes top end cap 1212 and bottom end cap 1214, which may substantially close the inner volume of ion pump 1200, although a gap may be present between top end cap 1212 and outer electrode 1202, between bottom end cap 1214 and outer electrode 1202, or both. Ion pump 1200 further includes an inner electrode 1216, which may be located near the central axis of outer electrode 1202.

Figure 21:
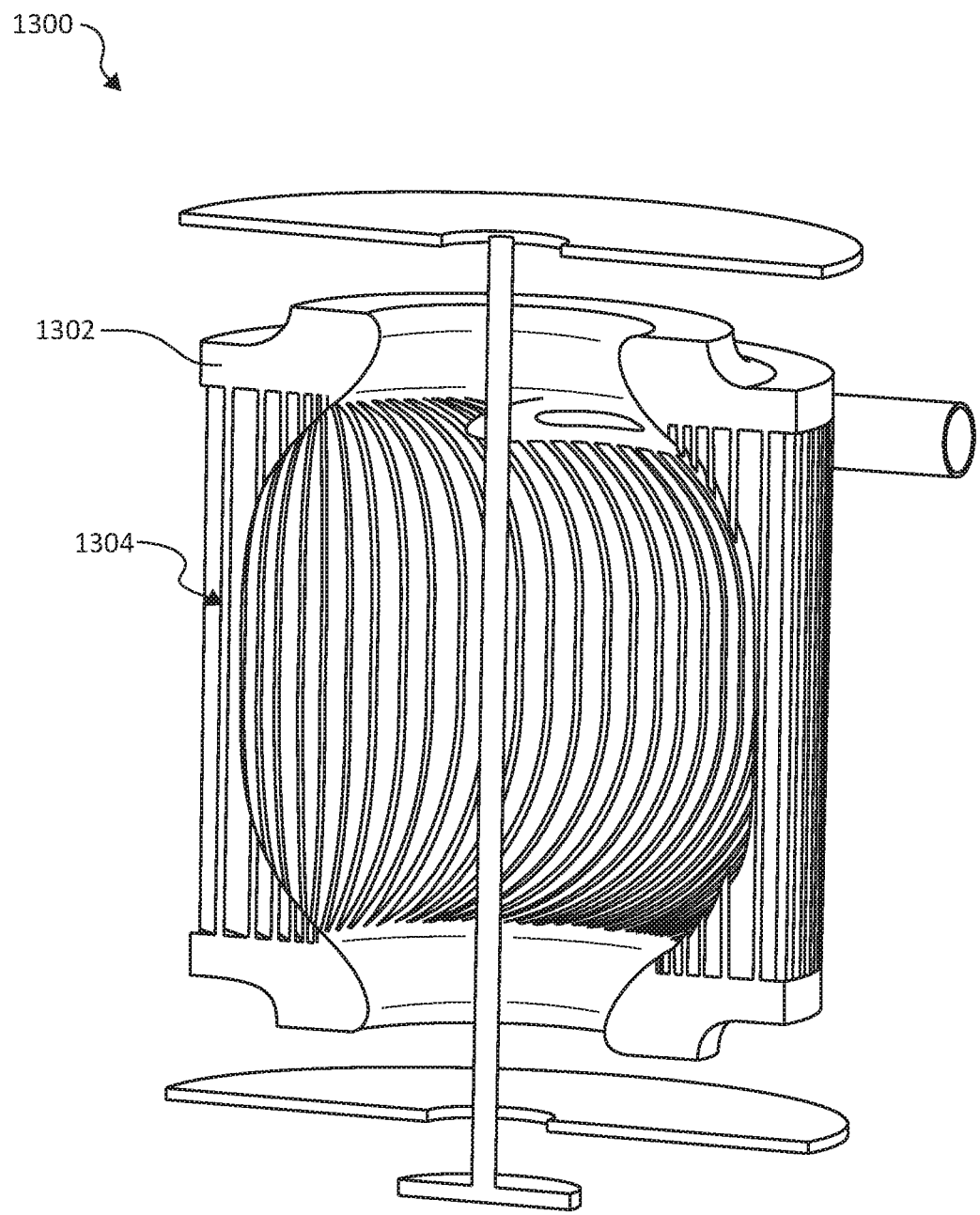
FIG. 21 is a conceptual cross-sectional diagram of an example ion pump that includes an outer electrode that has a shape of a portion of a three-dimensional ellipse or oval and fins.

In some examples, an outer electrode that includes an inner wall that defines a barrel-type shape, such as a portion of a three-dimensional ellipse or oval or a cylinder with top and bottom ends that taper toward the central axis of the cylinder may be combined with fins. FIG. 21 is a conceptual cross-sectional diagram of an example ion pump 1300 that includes an outer electrode 1302 that has a shape of a portion of a three-dimensional ellipse or oval and fins 1304. Aside from fins 1304, ion pump 1300 may be similar to or substantially the same as ion pump 1200 of FIG. 20. Fins 1304 may reduce or substantially minimize re-emission of gettered gases from outer electrode 1302 by causing the metal from which fins 1304 is formed, such as titanium, to be sputtered at least partially behind an adjacent fin.

Modeling was used to estimate the electron density in the ion pumps described herein at steady state. From SIMION® simulations, a time-of-flight (TOF) histogram was obtained for an example ion pump by binning the electron population by TOF and determining the probability pi that an electron is in the ith time bin.

$$\frac{d}{dt} n_i(t) = \frac{I_{in}}{q} - \frac{n_i(t)}{\tau_i}$$

where $K_{in}$ is the injected electron current and q is the electron charge. Letting $n_i(t) = n_e(t) p_i$ where $n_e(t)$ is the total number of electrons in the pump at time t, and summing over i gives:

$$\sum p_i \frac{e}{dt} n_e(t) = \sum \left( \frac{I_{in}}{q} - \frac{n_e(t) p_i}{\tau_i} \right)$$

In steady state, the number of electrons, $n_e$, is given by:

$$n_e = \frac{I_{in} \tau_{eff}}{q}$$

where $\tau_{eff}$, the effective TOF, is given by:

$$\tau_{eff} = \frac{1}{\Sigma p_i / \tau_i}$$

Therefore, the electron density is given by:

$$\rho_e = \frac{n_e}{V} = \frac{I_{in} \tau_{eff}}{qV}$$

where V is the internal pump volume.

Figure 22:
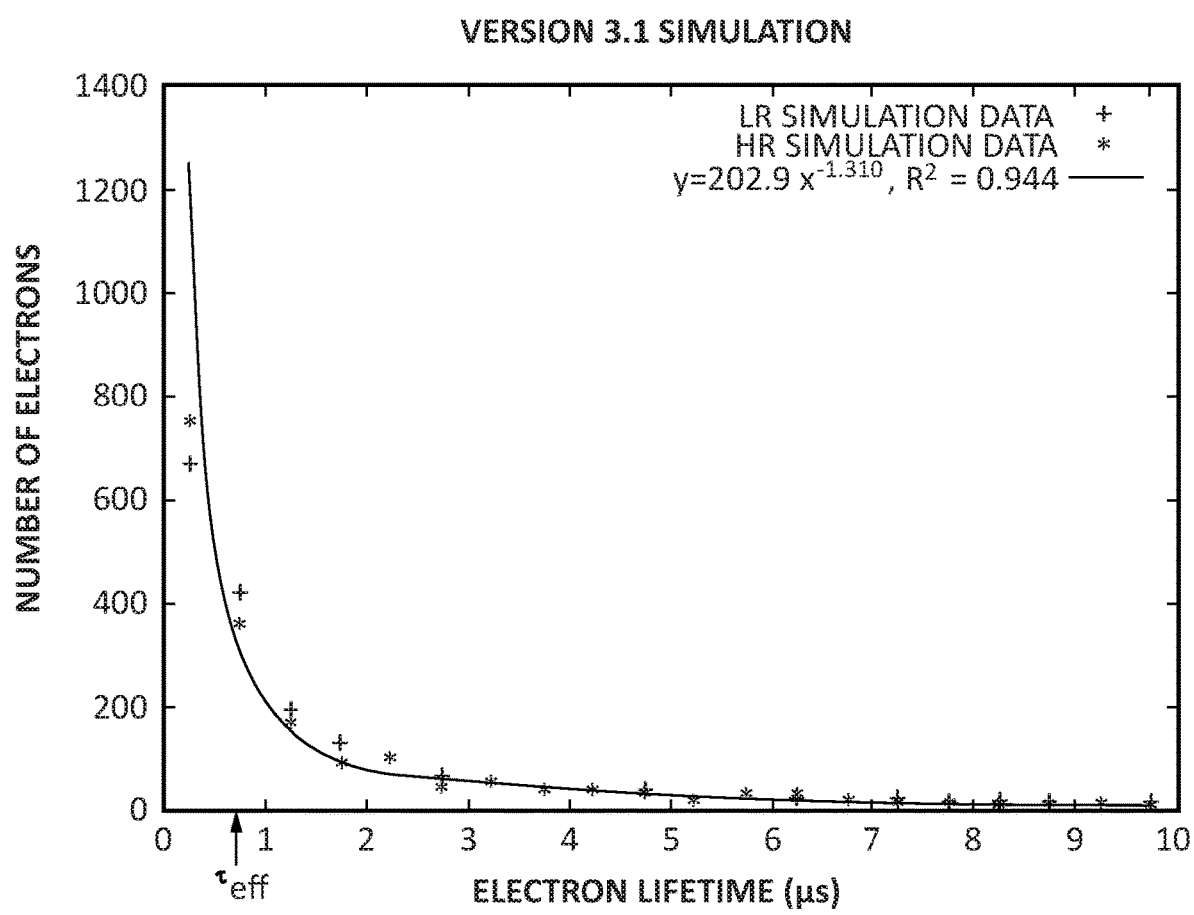
FIG. 22 is a plot showing the time of flight distribution results from SIMION® based on the magnet-free ion pump geometry shown in FIG. 20.

FIG. 22 is a plot showing the TOF distribution results from SIMION® based on the magnet-free ion pump geometry shown in FIG. 20. For the modeling, the electron source was specified as a group of 2000 collimated electrons emanating from a 0.5-mm diameter area with initial energy distribution of 10 eV+/−3 eV. The injected electrons also had an initial spatial distribution with a variation on +/−0.25 mm in the starting point in the longitudinal direction. TOF distribution was obtained by using τ at the center of 0.5-μs wide bin. Low-resolution (LR) and high-resolution (HR) simulations correspond to simulations with two different grid sizes of 50 μm and 20 μm, respectively, though the data shows that the resolution does not affect the simulated TOF. TOF distribution fits well to power law $y = A\tau^{-1.31}$ for τ between 0.25 μs and 9.75 μs, given an effective TOF, $\tau_{eff}$, of 0.723 μs. The SIMION® simulations also provided the radial electron distribution, important in determining the ionization rate of the gas species to be pumped.

Figure 23A:
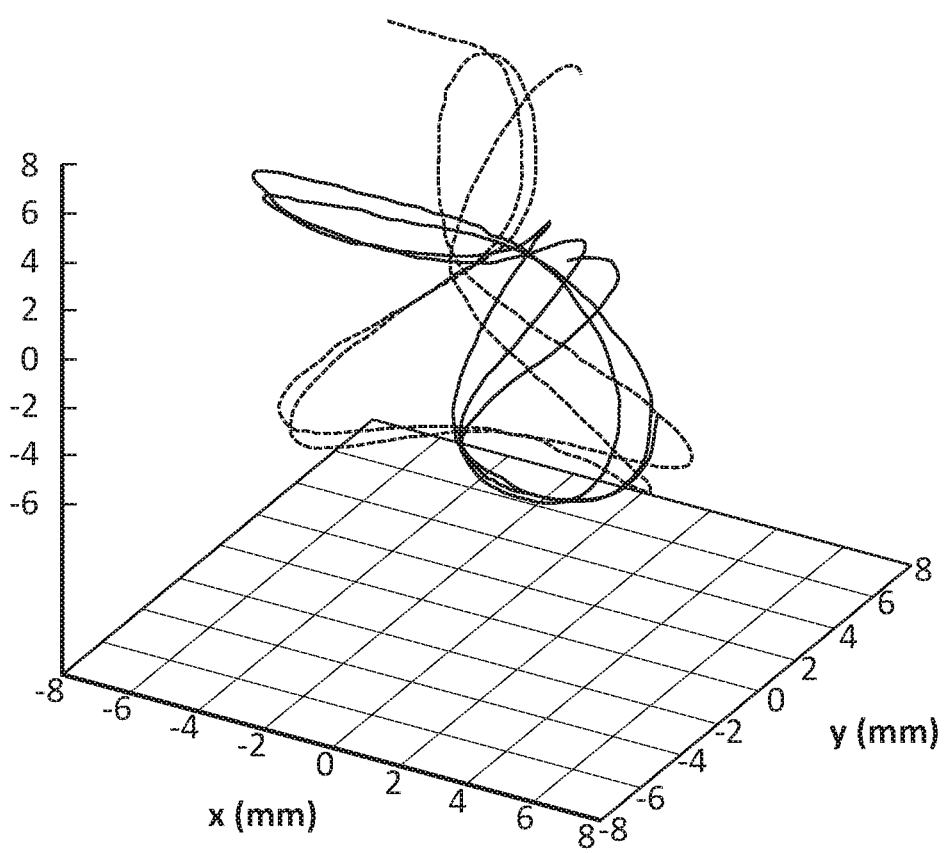
FIG. 23A is a three-dimensional plot showing an example single 3D electron trajectory for the FIG. 20 ion pump design.
Figure 23B:
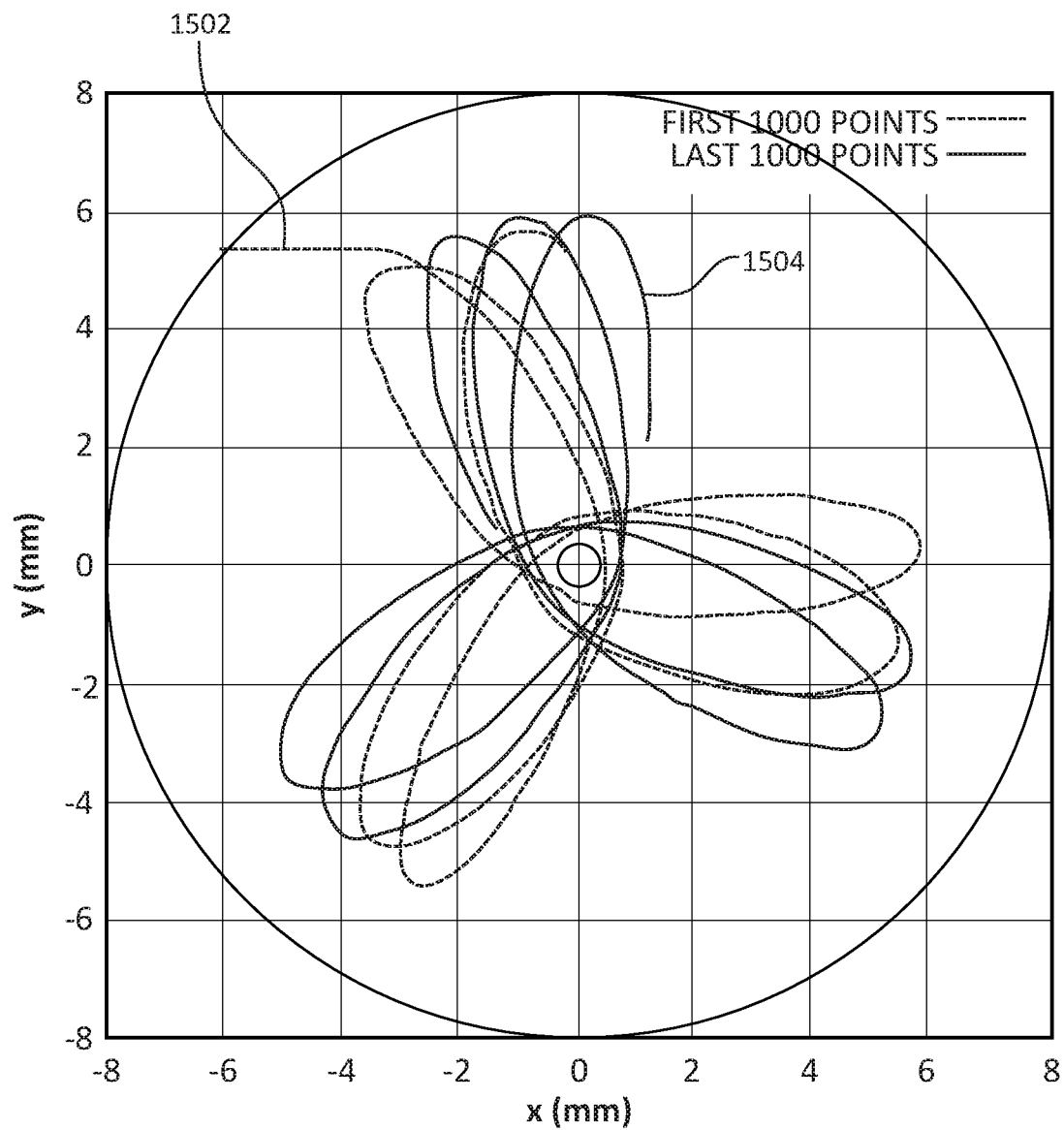
FIG. 23B is a plot showing an example single electron trajectory in the r-O plane for the FIG. 20 ion pump design.
Figure 23C:
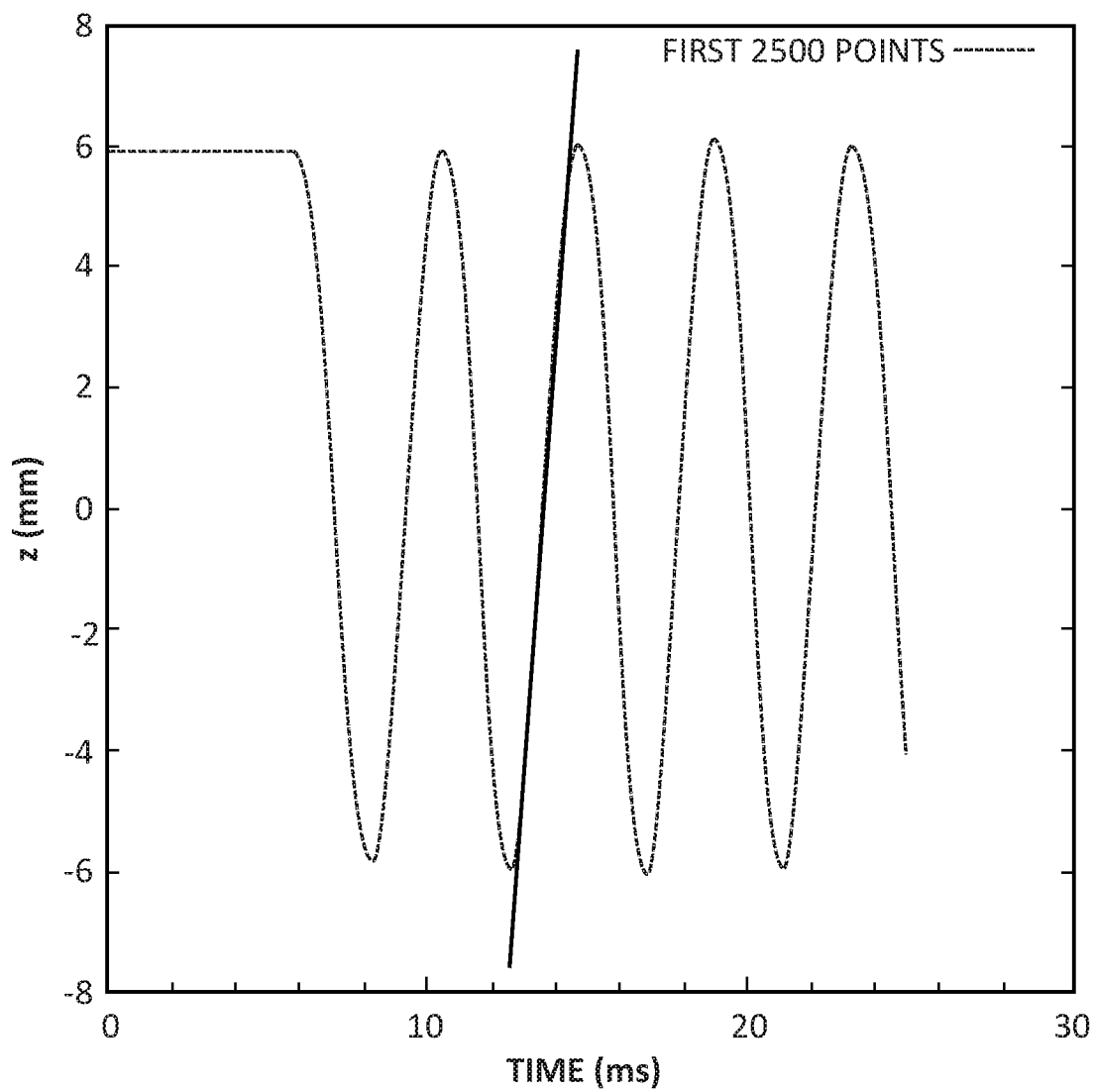
FIG. 23C is a plot showing an example single electron trajectory in the z-axis direction for the FIG. 20 ion pump design.

Assuming ergodicity (time average of one sequence of events is the same as the ensemble average), it is possible of obtain the radial spatial distribution of the electrons by using a single electron trajectory. FIG. 23A is a three-dimensional plot showing an example single 3D electron trajectory for the FIG. 20 ion pump design for the first 1000 points in the simulation (1402) and the last 1000 points in the simulation (1404). FIG. 23B is a plot showing an example single electron trajectory in the r–θ plane for the FIG. 20 ion pump design. FIG. 23C is a plot showing an example single electron trajectory in the z-axis direction for the FIG. 20 ion pump design. As shown in FIG. 23B, the electron orbit in the r–θ plane is "clover leaf" in shape, meaning varying electron kinetic energy as a function of radial distance. FIG. 23C shows that the electron orbits oscillate in the axial direction of the ion pump, between the end caps.

Figure 24:
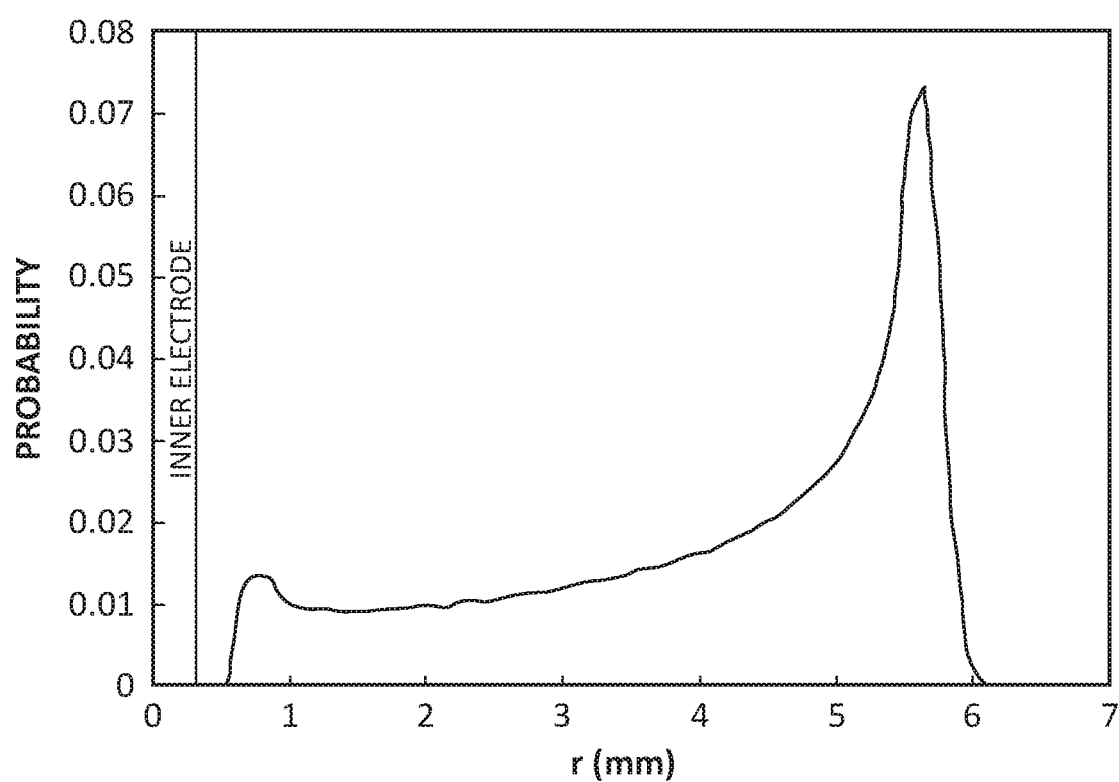
FIG. 24 is a diagram illustrating the electron distribution probability as a function of radius for the ion pump design shown in FIG. 20.

The trajectory shown in FIGS. 23A-23C can be used to calculate the spatial electron distribution probability, p(r), as a function of the radius r, determined by binning electron position in 0.1 mm radius increments. FIG. 24 is a diagram illustrating the electron distribution probability as a function of radius for the ion pump design shown in FIG. 20. Note the large peak toward the outer electrode: this is the radial location where the electron spends the most time, as it is "turning around" the clover-leaf orbit shown in FIG. 23B. Results show a large peak in electron distribution at a radius of about 5.7 mm. The outer electrode is located at a radius of about 7.8 mm.

To calculate the pumping speed, the ionization rate was first calculated based on these electron distributions. The steady-state ionization rate, Rs, for species, s (units of $t^{-1}$), is determined by the following equations:

$$R_s = \int_{r_i}^{r_o} r_s(r) dr$$

$$r_s = n_e \rho_s p(r) \sigma_s (E_0 - V(r)) \sqrt{\frac{2(E_0 - V(r))}{m_e}}$$

$$R_s = n_e \rho_s \int_{r_i}^{r_o} p(r) \sigma_s (E_0 - V(r)) \sqrt{\frac{2(E_0 - V(r))}{m_e}} dr$$

where p(r) is the spatial electron distribution probability; $r_i$ is the radius of the inner electrode; $r_o$ is the radius of the outer electrode; $\sigma_s(E)$ is the electron-induced ionization cross-section for species s at kinetic energy E; me is the mass of an electron; ps is the gas density $\rho_s = P_s/k_B T$, were $P_s$ is the partial pressure of species s, $k_B$ is Boltzmann's constant, and T is temperature; the electron's kinetic energy depends only on its position so $E=E_0-V(r)$, where $E_0$ is the injected electron energy and $V(r)$ is the electrostatic potential between the inner electrode and the outer electrode; and the $2\pi r$ element is absorbed from the volume element in p(r) and $r_s(r)$.

The ion current $I_s$ for species s is $qr_s$, or:

$$I_s = qn_e\rho_s \int_{r_i}^{r_o} p(r)\sigma_s(E_0 - V(r))\sqrt{\frac{2(E_0 - V(r))}{m_e}}\,dr$$

The titanium sputtering rate $T_s$ is determined by:

$$T_s = \int_0^{E_a} \eta(E) r_s(e)\,dE$$

$E_a$ where $\eta(E)$ is the sputtering yield (obtained from published tables) and $r_s(E)$ is the ionization rate as a function of energy. $E_a$ is determined by the potential applied between the inner and outer electrodes.

The pump speed S is then determined by the ratio of the number of titanium atoms sputtered per unit of time, $T_s$, divided by the gas density ps and multiplied by the sticking coefficient $s_0$.

$$S = s_0 \frac{T_s}{\rho_s}$$

Figure 25A:
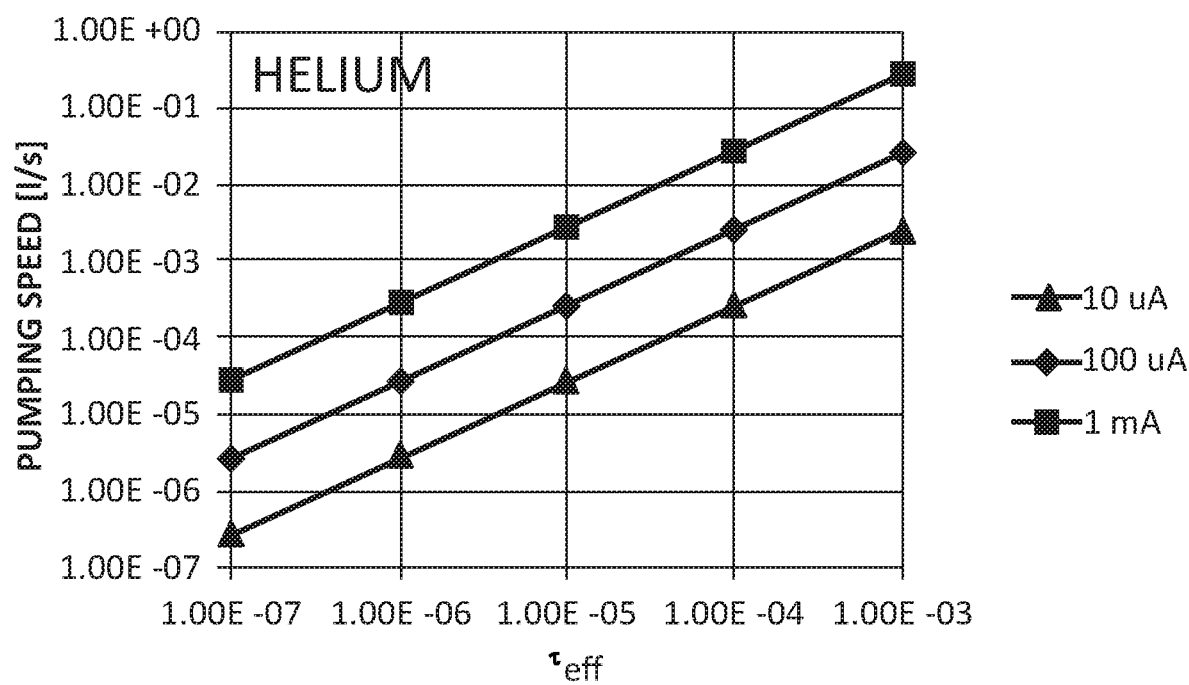
FIGS. 25A and 25B are plots of pumping speeds versus effective electron time of flight for different injected electron beam currents for helium and nitrogen, respectively, for the ion pump geometry of FIG. 20.
Figure 25B:
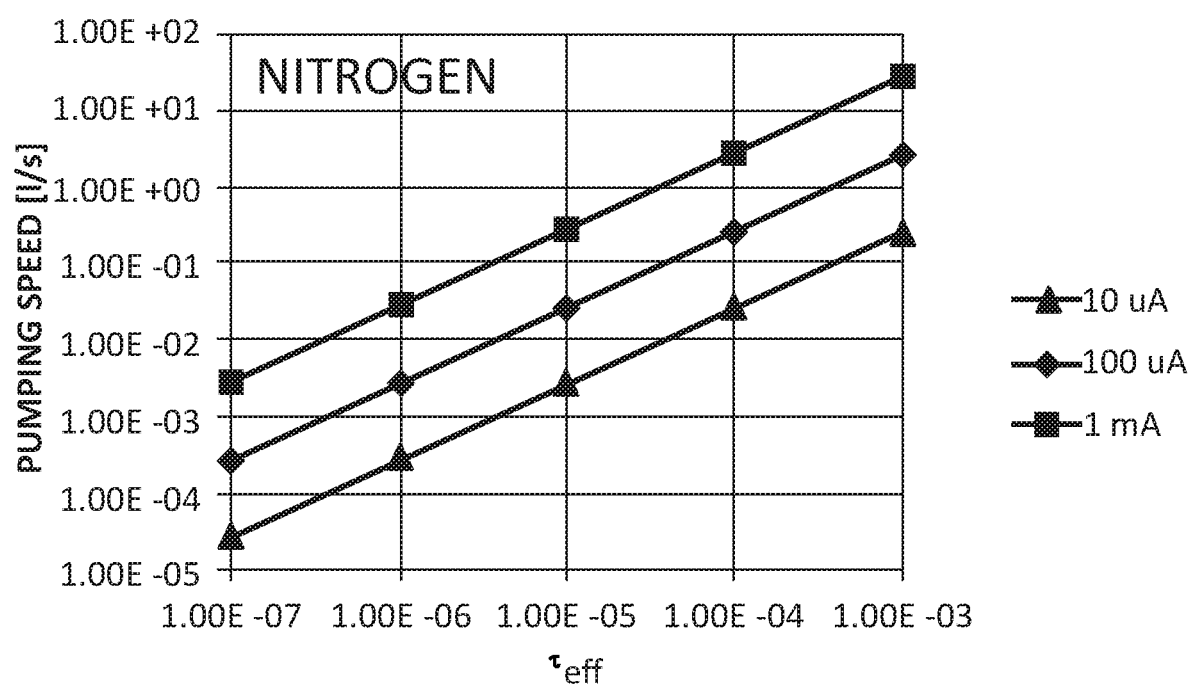

Applying this model, the pumping speeds for helium and nitrogen were calculated. A parameter that affects the pump performance and therefore the size, weight, and power is the effective TOF ($\tau_{eff}$) of the electrons within the electrode structure. FIGS. 25A and 25B are plots of pumping speeds versus effective electron time of flight for different injected electron beam currents for helium and nitrogen, respectively, for the ion pump geometry of FIG. 20. The current estimated value of the $\tau_{eff}$ is about 1 µs.

Figure 26:
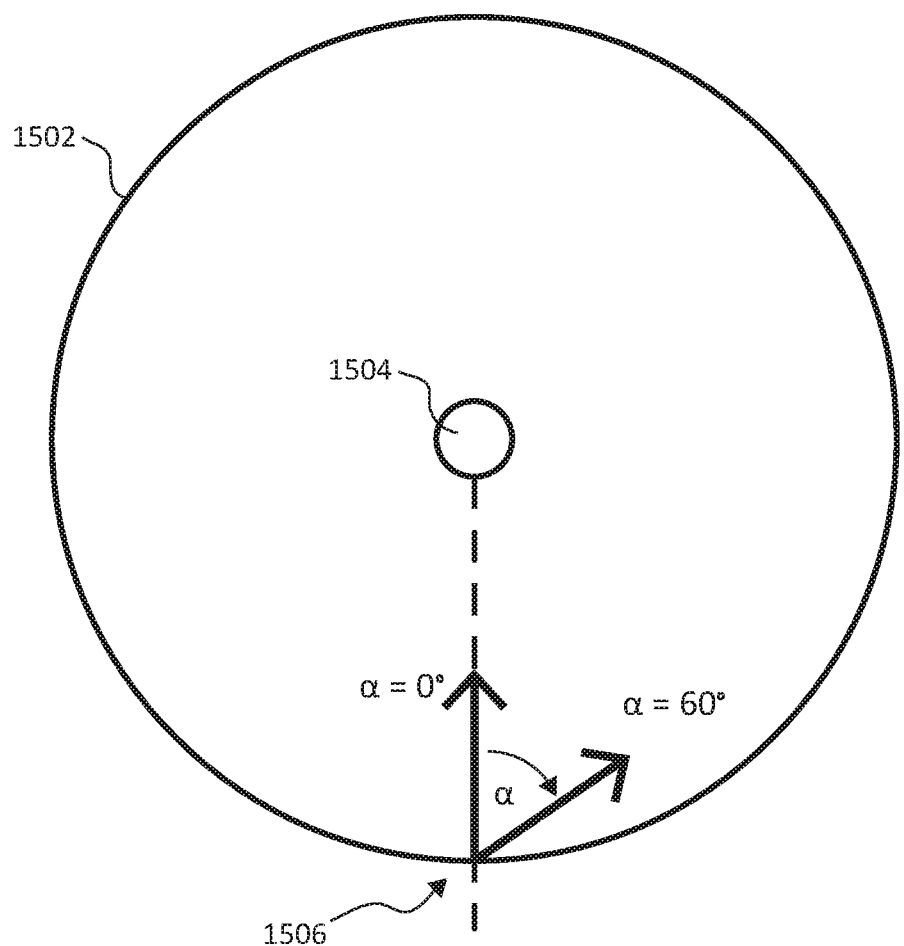
FIG. 26 is a conceptual diagram illustrating conditions of electrode injection with respect to an outer electrode, an inner electrode, and an electron injection point.

From conservation laws of electron energy, electron angular momentum in the x-y plane, and electron linear momentum in the z-direction, electron orbits were classified as a function of the azimuthal and elevation injection angles and electron energy. FIG. 26 is a conceptual diagram illustrating the conditions with respect to outer electrode 1502, inner electrode 1504, and electron injection point 1506.

Figure 27:
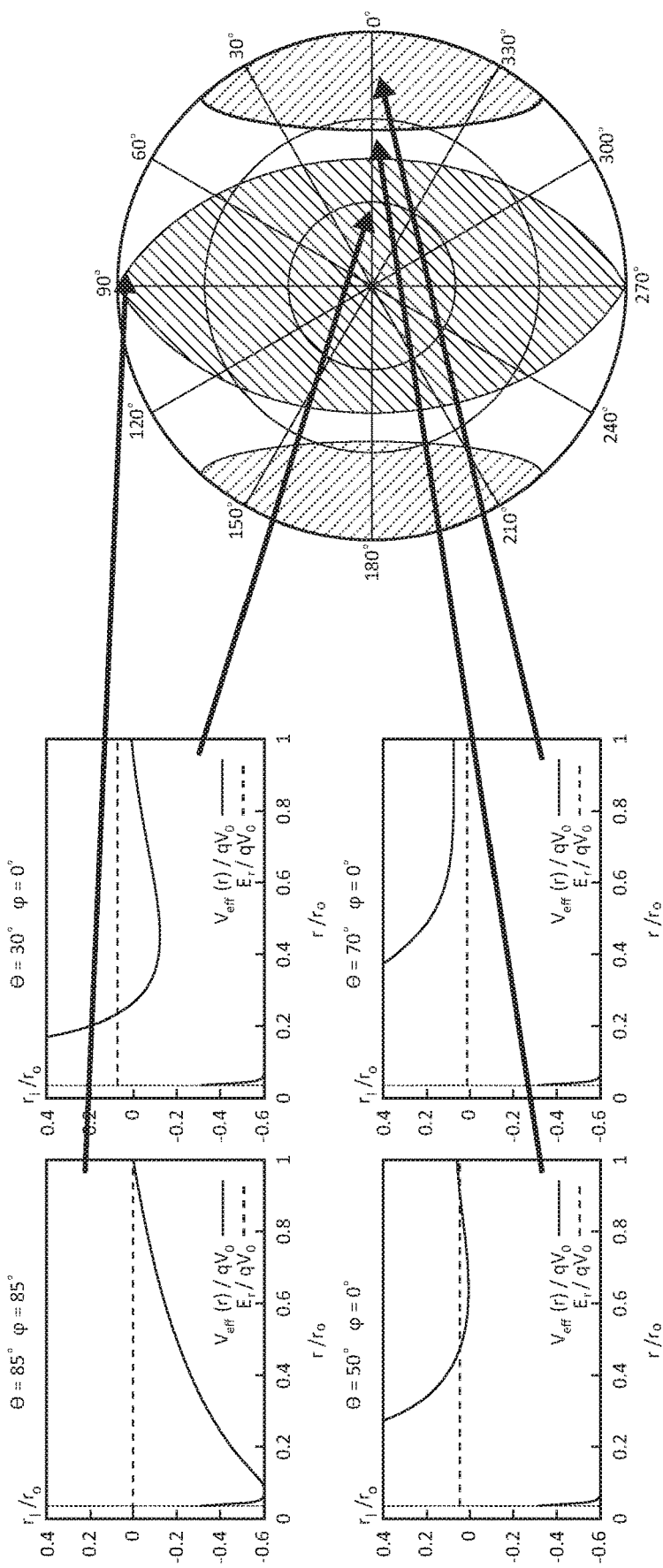
FIG. 27 shows the injection stability diagrams for an azimuthal angle, α, zero degrees from normal, along with electron position plots for different elevation angles.
Figure 28A:
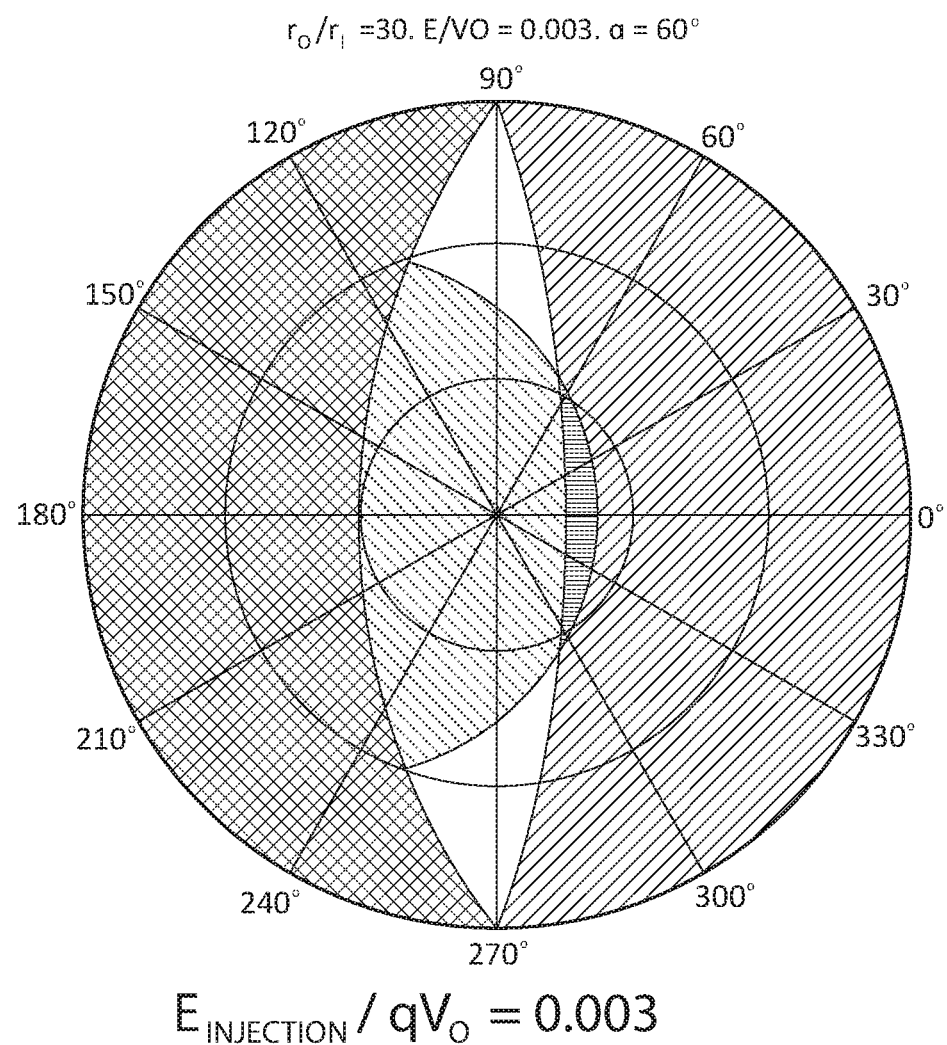
FIGS. 28A-28C show injection stability diagrams for an azimuthal angle, α, 60° from normal at different electron injection energies.
Figure 28B:
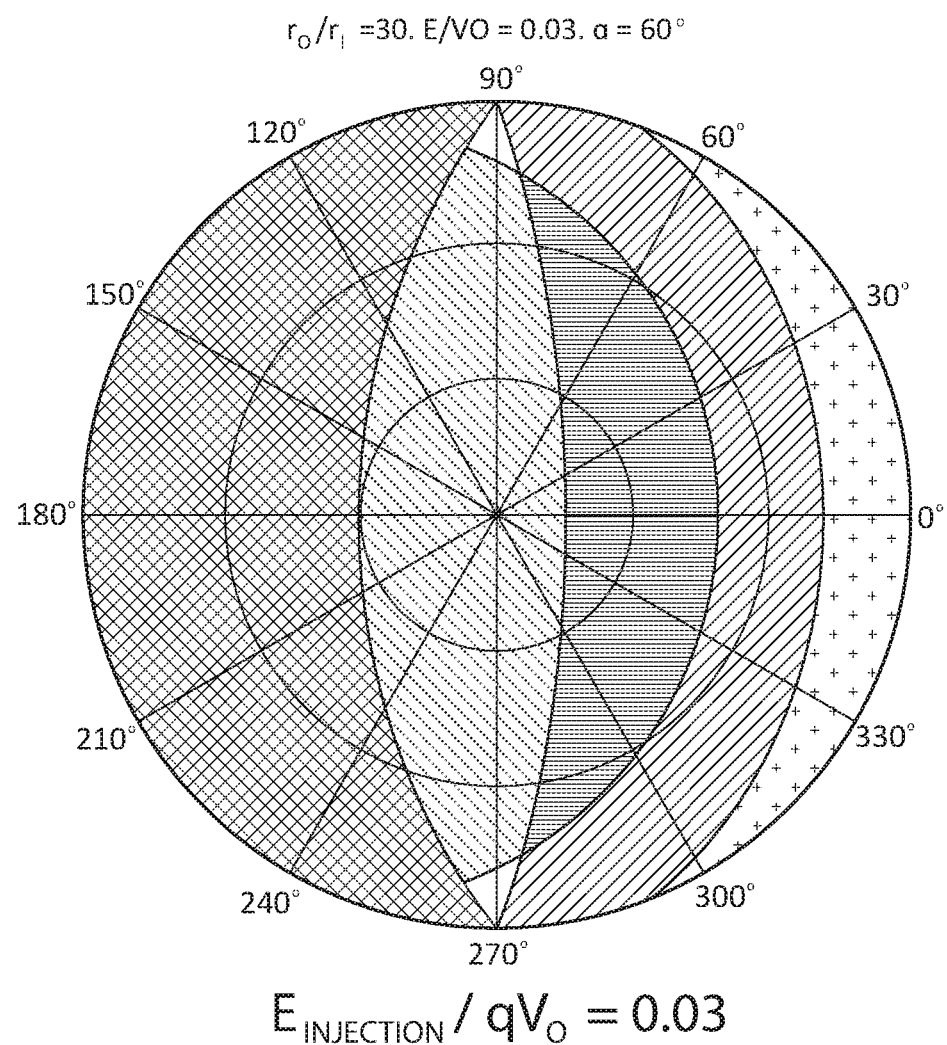
Figure 28C:
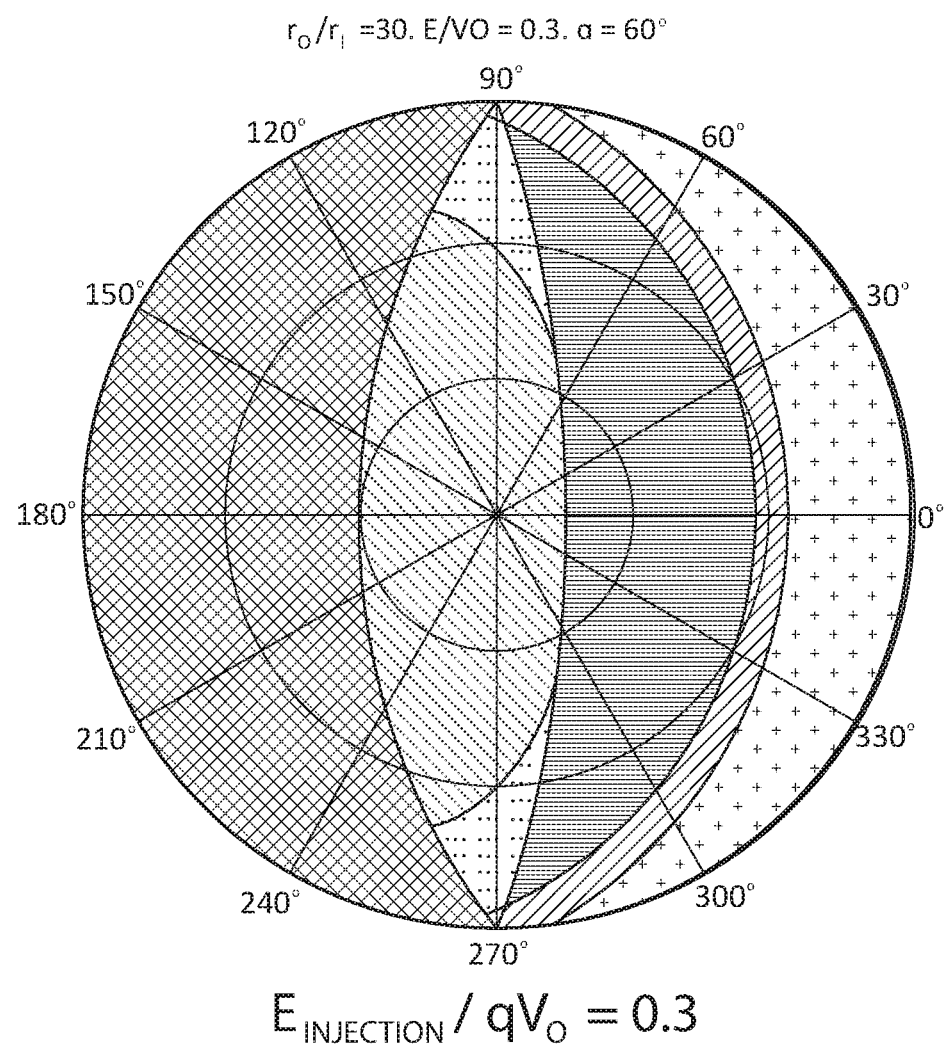

FIG. 27 shows the injection stability diagrams for an azimuthal angle, α, zero degrees from normal, along with electron position plots for different elevation angles. FIGS. 28A-28C show injection stability diagrams for an azimuthal angle, α, 60° from normal at different electron injection energies. The trajectories are of the following types: FIG. 28A—stable (wave), not confined at inner electrode 1504 (cross-hatched), not confined at outer electrode (diagonal), and forbidden (solid); FIG. 28B—stable (wave), not confined at inner electrode 1504 (cross-hatched), not confined at outer electrode (horizontal, diagonal, cross), and forbidden (solid); and FIG. 28C—stable (dot), not confined at inner electrode 1504 (cross-hatched), not confined at outer electrode (horizontal, diagonal, cross), and forbidden (wave).

From these calculations, the largest fraction of injected electrons in stable orbits occurs for electrons aimed at an azimuthal angle, α, of about 67° from normal and with electron energy between about 0.3% and about 3% of inner electrode bias voltage. The electron source may have a divergence half-angle of less than about 20° horizontally, but the electron beam source can be astigmatic with larger divergence in vertical direction.

Figure 29:
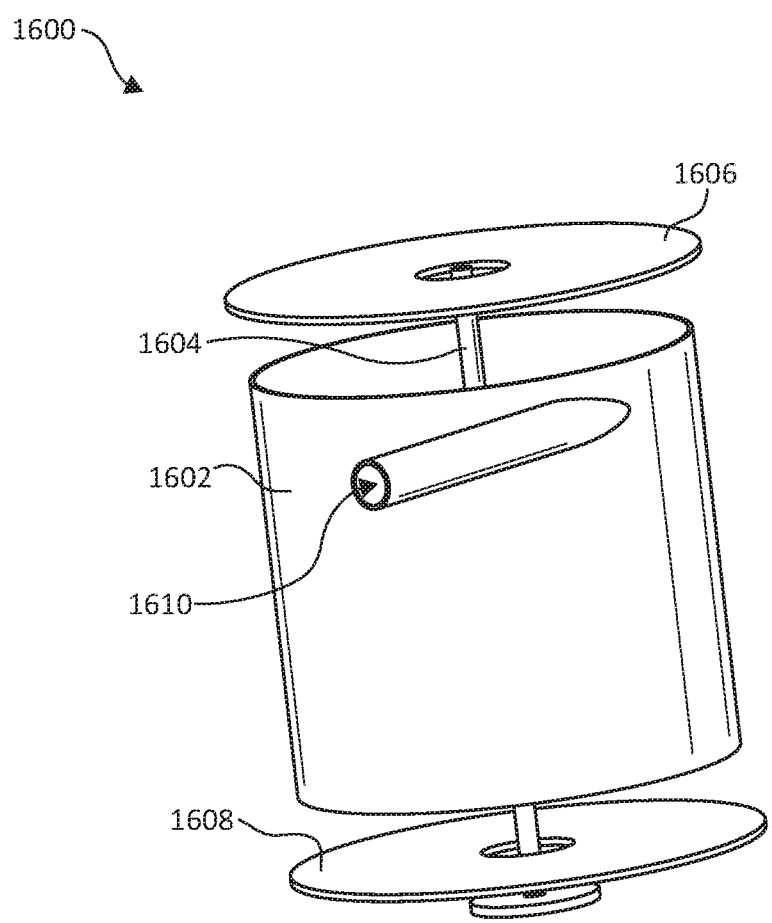
FIG. 29 is a rendered diagram of an ion example pump that includes a substantially cylindrical outer electrode.

Time of flight calculations were also performed for an ion pump with the geometry shown in FIG. 29. FIG. 29 is a rendered diagram of an example ion pump 1600 that includes a substantially cylindrical outer electrode 1602. Ion pump 1600 also includes an inner electrode 1604 positioned substantially at a central axis of substantially cylindrical outer electrode 1602, a top end cap 1606, a bottom end cap 1608, and an aperture 1610 through which electrons are injected into the inner volume of ion pump 1600. Substantially cylindrical outer electrode 1602 had a diameter of about 16 mm.

One of the factors that affects the TOF of the injected electrons is the distortion of the trapping electrostatic potential by the presence of aperture 1610 in outer electrode 1602. This distortion causes the electrons to slightly change their trajectory every time they move in close proximity of aperture 1610 until the orbit is deteriorated, causing the electrons to crash on either inner electrode 1604 or outer electrode 1602. Locating aperture 1610 near the end (e.g., top end or bottom end) of outer electrode 1602 and tangential to the circumference of outer electrode 1602 may reduce this distortion.

More detailed analysis of the modeling results shows that a majority of the electrons crash at the edges of outer electrode 1602 or escape at the gaps formed by outer electrode 1602 and end caps 1606 and 1608. One way to reduce the number of electrons that escape or crash at the edges is to slightly negative bias end caps 1606 and 1608, therefore pushing the electrons toward the center of outer electrode 1602.

An alternative solution to reducing escape of electrons from between was to modify the potential shape at the gaps formed by outer electrode 1602 and end caps 1606 and 1608 by rounding top portions and bottom portions of outer electrode 1602 toward the center axis of outer electrode 1602, as illustrated in FIG. 20. Results show that this geometry largely improves the TOF of the electrons by confining them away from gaps and end caps. Even though the electrons are better confined by the curvature of the top and bottom portions of outer electrode 1602, end caps 1606 and 1608 are still included for better electron TOF.

Figure 30A:
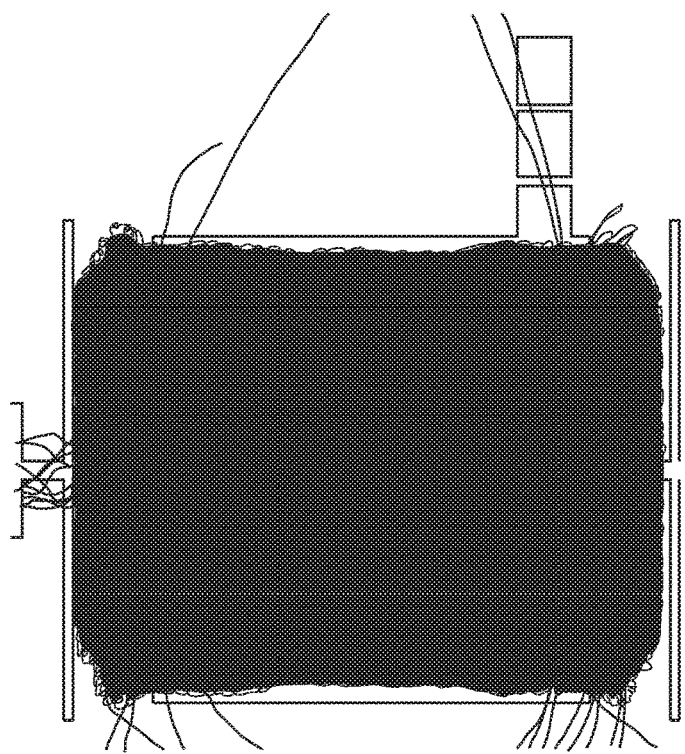
FIGS. 30A and 30B are conceptual diagrams illustrating simulation results for the spatial distribution on input electrons and initial trajectories of 1000 electrons, respectively, for the example ion pump of FIG. 30.
Figure 30B:
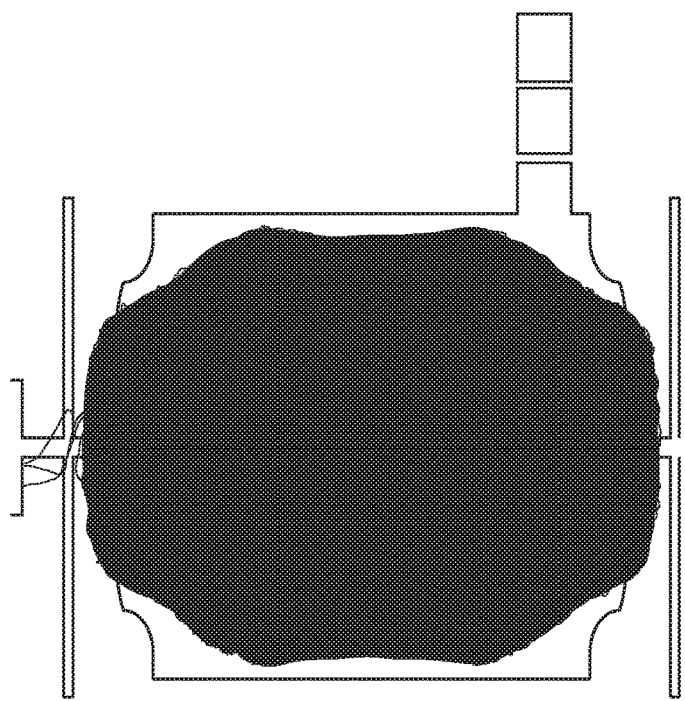

FIGS. 30A and 30B are diagrams showing the calculated electron orbits for two different outer electrode geometries: a cylindrical outer electrode like shown in FIG. 29 and a cylindrical outer electrode with rounded top and bottom portions like shown in FIG. 20, respectively. Rounding the top and bottom portions of the outer electrode improves the confinement of the electrons and minimizes the number of electrons escaping through the gap between the end caps and the outer electrode.

Figure 31A:
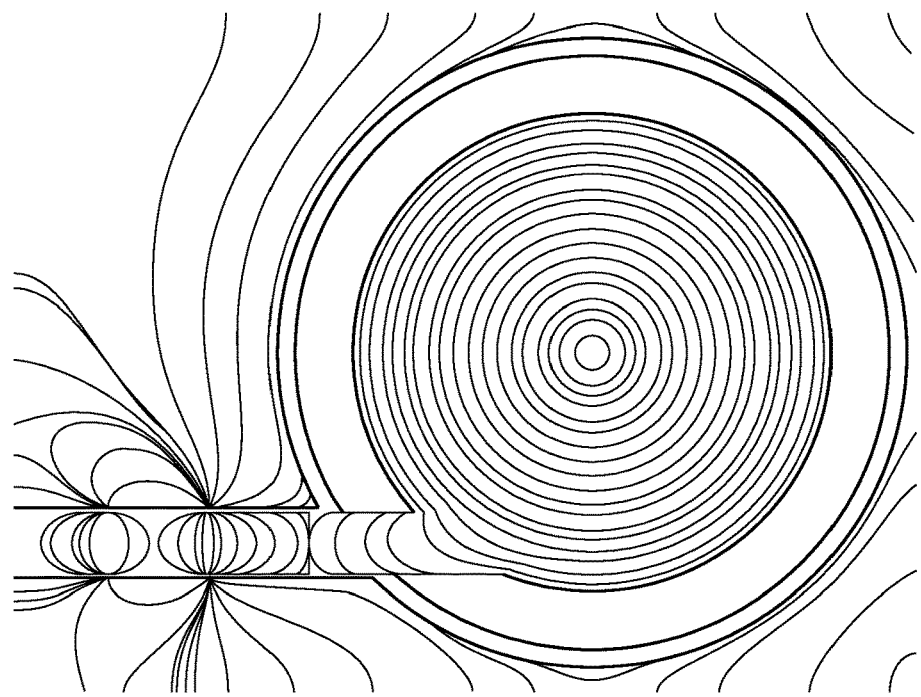
FIGS. 31A and 31B are diagrams showing the calculated electron orbits for two different outer electrode geometries: a cylindrical outer electrode like shown in FIG. 29 and a cylindrical outer electrode with rounded top and bottom portions like shown in FIG. 20, respectively.
Figure 31B:
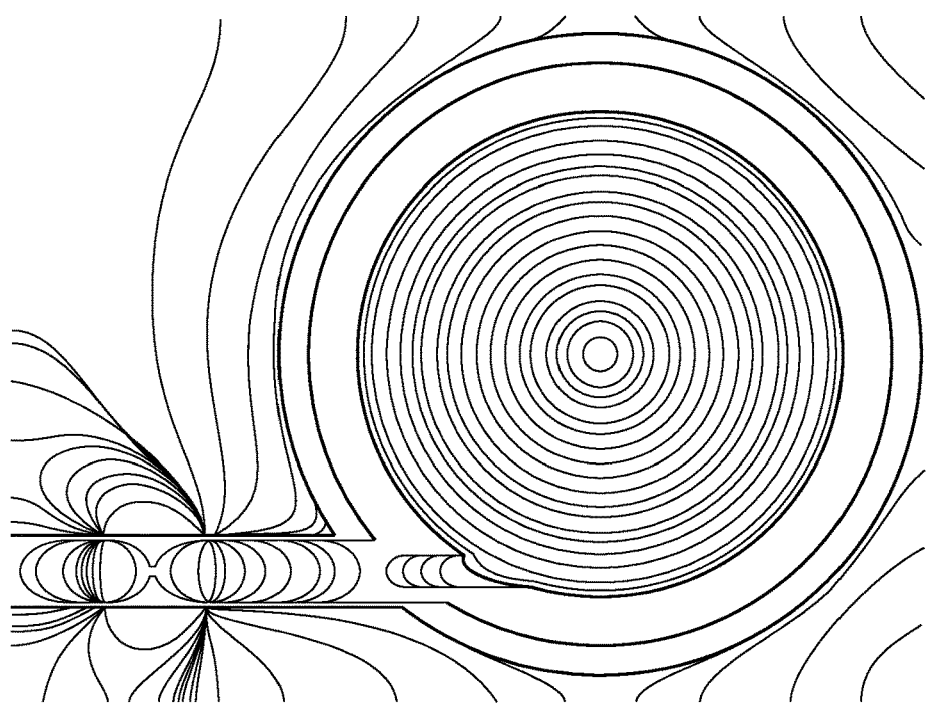

The entry aperture geometry also affects the TOF of the electrons. FIGS. 31A and 31B are diagrams showing the potential contour modeled by SIMION® for two different entry aperture sizes. FIG. 31A shows calculated potential contours for an entry aperture with a diameter of 1.6 mm, and FIG. 31B shows calculated potential contours for an entry aperture with a diameter of 0.8 mm, providing effective TOF ($\tau_{eff}$) of about 0.1 µs and about 0.5 µs respectively. As observed in FIGS. 31A and 31B, the potential is distorted (losing its radial symmetry) at the entry aperture. Detailed analysis of the electron orbits show that their trajectory is changed when electrons travel near the aperture after orbiting multiple times, to the point that the electrons will crash into the outer or inner electrode. Moving the entry aperture towards the end the outer electrode (closer to the bottom or top end cap) improves the effective TOF compared to an entry aperture positioned near the vertical center of the outer electrode.

Figure 32:
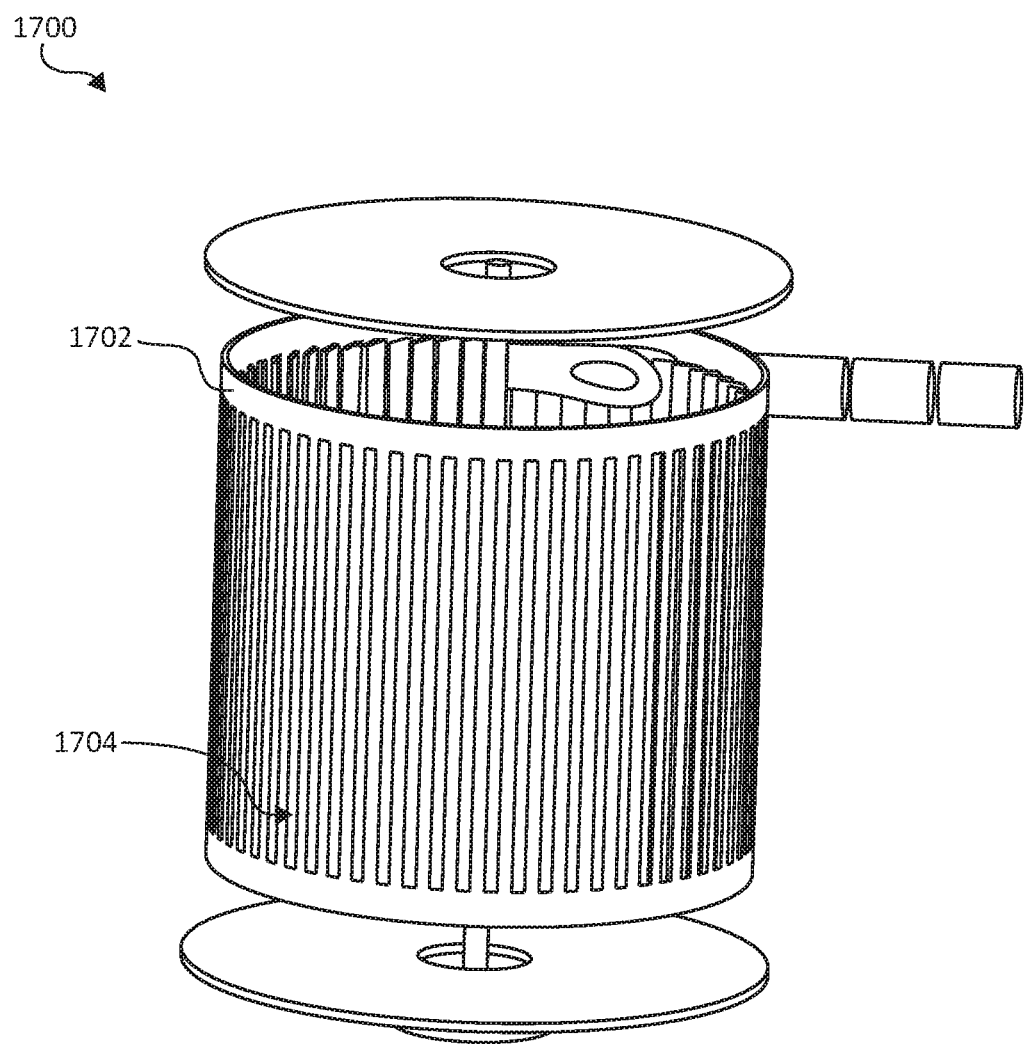
FIG. 32 illustrates an example ion pump that includes a substantially cylindrical outer electrode that includes a plurality of fins.
Figure 33:
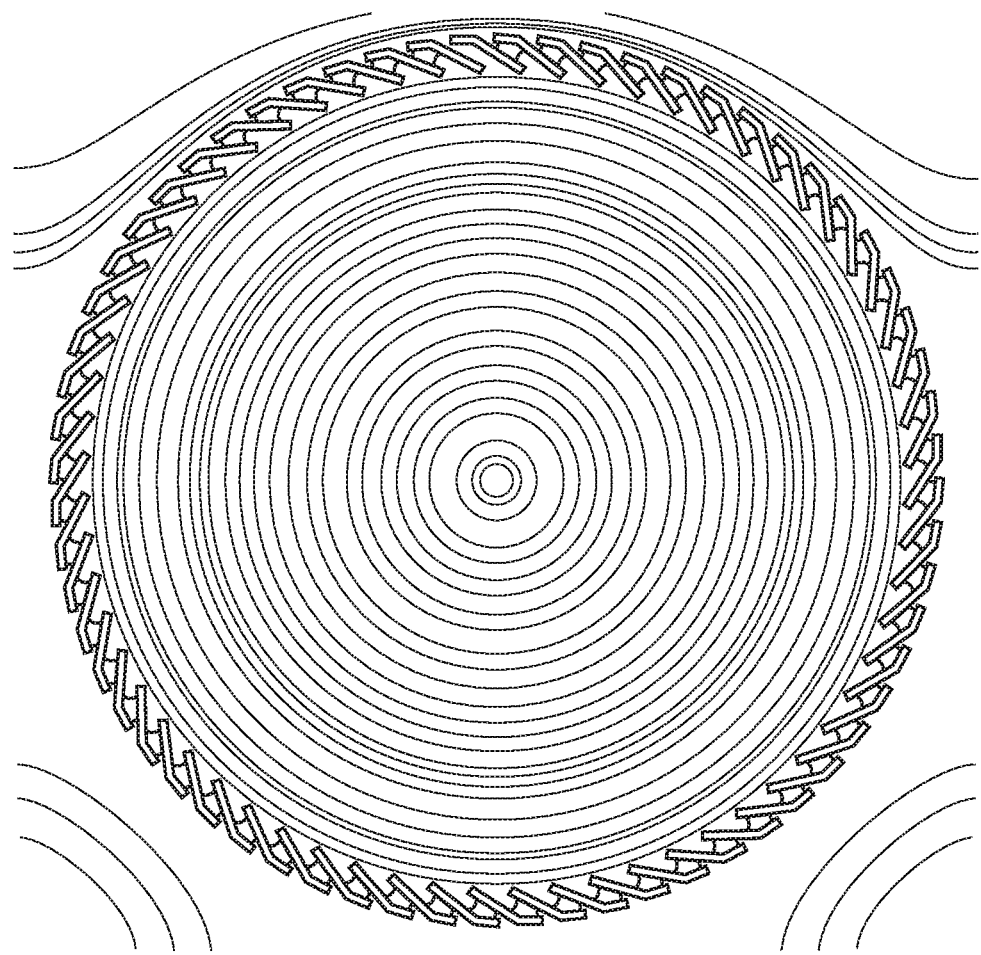
FIG. 33 shows calculated potential contours for an outer electrode that includes a finned geometry.

As describe elsewhere herein, to reduce or substantially minimize re-emission of previously pumped inert gases (such as helium) from the subsurface of the outer electrode due to ion re-sputtering, the outer electrode may have a finned structure. The first model was performed with the finned geometry shown in FIG. 32. FIG. 32 illustrates an example ion pump 1700 that includes a substantially cylindrical outer electrode 1702 that includes a plurality of fins 1704. Modeling results show that the electron trajectory is affected by the presence of the fins when the electrons travel very close to outer electrode 1702. FIG. 33 shows calculated potential contours for an outer electrode that includes a finned geometry. FIG. 33 shows that these potential contours change shape from a substantially perfect circle to an undulated configuration near the outer electrode. By varying the number of fins, it is possible to change the frequency of these undulations. Outer electrodes that includes fins and rounded upper and lower portions show similar undulating potential counters near the fins of the outer electrode.

A parameter analysis was performed for magnet-free ion pumps using SIMION® for the pump configuration shown in FIG. 20 for 16-mm and 6-mm diameters for outer electrode 1202, addressing the pump scaling from cm to mm dimensions (pump volumes from 16 cm$^3$ to 0.4 cm$^3$). Results show that scaling in size is feasible. This is an indication that the pumping speed of the magnet-free ion pump is mainly driven by the externally injected current rather than the pump electrode volume.

Figure 34:
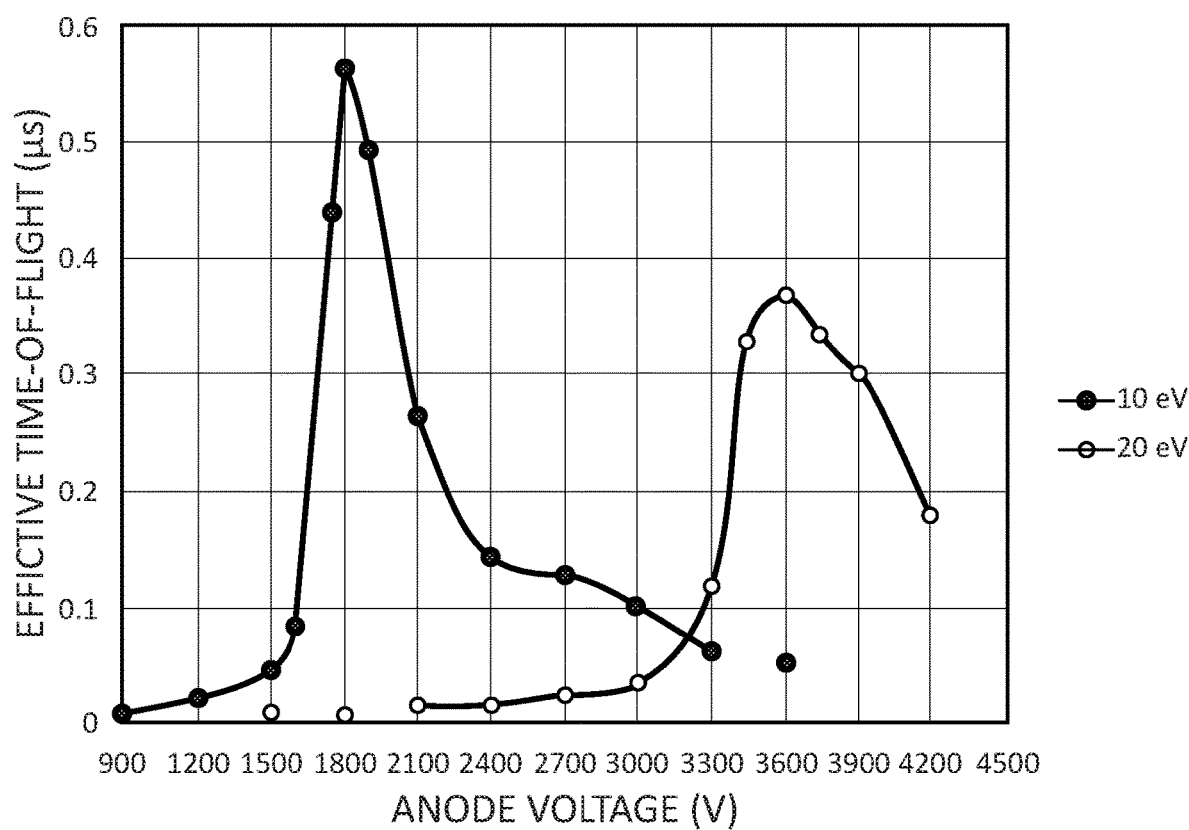
FIGS. 34 and 35 are plots illustrating the effective TOF for two electron injection energies: 10 eV and 20 eV (0.5 eV full width at half maximum (FWHM) distribution) and with no electron beam divergence for 16-mm and 6-mm outer electrode diameters, respectively, and the geometry shown in FIG. 21, respectively.
Figure 35:
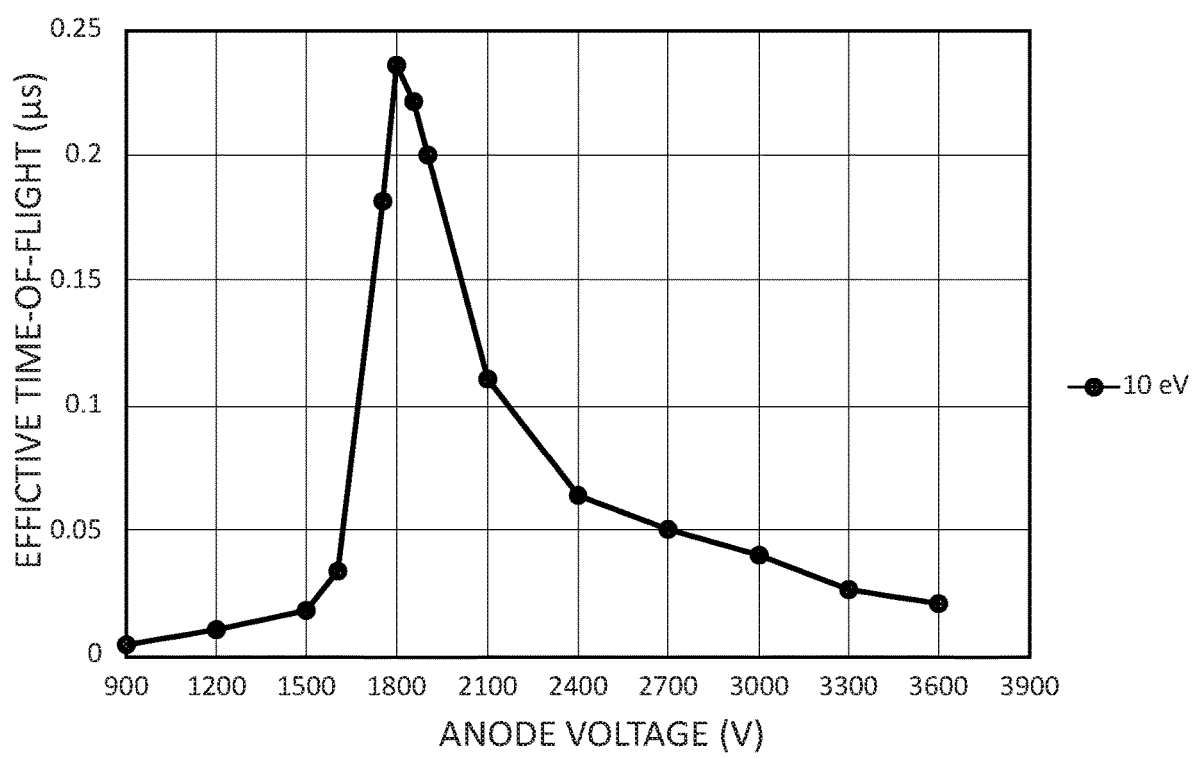

Effects of inner electrode voltage and different electron injection energies on effective electron TOF were calculated using SIMION®. FIGS. 34 and 35 are plots illustrating the effective TOF for two electron injection energies: 10 eV and 20 eV (0.5 eV full width at half maximum (FWHM) distribution) and with no electron beam divergence for 16-mm and 6-mm outer electrode diameters, respectively, and the geometry shown in FIG. 20, respectively. Results show that the useful inner electrode voltage depends on the energy of the injected electrons, obtaining the improved results for an electron energy of 10 eV and an anode voltage of 1800 V (left-hand curve in FIG. 34 and curve in FIG. 35). For the 16-mm outer electrode diameter, whose results shown in FIG. 34, a variation of 10% of effective TOF of the electrons corresponds to a variation from 1740 V to 1920 V of the anode voltage, showing tolerance for variations of the anode power supply voltage.

Results for 16-mm and 6-mm outer electrode diameters show that the peak effective TOFs at about 1800 V inner electrode voltage are about 0.57 µs and about 0.24 µs, respectively, indicating that the performance of the 6-mm outer electrode diameter is about 42% of the 16-mm diameter.

Figure 36:
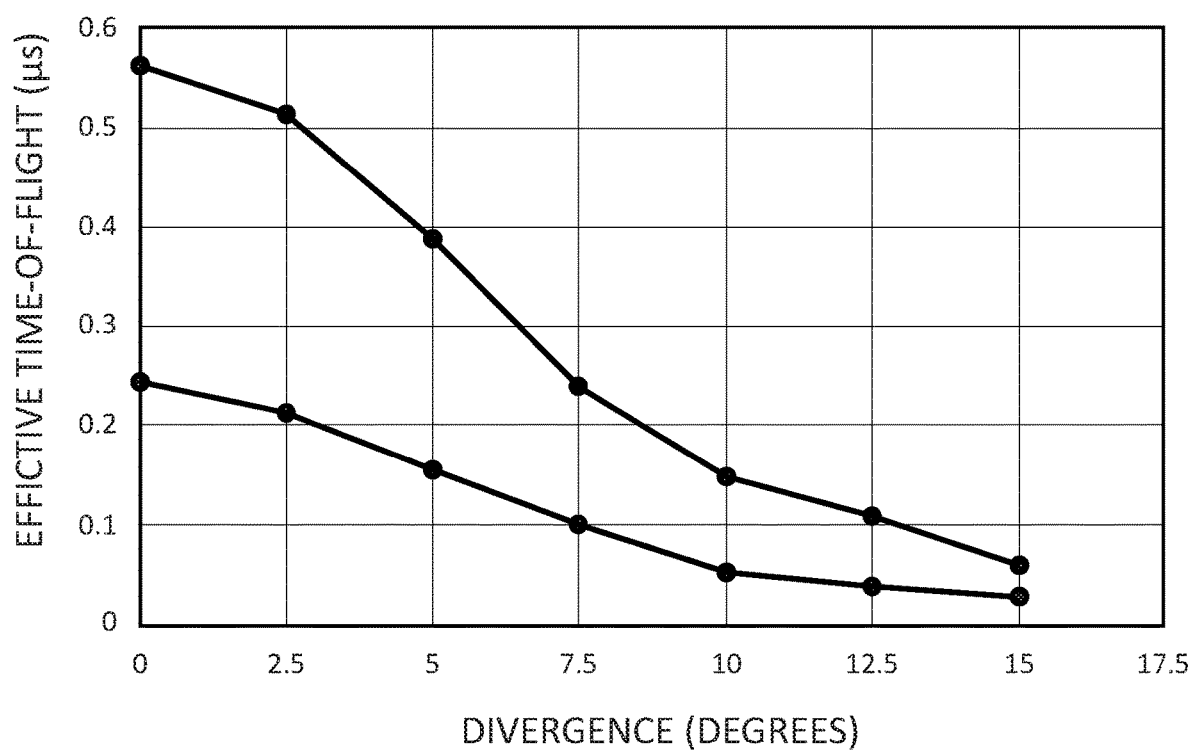
FIG. 36 is a plot illustrating calculated, effective electron TOF as a function of electron beam divergence (half angle) for an inner electrode voltage of 1800 V and an electron injection energy of 10 eV for example ion pumps having the geometry shown in FIG. 20 and 16-mm and 6-mm outer electrode diameters, respectively.

FIG. 36 is a plot illustrating calculated, effective electron TOF as a function of electron beam divergence (half angle) for an inner electrode voltage of 1800 V and an electron injection energy of 10 eV for example ion pumps having the geometry shown in FIG. 210 and 16-mm and 6-mm outer electrode diameters, respectively. FIG. 36 shows that for 2.5 degrees (half angle) divergence, there is a 10% variation of the effective TOF of the electrons. Some Spindt cathode e-beam sources have a half angle divergence of 15 degrees, indicating that some level of electron beam focusing may be beneficial for improved electron TOF performance. However, for applications with less stringent pumping speed requirements, it may be possible to accept reduced performance for the simplicity of using a Spindt cathode without a focusing electrode.

Figure 37:
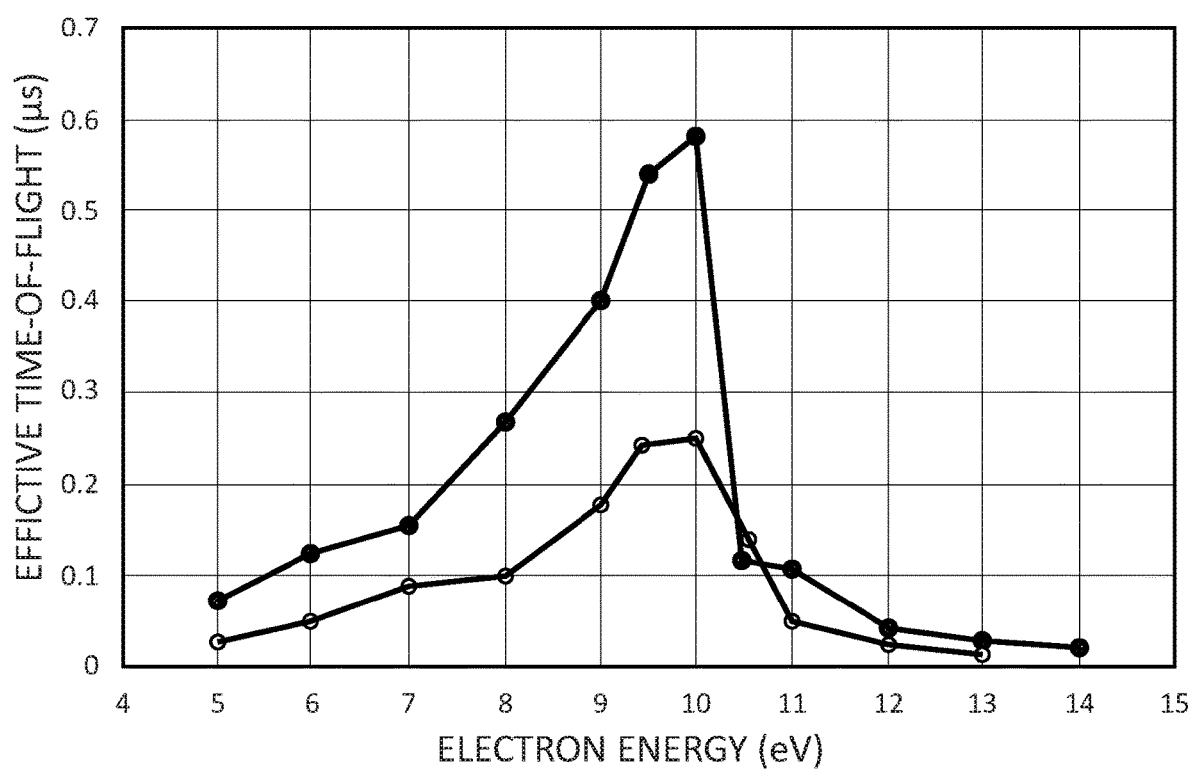
FIG. 37 is a plot of the calculated, effective electron TOF as a function of the electron beam injection energy for an inner electrode voltage of 1800 V and no electron beam divergence for example ion pumps having the geometry shown in FIG. 20 and 16-mm and 6-mm outer electrode diameters, respectively.

Effective TOF of electrons as a function of electron injection energy for fixed inner electrode voltage was also calculated. FIG. 37 is a plot of the calculated, effective electron TOF as a function of the electron beam injection energy for an inner electrode voltage of 1800 V and no electron beam divergence for example ion pumps having the geometry shown in FIG. 20 and 16-mm and 6-mm outer electrode diameters, respectively. FIG. 37 indicates that the electron injection energy benefits from a tighter control (+/−0.5 eV) for optimum operation of the current modeled structure. Spindt cathode electron beam sources have an energy spread of less than 1 eV, therefore accomplishing this control.

The design of an example magnet-free ion pump was guided by modeling using SIMION® as described above. The design philosophy for the example ion pump was to: 1) utilize known fabrication methods for efficient pump construction; and 2) use similar materials and components, including glass and silicon wherever possible, that would be implemented in a commercial effort. The pump glass and silicon parts were machined using high-speed diamond cutter micromachining and assembled by anodic bonding. FIGS. 38-41 show the magnet-free ion pump at different stages of the assembly process.

Figure 38:
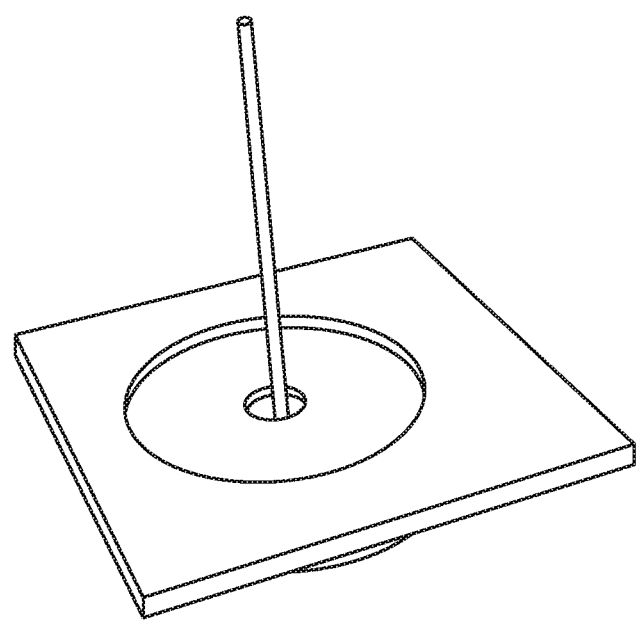
FIGS. 38-41 are diagrams showing an example magnet-free ion pump at different stages of an assembly process.

FIG. 38 is a diagram showing a partial assembly of an inner electrode 1802 and a titanium end cap 1804. A silicon substrate 1806 is used to support inner electrode 1802 and outer electrode 1808 (FIG. 39); however, at the same time silicon substrate 1806 has the function of an electrical feedthrough to provide the required potentials to the electrodes 1802 and 1808. Silicon substrate 1806 may be a very low-resistivity (less than about 0.003 Ω–cm) silicon wafers with selective metallization to form ohmic contacts. Electrical isolation between feedthroughs is accomplished by glass layers. In the example illustrated in FIGS. 38-41, silicon substrate 1806 measures about 25.4 mm on a side.

Figure 39:
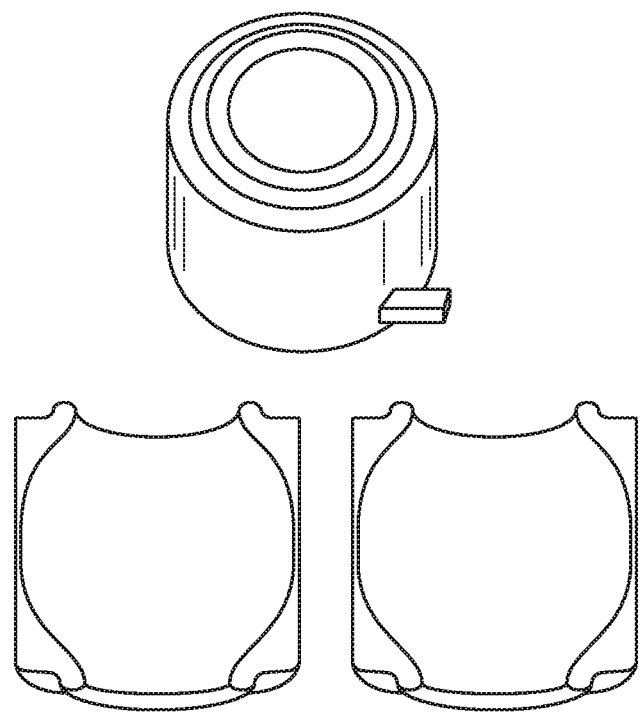
Figure 40:
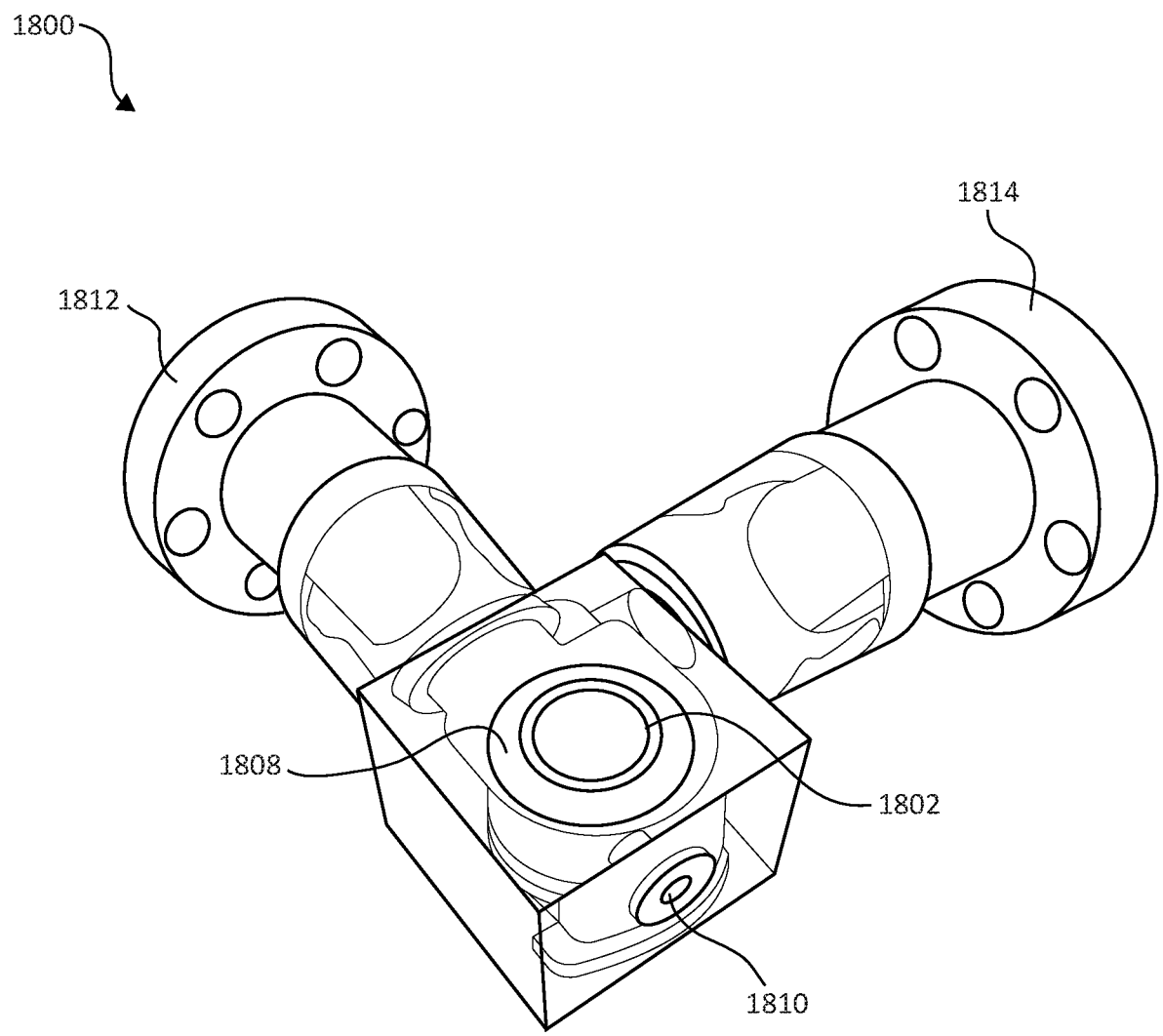
Figure 41:
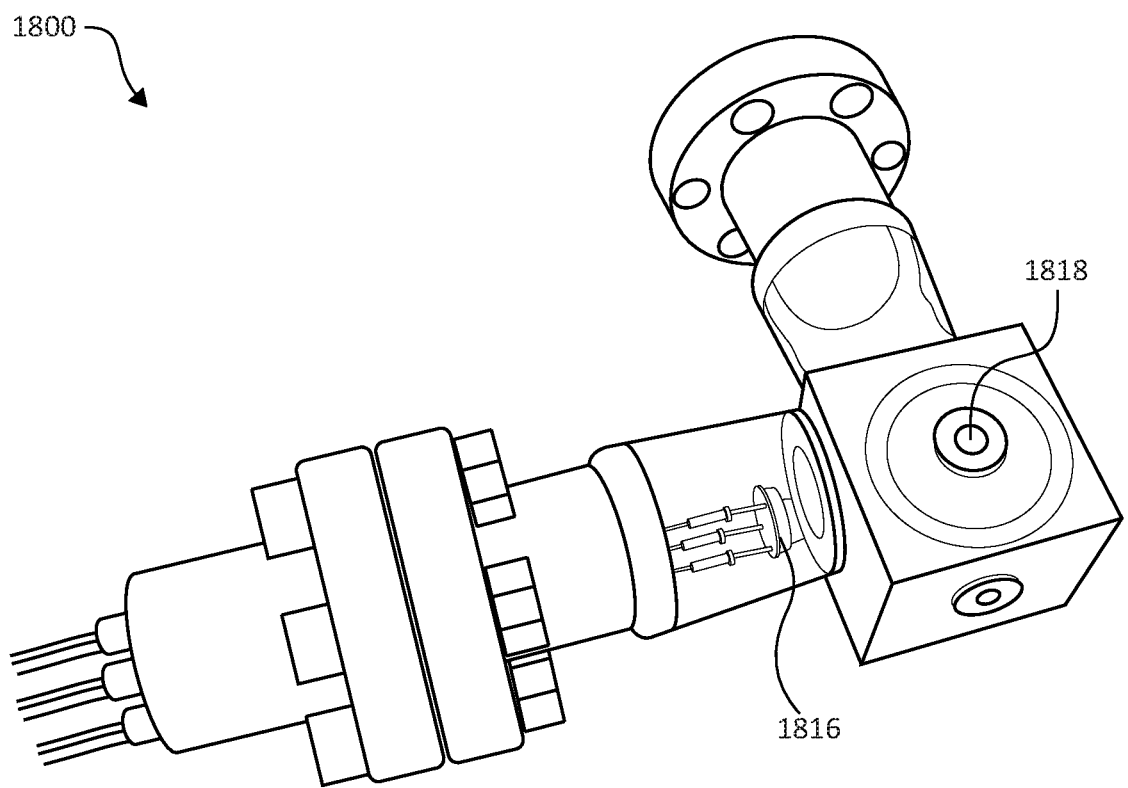

The example ion pump was fabricated using a solid outer electrode, like that illustrated in FIG. 20. FIG. 39 is diagram showing outer electrode 1808 fabricated by 3D printing of titanium. The bottom half of FIG. 39 shows outer electrode 1808 spit in half height-wise. As seen in FIG. 39, the inner wall of outer electrode 1808 curved toward a central axis of outer electrode 1808 near the top and bottom of outer electrode 1808. FIG. 40 shows the inner workings of ion pump 1800 before the final anodic bonding seal, including inner electrode 1802, outer electrode 1808, and an outer electrode feed-through 1810. Outer electrode feed-through is a side silicon feedthrough that is spring-loaded against the electrode. For this prototype, outer electrode 1808 was machined from titanium round stock. Ion pump 1800 was connected to other components of a system using glass metal transitions 1812 and 1814 with CF 1.33-inch flanges for pumping and Spindt cathode e-beam source ports. FIG. 41 shows the fully assembled pump, including the Spindt cathode e-beam source 1816 and inner electrode high voltage feed-through 1818.

Figure 42:
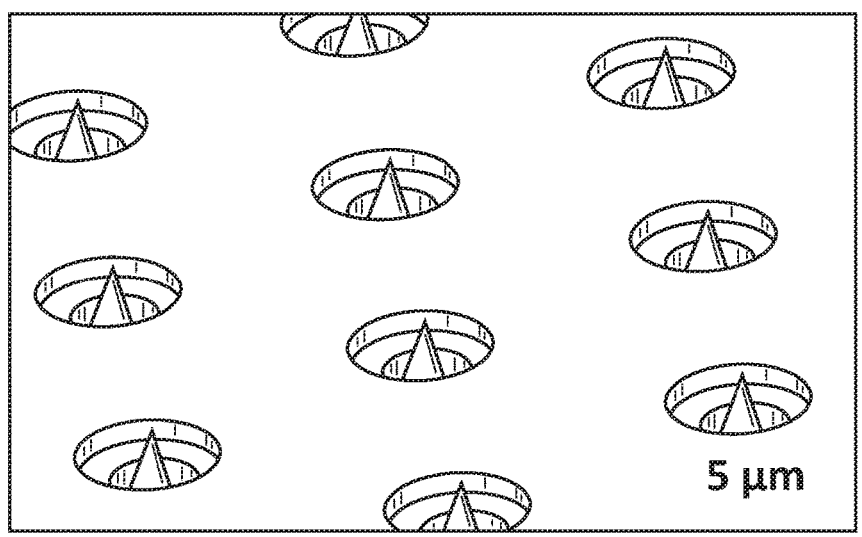
FIG. 42 shows a diagram of Spindt cathode e-beam sources.
Figure 43:
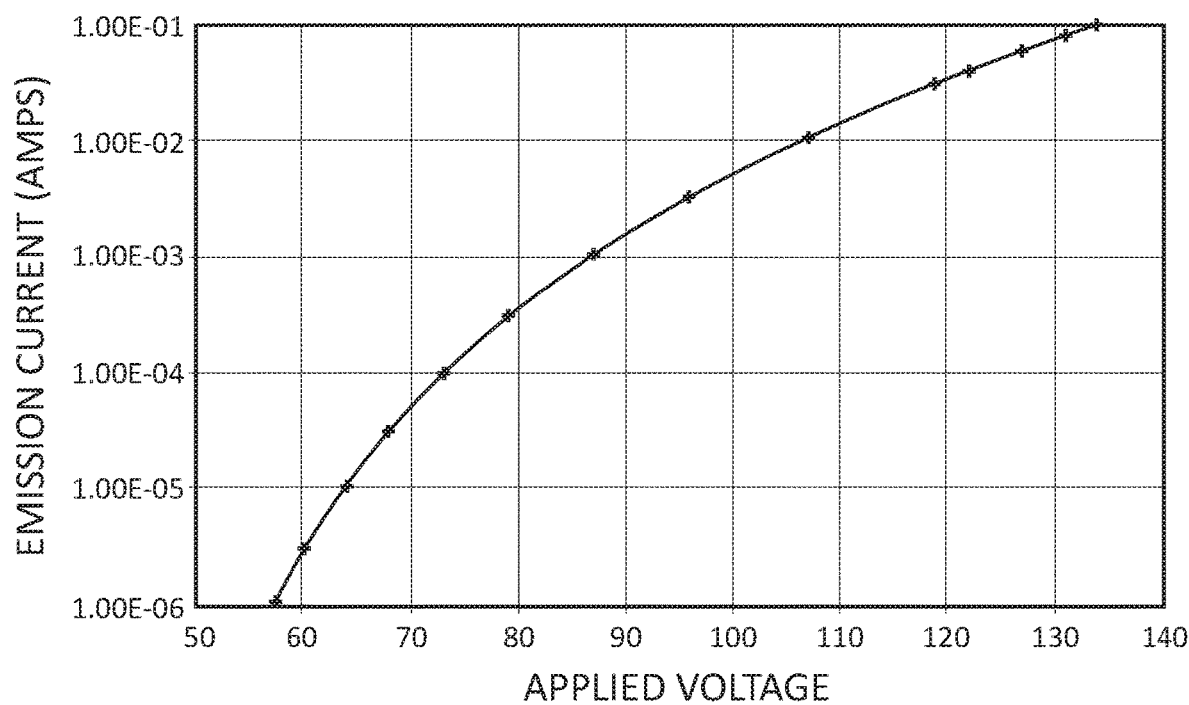
FIG. 43 is a plot showing the I-V characteristics of the Spindt cathode e-beam sources.

FIG. 42 shows a diagram of Spindt cathode e-beam sources fabricated using conventional processes with a 1-mm diameter emission area and an emission density of about 10 A/cm$^2$. The Spindt cathode e-beam sources were mounted on a TO-5 header for providing mechanical support and electrical connections. FIG. 43 is a plot showing the I-V characteristics of the Spindt cathode e-beam sources. The Spindt cathode e-beam sources may be operated at voltages between 60V and 80 V in some examples.

The example ion pump was mounted into a pumping speed test apparatus and vacuum processed. The example ion pump was first tested for operation by forming a helium plasma that can be directly imaged using a CCD camera for pressures greater than about 10$^{-5}$ torr. The pump characterization and pumping speed measurements were performed by directly measuring changes in pressure in a test chamber. A more sensitive detector was implemented to measure plasma intensities for very low pressures (as low as 10$^{-9}$ torr). The detector consisted of a miniature photomultiplier (available from Hamamatsu Photonics, K.K., Hamamatsu City, Shizuoka, Japan) that is directly positioned next to an aperture on a side of the example ion pump. Finding a correlation between plasma intensity and pressure proved not to be reliable; therefore, the characterization was performed by direct pressure measurements.

Figure 44:
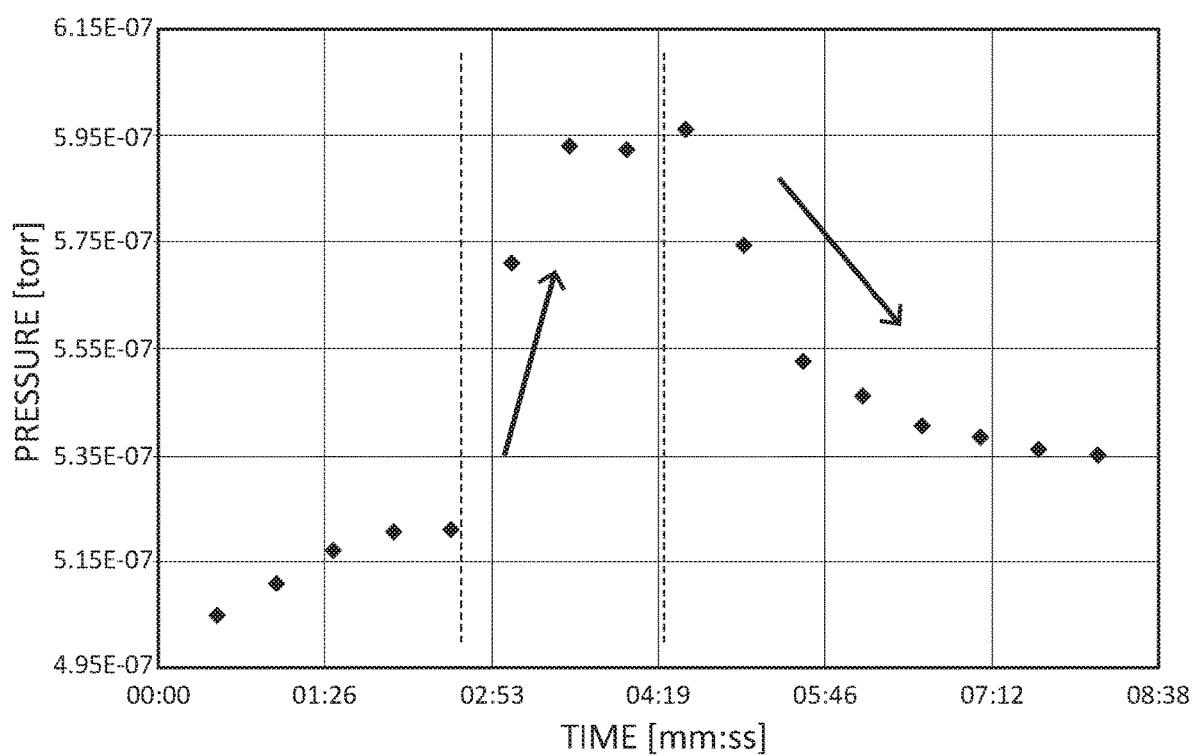
FIG. 44 is a plot of pressure versus time illustrating the first observation of pumping for nitrogen background gas.

FIG. 44 is a plot of pressure versus time illustrating the first observation of pumping for nitrogen background gas. In this experiment, the changes in pressure (measured by an ion gauge) of the test chamber were monitored when the pump was turned "on" and "off". For this experiment, the pump was operating for at least an hour with an injected current of 24 μA. The operating pressure was set to about 5×10' torr. At the time indicated in FIG. 44 by line 1902, the pump was turned "off", and there was a pressure rise in the test chamber. In this case the "off" state of the pump was attained by reducing the inner electrode voltage, leaving the e-beam source still on. After more than a minute, the pump was turned "on", as indicated by line 1904 and there was a pressure drop giving a clear indication of pumping. This experiment was repeated multiple times for reproducibility. The injection current and electrode potentials were not optimized in these experiments.

Figure 45:
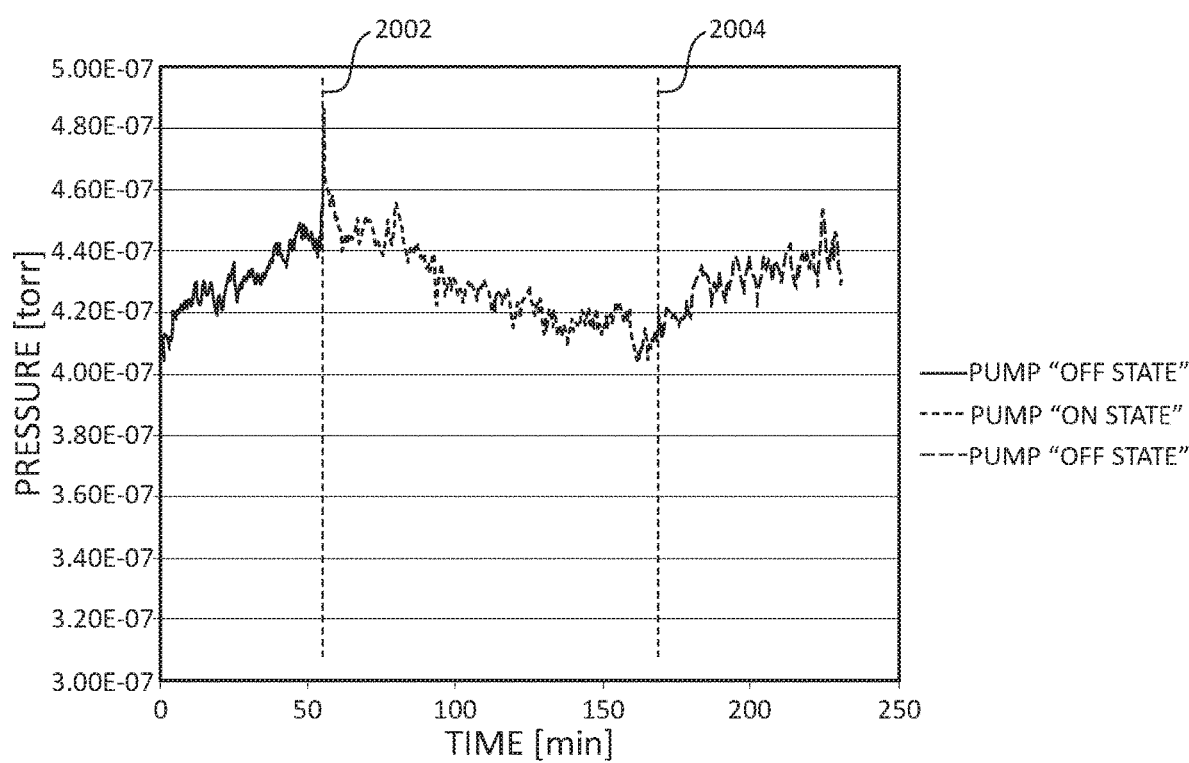
FIG. 45 is a plot of pressure versus time illustrating pumping of helium gas from an example ion pump.

The pumping chamber was then backfilled with helium and pumping demonstrated, as shown in FIG. 45. FIG. 45 is a plot of pressure versus time illustrating pumping of helium gas from an example ion pump. For this particular experiment, the measured pressures were "nitrogen equivalent pressures". The nominal correction factor for helium is 0.18. The pumping speed was measured using the same procedure as above by turning the pump "on" and "off" at times represented by lines 2002 and 2004, respectively. Various experimental results showed better pumping speed performance than predicted by the model with a non-optimized pump. In the experiments, the test chamber volume was approximately 350 cm$^3$. The pumping speed was measured to be as high as about 0.3 ml/s for injected current of about 11 μA and power consumption of about 15 mW considering electrons injected into the pump body. Typical operating voltages for the example pump were inner electrode voltage 2.4 kV to 3.3 kV, Spindt cathode voltage of 60 V to 80 V. For comparison with the calculated values for an injection current of 10 μA, the calculated pumping speed is about 0.005 ml/s. The larger measured pumping speed indicates the presence of other physical mechanisms that benefit the pumping speed, such as secondary electrons, that were not included in the initial model.

Figure 46:
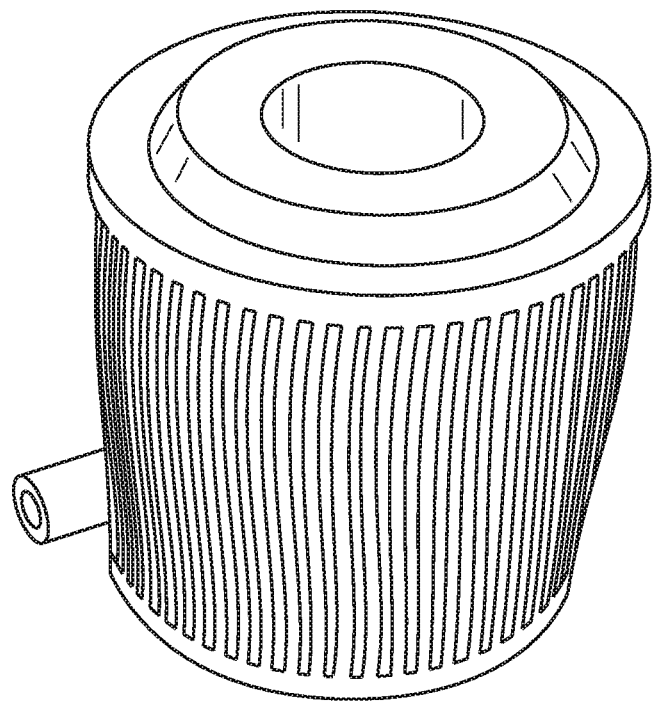
FIGS. 46 and 47 are diagrams of an example as-fabricated design of a finned outer electrode.
Figure 47:
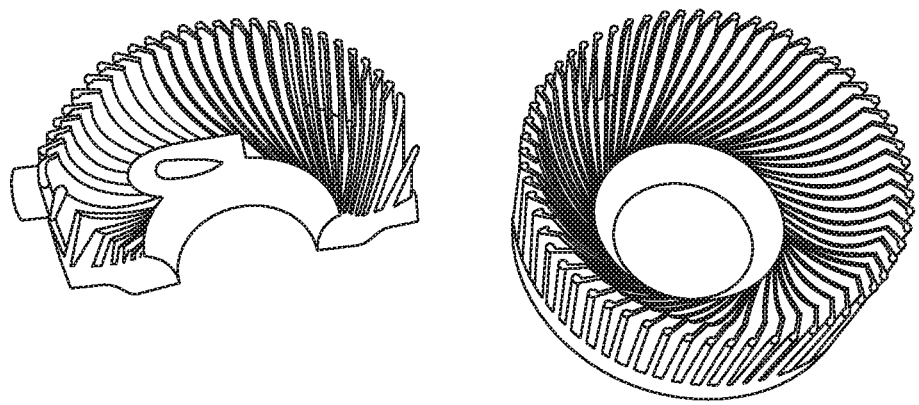

An example ion pump with a finned outer electrode configuration was fabricated using 3D printing of titanium (by GPI Prototype & Manufacturing Services, Lake Bluff, Ill.). FIGS. 46 and 47 are diagrams of one of the designs of the finned outer electrode, with FIG. 46 showing the electrode as 3D-printed and FIG. 47 showing the cross-sections. In addition to the fins, the upper and lower portions of the finned outer electrode are rounded to improve the electron confinement, as described above.

To explore the limits of the 3D printing regarding the minimum feature size, four different variations of the outer electrode geometry were designed. Features as small as about 75 μm have been successfully printed.

Outer electrodes of various dimensions may be fabricated by 3D printing. For example, a finned outer electrode may have an outer diameter of about 16 mm and a pump volume of about 16 cm$^3$; an outer diameter of about 9 mm and a pump volume of about 1 cm$^3$; or an outer diameter of about 6 mm and a pump volume of about 0.4 cm$^3$.

Figure 48:
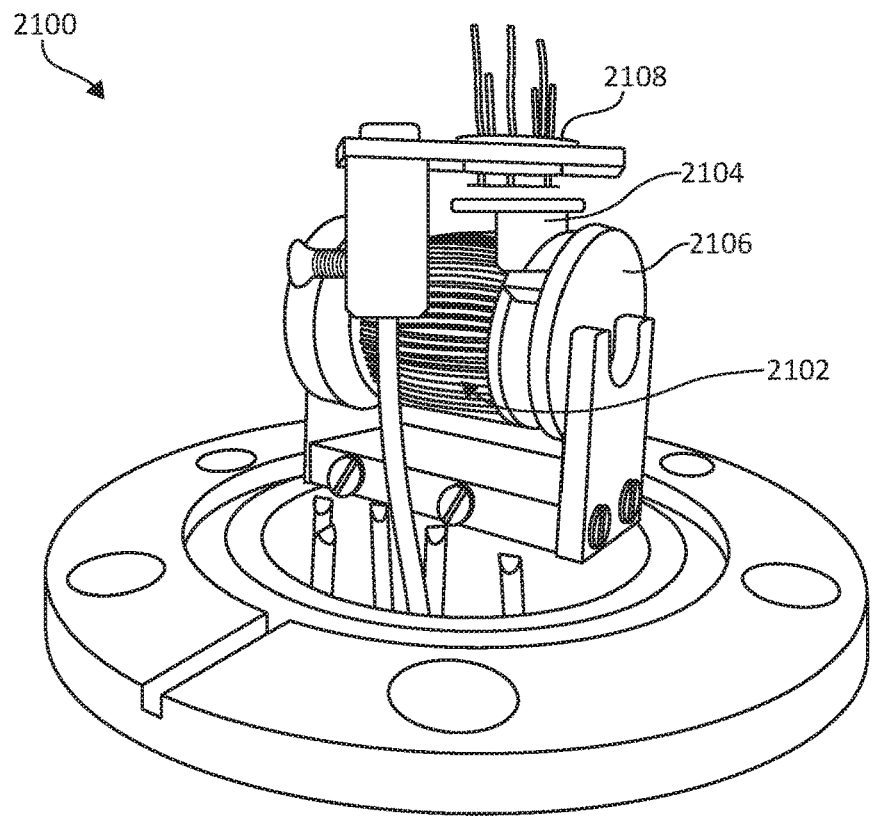
FIGS. 48 and 49 are diagrams of the example fabricated magnet-free ion pump that includes a finned outer electrode.
Figure 49:
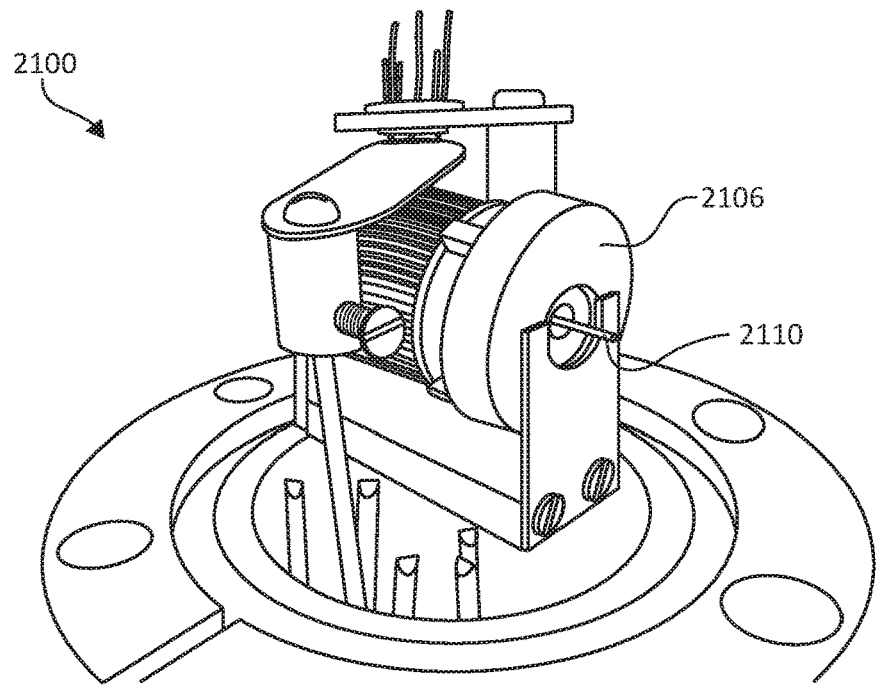
Figure 50:
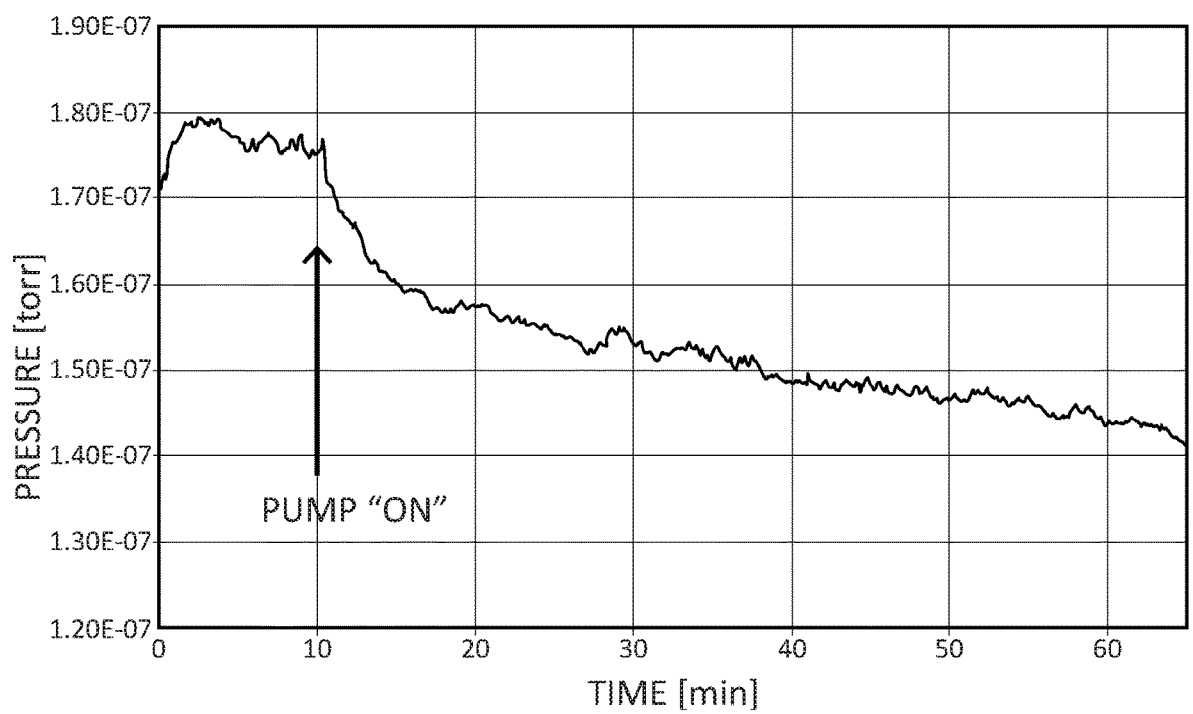
FIG. 50 is a plot of pressure versus time illustrating pumping using the example magnet-free ion pump of FIGS. 58 and 59.

An example magnet-free ion pump with a finned outer electrode configuration was fabricated and tested. FIGS. 48 and 49 are diagrams of the example fabricated magnet-free ion pump 2100 that includes a finned outer electrode 2102. Magnet-free ion pump 2100 also includes an electron beam injection port 2104, an end cap 2106, a Spindt cathode electron beam source 2108, and an inner electrode 2110. The outer diameter of finned outer electrode 2102 was 16 mm. In some examples, voltage applied to inner electrode 2110 may be about 2.4 kV, voltage applied to finned outer electrode 2102 may be about 16 V, voltage applied to aperture 2104 may be about 150 V, and voltage applied to Spindt cathode electron beam source 2108 may be about 65 V. Magnet-free ion pump 2100 was mounted on a CF 2.75" flange, and it is attached to the pump test station. FIG. 50 is a plot of pressure versus time illustrating pumping using magnet-free ion pump 2100.

Figure 51:
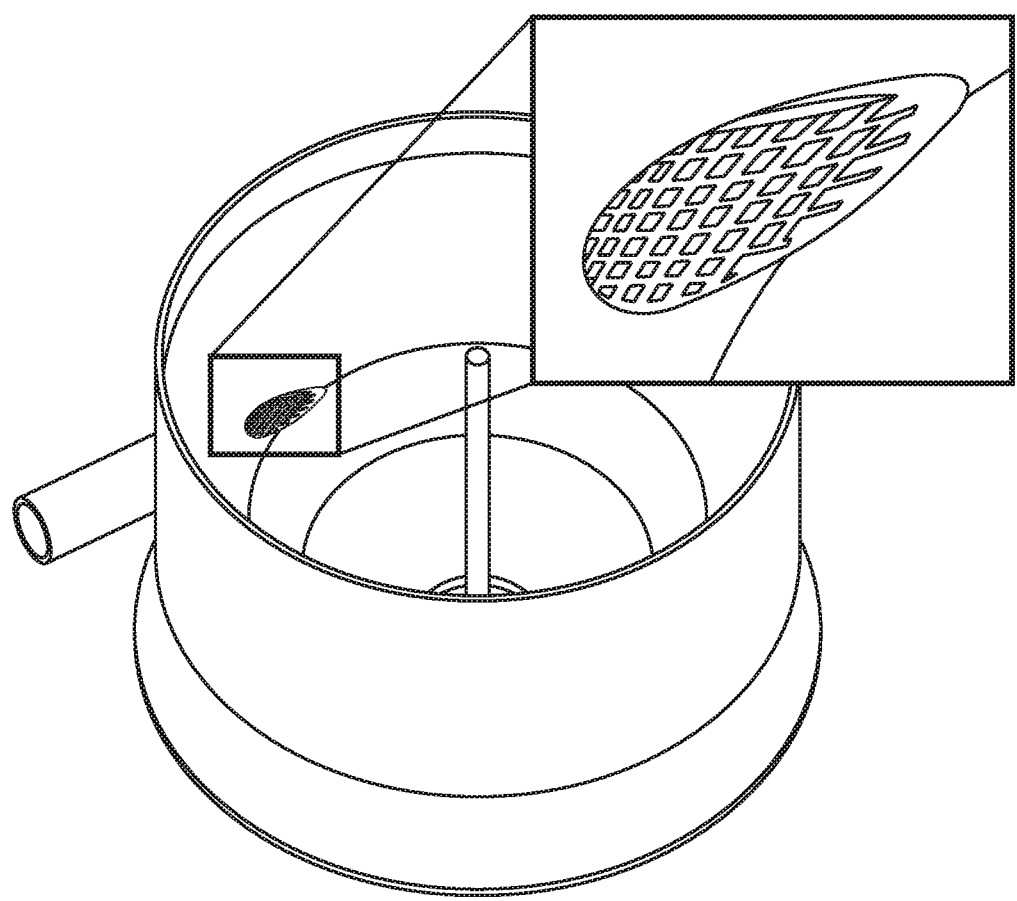
FIG. 51 is a rendered diagram of a pulsed pump configuration that is the same as a continuous electron beam magnet-free ion pump but with an additional mesh element located at the input aperture that forms an electron shutter.

Pulsed injection of the electron beam combined with an electron shutter may provide orders of magnitude improvement in the effective electron time of flight, $\tau_{eff}$, of the electrons orbiting in a magnet-free ion pump. Augmented by the duty cycle, the system trade shows the possibility for enhanced performance and lower magnet-free ion pump size, weight, and power in this configuration. FIG. 51 is a rendered diagram of a pulsed pump configuration that is the same as a continuous electron beam magnet-free ion pump but with an additional mesh element located at the input aperture that forms an electron shutter. The mesh is connected to a voltage source. The voltage on the mesh is switched from the outer electrode potential to a higher positive potential ($V_{mesh}$) to provide the electron shuttering action. The operation of this pulsed scheme is as follows.

First, during the electron injection process, the mesh is biased with a positive potential, accelerating the electrons toward the mesh and injecting them into the internal volume of the pump. Once the electrons have been injected into orbits, the mesh is switched to the same potential as the outer electrode, making the aperture substantially invisible to the orbiting electrons. The Spindt cathode electron beam source is also turned off after electron injection. Modeling results in SIMION® show values of the effective time of flight, $\tau_{eff}$, of the electrons at up to 750 μs for a 0.15-μs injection time duration and a potential of 75 V at the mesh; this is compared to values of $\tau_{eff}$ that are about 1 μs for the continuous electron beam. SIMION® modeling showed that a limiting mechanism for continuous injection operation is the field perturbation due to the electron injection aperture. Operating in pulsed mode with a mesh over the aperture allows for effective removal of this perturbation, allowing for much longer electron TOF.

Figure 52:
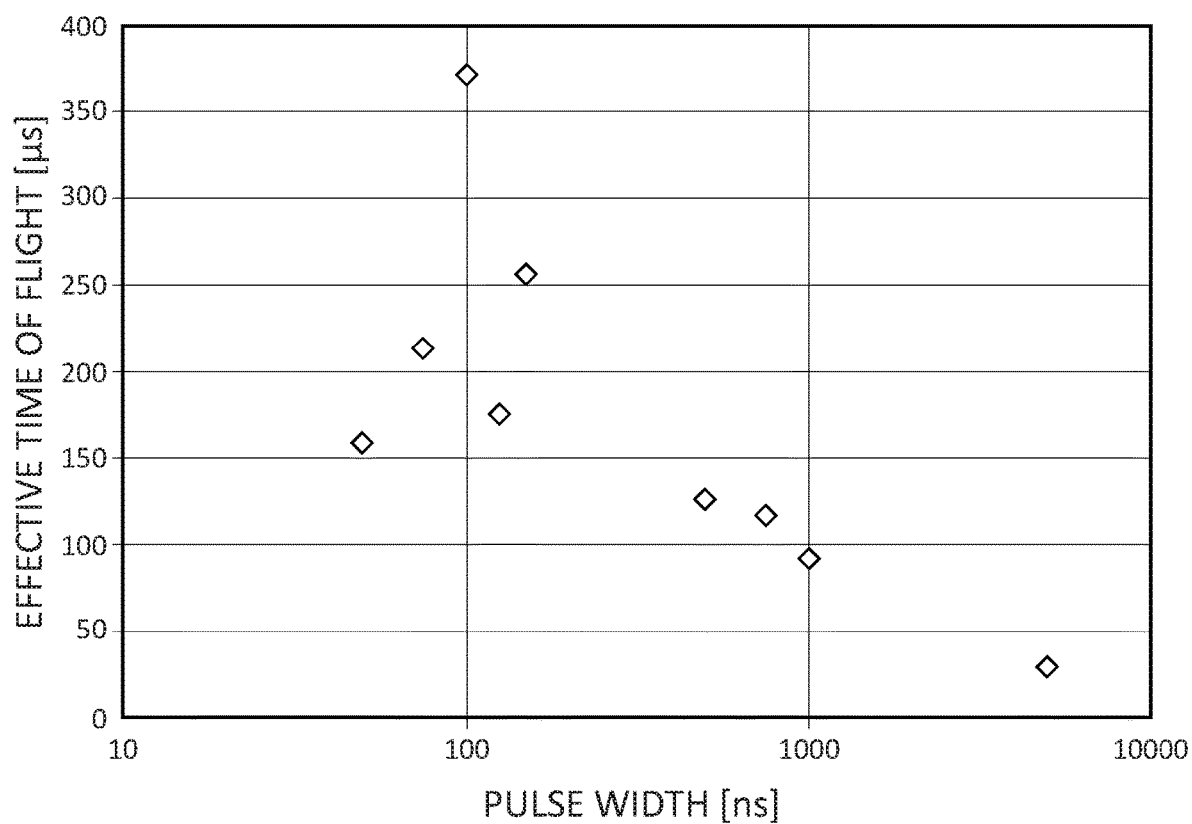
FIG. 52 is a plot showing the $\tau_{eff}$ of the electrons as a function of the electron beam pulse width for an example magnet-free ion pump that includes a mesh shutter at the input aperture.

SIMION® modeling of this new configuration was performed by varying the electron injection time duration and calculating the effective TOF of the electrons. FIG. 52 is a plot showing the $\tau_{\it eff}$ of the electrons as a function of the electron beam pulse width. Results show that for the pump structure of FIG. 51, the effective electron TOF peaks at about 100 ns injection duration for a mesh voltage of 55 V and an inner electrode voltage of 1000 V. Under these conditions, the effective electron TOF is about 370 μs.

Tables 4 and 5 show the results comparing continuous and pulsed electron injection for a 100-ns pulse, respectively. The aperture mesh potential was 55 V and the inner electrode voltage was 1000 V. From these modeling results and the analysis, the pulsed pump configuration appears very promising in further reducing the size, weight, and power of a magnet-free ion pump. Results also show that the pulsed injection pump can operate at lower inner electrode voltages compared to continuous injection, which was the reason for choosing 1000 V in this study.

TABLE 4

| Effective Time of Flight (μs) | Current (μA) | Power (mW) |
|---|---|---|
| 0.5 | 5 | 5 |

TABLE 5

| Current Pulse Width (ns) | Repetition Rate (Hz) | Effective Time of Flight (μs) | Peak Current (μA) | Average Power (mW) |
|---|---|---|---|---|
| 100 | 5000 | 370 | 62 | 0.042 |

Effects of secondary electrons that did not originate from the Spindt cathode on the magnet-free pump were considered. These secondary electrons arise from collisions between various pairings of electrons, neutral molecules or atoms, ions, and pump surfaces. The importance of each pairing was considered except that of neutral molecules or atoms with a pump surface where both are at or near thermal equilibrium during the operation of the pump and are therefore not expected to generate secondary electrons; and that between two instances of the same species where secondary electron generation is not expected because the species is near thermal equilibrium or the Coulomb repulsion between particles of the same polarity inhibits collisions at the operating energies of the pump.

The effect of greatest interest is that of increasing the effective lifetime of an injected electron. For example, if the pumping process initiated by the ionization of a gas molecule by a primary electron results in an average generation of secondary (S) electrons that goes into orbit (where the primary electron is included in the count if it goes into a new orbit after the ionizing collision), then the total electron lifetime $\tau_{total}$ is:

$$\tau_{total} = \tau_0(1 + S + S^2 + S^3 + \ldots) = \frac{\tau_0}{1-S}$$

where $\tau_0$ is the time between the generation of an electron or its injection into the pump and its first collision. Clearly, the closer S is to unity, the longer $\tau_{total}$ becomes, and the fewer primary electrons need to be injected to maintain a given pumping speed.

More interesting is the case in which S is greater than 1 in which the pump generates more orbiting electrons than it loses. Once the ion pump is primed with an initial injection of electrons, the ion pump can continue pumping after the Spindt cathode is turned off if there is an additional mechanism that ensures most generated electrons can have a kinetic energy exceeding the ionization potential of the gas molecule. As discussed below, the process that can give S greater than 1 is impact ionization of a neutral gas atom or molecule colliding with the orbiting electron. This process results in two electrons: the scattered primary electron and an ejected electron from the gas atom or molecule. The kinetic energy of the primary electron is split in the process among the ionization energy of the atom or molecule and the kinetic energy of the two resultant electrons. After a few generations of collisions, none of the electrons will have enough kinetic energy to impact-ionize further.

In an ion pump, electrons generated by impact ionization in the high electric field region of the pump acquire sufficient kinetic energy to ionize other gas atoms or molecules through the E×B drift. This mechanism is absent in the magnet-free ion pump described herein, so secondary electrons must acquire kinetic energy by some other means if the magnet-free pump is to be self-sustaining. Without this mechanism, secondary electrons will increase the pumping speed for a given injection current of primary electrons by crediting the primary electron with the gas atoms or molecules ionized by its progenies.

Energetic electrons striking a surface can generate electron-induced secondary electrons (EISEs), and EISEs can be backscattered. The EISE yield depends on the energy of the incident electrons as well as on the composition of the surface. Secondary electrons typically have energies of 10 eV or less, independent of the primary electron energy above 20 eV. The EISE yield for Ti with 100 eV primary electrons is 0.45 but decreases to 0.25 at 2000 eV. Because the electrons are injected with at most a few tens of eV above the outer electrode potential, the energy of primary electrons striking any pump surface other than the anode is expected to be less than 100 eV. The EISE emission is Lambertian, so most of the electrons emitted from the largest pump surface, the outer electrode, are directed toward the inner electrode when the outer electrode is cylindrical and will not go into a stable orbit. However, some electrons will be emitted in the direction in which they enter a stable orbit.

Primary electrons will strike the inner electrode with energies of approximately $qV_{anode}$, where $V_{anode}$ is the anode voltage (kilovolts). EISEs will have less than 10 eV of energy, which is considerably lower than the inner electrode potential, so they will fall back into the inner electrode. Based on this, a few percent of the primary electrons striking a pump surface will emit an EISE that enters a stable orbit.

The backscattered electron yield, Ti, is 0.12 with 100 eV primary electrons and increases to 0.29 with 2000 eV primary electrons. The backscattered electron yield angular distribution for normal incidence primary electrons is peaked in a conical shell about 55° from normal. Most backscattered electrons are elastically scattered or have lost a few eV of energy due to various losses at surface from, for example, surface phonons and surface plasmons.

For pump surfaces other than the inner electrode, the behavior of backscattered electrons is similar to that of EISEs. The backscattered yield is almost 4× lower, but this is offset by an angular distribution that is more favorable for emitting electrons with enough angular momentum to be in stable orbit. Because the energy of electrons backscattered from the anode is much higher than that of EISEs, a large fraction of the electrons backscattered from the inner electrode will enter a stable orbit. Combined with the backscatter yield of 0.29, a rough estimate is that 5% of the primary electrons striking the inner electrode with scatter back into a stable orbit.

In electron-neutral collisions, an electron collides with a neutral molecule or atom A and ionizes it:

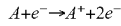

$$A + e^- \rightarrow A^+ + 2e^-$$

Figure 53:
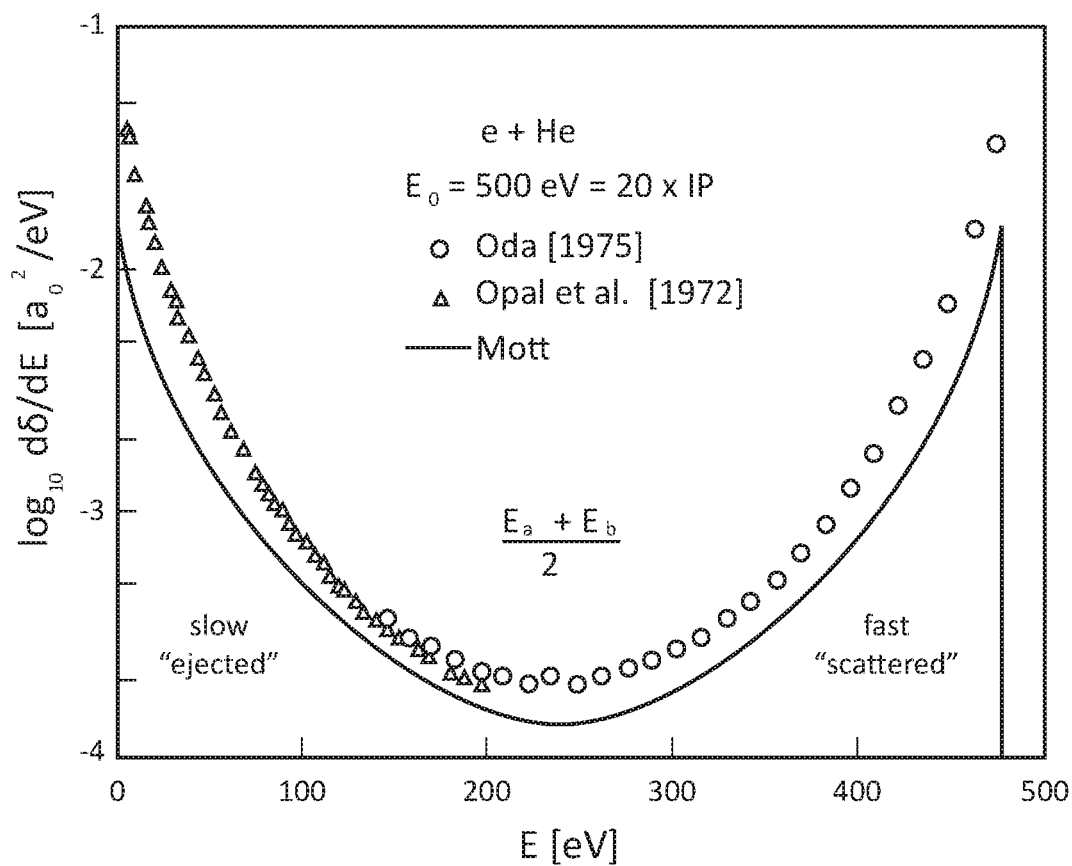
FIG. 53 is a plot that shows that the split in kinetic energy between two generated electrons.
Figure 54:
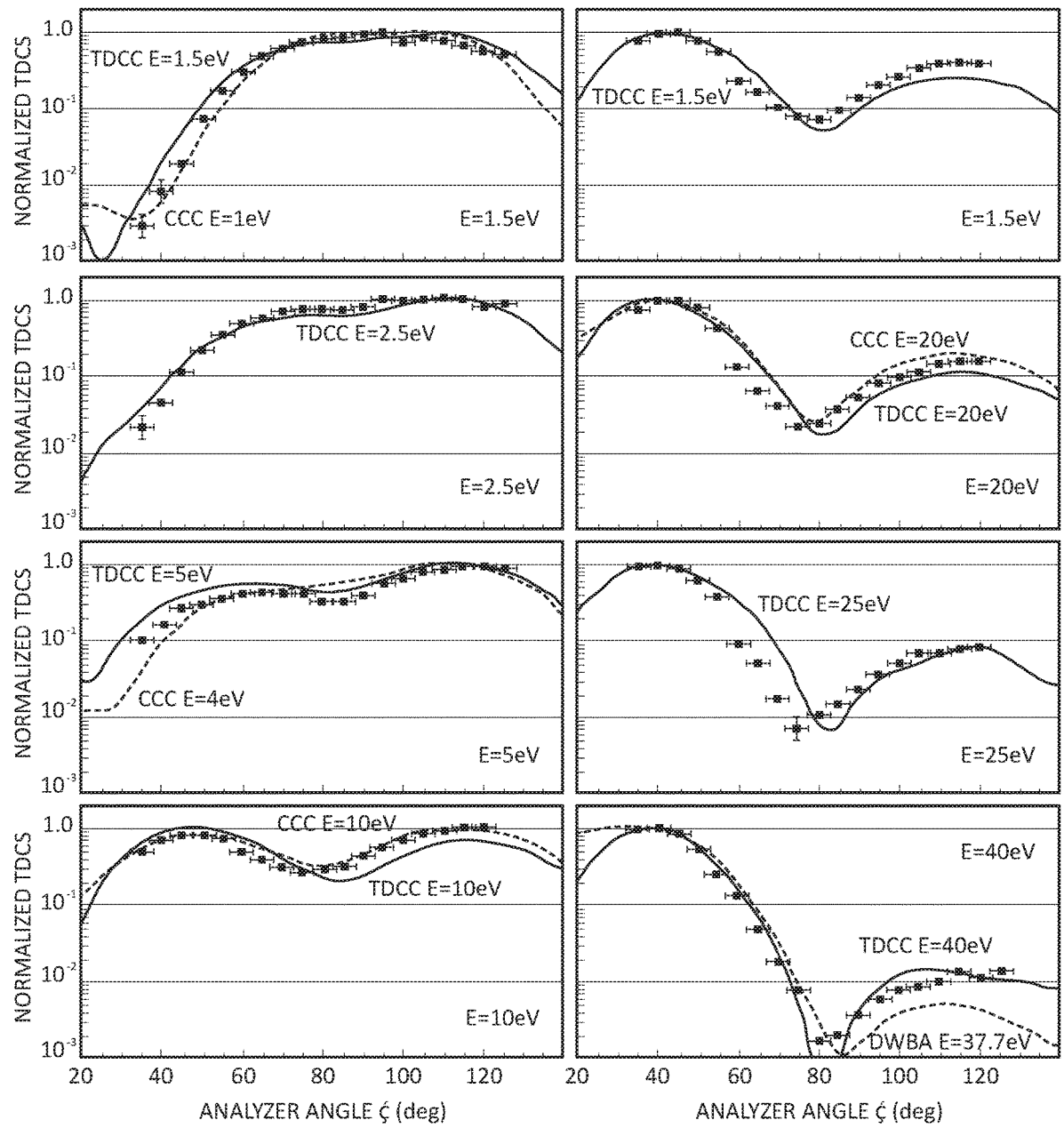
FIG. 54 is a series of plots showing a typical angular distribution in the scattering plane at energy, E, for impact ionization of He by electrons with incident energies ranging from 3 to 40 eV above the ionization of He.

Besides being central to the operation of an ion pump and of the magnet-free ion pump, this process can give S greater than or equal 1, a necessary condition for self-sustainability. Being neutral, A does not interact with the electric field, so its initial energy is kT=25 meV. On the other hand, the primary electron kinetic energy is its injected energy plus qV(r) where V(r) is the electrostatic potential at the point of the collision. Depending on the exact location, the primary electron kinetic energy can be from a few eV to a few hundred eV in the magnet-free ion pumps described herein. The incident energy in the above equation is dominated by the electron energy. Some of this energy is used to ionize A. With the notable exception of light noble gases (He 25 eV, Ne 15 eV), ionization energies range between 7-13 eV. The rest of the energy is split between the kinetic energy of the two generated electrons. FIG. 53 is a plot that shows that the split in kinetic energy between two generated electrons is not close to even. One electron has energy close to the primary electron energy minus the ionization energy, while the other has little energy. FIG. 53 is adapted from H. Ehrhardt, et al., Z. Phys. D, Atoms, Molecules and Clusters, 1, 3 (1986). FIG. 54 is a series of plots showing a typical angular distribution in the scattering plane at energy, E, for impact ionization of He by electrons with incident energies ranging from 3 to 40 eV above the ionization of He. As the secondary electron energy increases, a minimum develops in the distribution near 90° so that most higher energy secondary electrons are scattered in a cone in the forward direction and some are in a cone in the backward direction. FIG. 54 is adapted from K. L. Nixon and A. J. Murray, Phys. Rev. A, 87, 022712 (2013).

These experimental results show that the probability is high for the secondary electrons to have an energy close to the primary electron energy less the ionization potential and to be scattered near the forward direction. The trajectory of this electron will be close to that of the primary electron, so it is likely that it will be in a stable orbit if the primary electron was in a stable orbit when it collided with the neutral molecule or atom. If the higher energy secondary electron is backscattered, its trajectory will be close to the time-reversed version of the primary electron's stable orbit, and the backscattered higher energy secondary electron will also be likely to be in a stable orbit. It is estimated that approximately 0.9 of the higher energy secondary electrons go into stable orbit.

Figure 55:
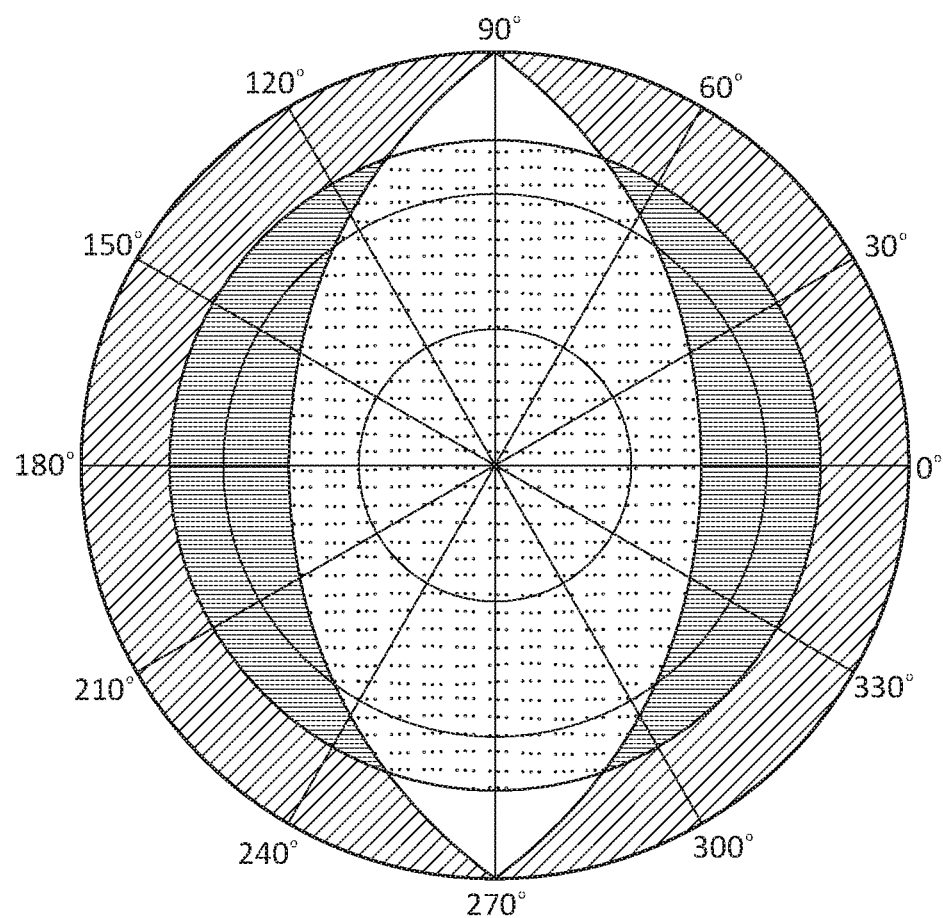
FIG. 55 shows a stability diagram for an electron-neutral collision at a radius ⅔ of the distance from the inner electrode radius toward the outer electrode.

The lower energy secondary electron will not only have a considerably lower energy than the primary electron energy, but its angular distribution will be poorly correlated with the direction of incidence for the primary electron. The emission angle of the low-energy secondary electron can be approximated as uniformly distributed over the entire $4\pi$ steradian. FIG. 55 shows a stability diagram for an electron-neutral collision at a radius ⅔ of the distance from the inner electrode radius toward the outer electrode. The secondary electron energy is 0.1 of the primary electron energy less a 10-eV ionization potential. The dotted stable zone changes only near the top and bottom as the collision location and other parameters are varied. From the area of the stable zone, it is estimated that about 0.2 of the low-energy secondary electrons end up in a stable orbit. This fraction is considerably higher than that for injecting electrons directly into orbit from outside because the secondary electrons are generated inside the pump.

Although it is estimated that about 0.9+0.2=1.1 electrons enter a stable orbit for every ionizing electron-neutral collision that takes an electron out of stable orbit, not every one of these secondary electrons has sufficient energy to ionize when it eventually collides with a neutral. An electron injected from the Spindt cathode and a few generations of progeny will be able to ionize neutrals; however, without a process that can add energy to these electrons, the end of the ionization cascade will be generations of electrons stably orbiting at the bottom of the potential well until they eventually are all scattered into an unstable orbit by an elastic collision with a neutral.

Electron-ion collisions can increase the kinetic energy of an electron in orbit and therefore make low-energy secondary electrons generated by other mechanisms capable of ionizing gas atoms or molecules. There are two collisions of this type, non-ionizing collisions and ionizing collisions. Although the ionizing collision will add another electron to the pump as well transfer energy to electrons, it will occur less frequently than the non-ionizing collisions because of the high energy needed for the second ionization. Only the non-ionizing collisions will be considered.

Non-ionizing collisions involve the collision of singly ionized A+ while the singly ionized A+ is accelerating to the outer electrode. The reaction rates will be proportional to the electron density and to the rate at which A+ is generated, which itself is proportional to the gas density and the electron density, and it will be inversely proportional to the ion transit time to the outer electrode $\tau_{ion}$. So, the rate is expected to be proportional to $[A][e]^2/\tau_{ion}$, where the brackets indicate the density. For this process to be important, the density of orbiting electrons needs to be high.

The ion has a kinetic energy $E_{ion}$ that can range from 0 eV to almost the inner electrode potential. The maximum fraction of this energy that the ion can transfer to an electron is $4m_{elec}/m_{ion}$, where $m_{elec}$ is the electron mass and $m_{ion}$ is the ion mass. Because of the huge mass difference, this fraction is 5×10' for He. About 0.5 eV is transferred to the electron with the $E_{ion}$ of 1000 eV, so about 50 such collisions are required to increase the electron energy by an amount comparable to the He ionization potential. After the collision, the electron may be scattered into an unstable orbit and collide with a pump wall, or it may go into a new stable orbit with the higher energy. A probability of 0.5 for staying in stable orbit after 50 collisions requires a 0.985 probability of staying in stable orbit after each collision. It appears unlikely that electron-ion collisions would be an effective mechanism for energy transfer.

There are two mechanisms for ion-induced secondary electrons from a surface: (1) potential emission where the ion comes close to but does not penetrate the surface, and (2) kinetic emission where the ion enters the surface. For potential emission, an electron from the surface neutralizes an ion near the surface by tunneling to a lower energy unoccupied state in the ion. Energy gained by the electron dropping into a lower energy state is used to excite an Auger electron from the surface. The Auger electron leaves the surface if its energy exceeds the work function. The yield of this process is about 0.1. Since the ion need not penetrate the surface, this can occur at low kinetic energies for the ion and is fairly constant with ion kinetic energy.

Ions with more kinetic energy can enter the solid target and cause kinetic emission through collisions with electrons in the target as well as through secondary processes such as collision of the ion with atoms that then recoil and collides with an electron. Since this process depends on collisions with the incident ion, its yield increases as the atomic number of the incident ion increases with fixed kinetic energy. Also, the yield increases monotonically with ion kinetic energy for a fixed atomic number.

For completeness, the ionizing collision:

$$A^+ + A \rightarrow 2A^+ + e^-$$

will be considered. This collision produces another electron that can go into orbit and another ion that will sputter Ti from the outer electrode, so it can have a large downstream effect on the pumping speed. Because this collision requires the initial generation of the ion and can only occur between the time the ion is generated and the time the ion hits the outer electrode, the rate of this collision is proportional $[A]^2[e]/\tau_{ion}$. With the $[A]^2$ dependence, the process is more important at higher pressures.

Processes that occur most frequently or can potentially be used to improve the pump performance are listed in Table 6.

TABLE 6

| Process | Relative Rate | Yield of Electrons into Stable Orbit | Electron Kinetic Energy at Point of Generation |
|---|---|---|---|
| 1 Electron-induced secondary electrons from outer electrode | High | About 0.01 | 10 eV |
| 2 Backscattered electrons from inner electrode | High | 0.05 | Determined by the anode potential |
| 3 Ionizing electron-neutral collision | Medium | 1.1 | 0 up to the anode potential (1$^{st}$ generation, less for later generations) |
| 4 Ion-induced secondary electrons from outer electrode | Medium | 0.05 | 30 eV |
| 5 Electron-ion collision | Low | About 0.01 | Increases energy of orbiting electron up to 0.5 eV per collision |

Processes 1-4 are electron-generating processes that are essentially parallel pathways. If an electron injected into the pump from the Spindt cathode electron beam source has a probability of $P_s$ of going into a stable orbit, $P_a$ of crashing into the inner electrode, and $P_{oe}$ of crashing into the outer electrode, then S in the equation for total electron lifetime $\tau_{total}$ for the first generation of electrons is:

$$S_1 = P_{oe} Y_1 + P_a Y_2 + P_S (Y_3 + Y_4)$$

where $Y_m$ is the entry in the $m^{th}$ row of the "yield of electrons into stable orbit" column in Table 6. The yield includes the probability that the electron enters a stable orbit, so for all subsequent generations $$S = Y_3 + Y_4$$

For simplicity, $Y_3$ and $Y_4$ account only for electrons in stable orbits. The lost electrons collide with the outer electrode or the inner electrode and have a small probability of generating an electron that enters a stable orbit. Thus, the two above equations give a slight underestimation.

A factor that is more difficult to capture in a simple model is the energy of the electrons in stable orbit. In Process 3, the kinetic energy of the primary electron is split among the ionization potential, the kinetic energy of the two secondary electrons, and the kinetic energy of the ion. After a small number of generations of Process 3, neither of the secondary electrons will have enough energy to ionize the gas molecule or atom it collides with. In this collision, the electron will have a non-zero probability of scattering into a non-stable orbit and crashing into the inner electrode.

This dilution of electron energy can be approximated by truncating the series in the equation for total electron lifetime $\tau_{total}$ after a few terms. Clearly, self-sustaining generation of electrons cannot be achieved under this condition. The main effect of the secondary electron generation is to increase $\tau_{total}$ of an injected electron. Keeping the first three terms and considering the best case in which every injected electron goes into a stable orbit, $\tau_{total}$ is enhanced by a factor of 3.5. If only 10% of the injected electrons are in stable orbit, the enhancement is 20%.

The bottom row of Table 6, electron-ion collision, is the evaluation of the only process that can significantly increase the energy of the electron. Ions created by Process 3 accelerate toward the outer electrode and can have kinetic energies as high as the inner electrode potential, depending on where the ionization collision occurred. Unfortunately, the rate for this process is low because the ion density is lower than the density of the corresponding neutral and because the collision must occur in the short time between the creation of the ion and its collision with the outer electrode. When the collision does occur, the energy transfer is small fraction of the ion energy. It seems unlikely that the electron can remain in stable orbit for the about 50 collisions needed to transfer enough energy for ionization.

Figure 56:
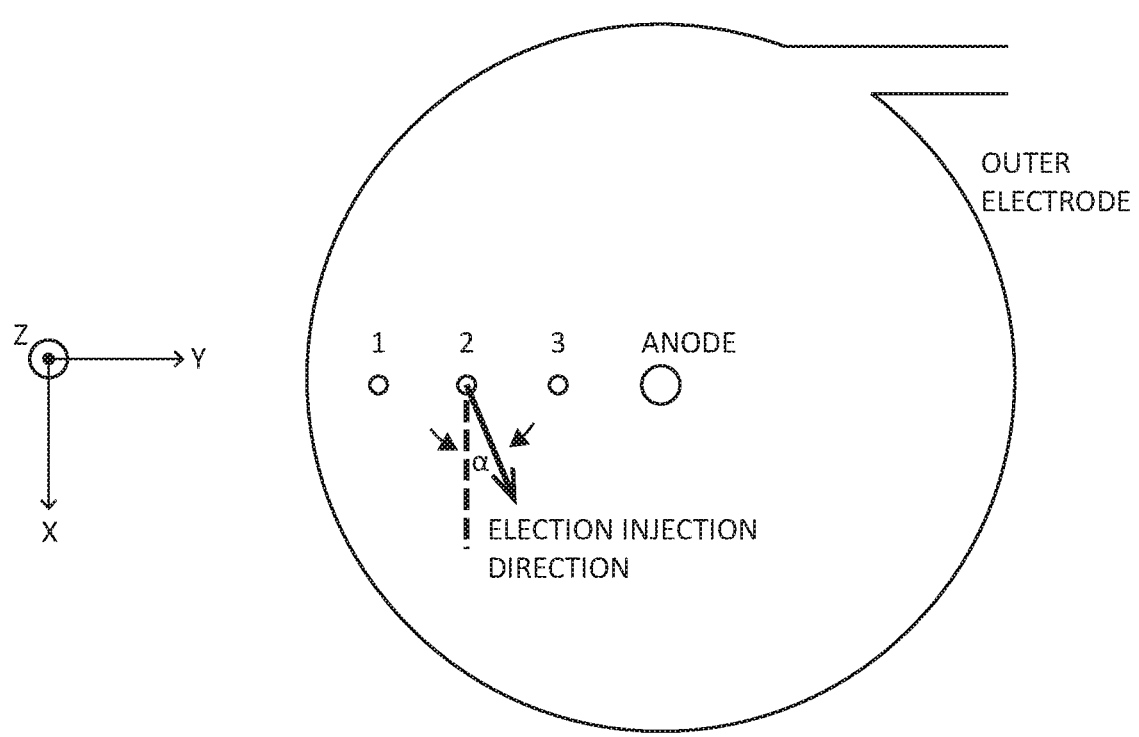
FIG. 56 is a plot showing the calculated TOF of electrons for different starting spatial locations.

Further modeling of electrons generated in Process 3 due to ionizing electron-neutral collision that has the highest yield of injecting electrons into stable orbits was performed using SIMION®. From the modeling the TOF of the electrons for different starting spatial locations was calculated. FIG. 56 is a plot showing the calculated TOF of electrons for different starting spatial locations. The electron direction is specified by the azimuthal angle α in the XY plane and by the elevation angle β. The XY plane (z=0) cuts across the middle of the outer electrode height. Modeling was performed for Cases 1, 2, and 3 with distance from the outer electrode of ¼, ½, and ¾ of the distance between the outer and inner electrodes, respectively. For this Process 3, the kinetic energy of the primary electron is split among the ionization potential, the kinetic energy of the two secondary electrons, and the kinetic energy of the ion. Of the two secondary electrons, the first one has ~90% and the second has ~10% of the remnant energy. For describing the modeling results the ~90% energy electrons were labeled high energy (HE) and the ~10% electrons low energy (LE). The kinetic energy of the primary electron is determined by the spatial location of the ionization process.

Case 1 is directed toward high energy electrons as a function of azimuthal angle at an elevation angle of 0° and as a function of elevation angle at an azimuthal angle of 10°, respectively. For this Case 1, LE electrons do not show stable orbits. Case 2 is directed toward high energy electrons as a function of azimuthal angle at an elevation angle of 0° and as a function of elevation angle at an azimuthal angle of 20°, respectively. Case 2 is also directed towards low energy electrons as a function of azimuthal angle at an elevation angle of 0° and as a function of elevation angle at an azimuthal angle of 10°, respectively. Case 3 is directed toward high energy electrons as a function of azimuthal angle at an elevation angle of 0° and as a function of elevation angle at an azimuthal angle of 10°, respectively. Case 3 is also directed toward low energy electrons as a function of azimuthal angle at an elevation angle of 0° and as a function of elevation angle at an azimuthal angle of 10°, respectively.

Results from modeling Cases 1, 2 and 3 of Process 3 (ionizing electron-neutral collision) indicate that the TOF of the electrons can be up to four orders of magnitude higher that the results obtained from modeling the electrons due purely to external injection. Calculated TOF of the electrons are up to 6 ms. This is a very good indication that these electrons can significantly contribute to the pump performance. This process may explain in part the discrepancy between initial modeling, considering only externally injected electrons, and the experimental results. Even with this very large TOF, these electrons are likely not sufficient to create a self-sustaining process.

Further modeling of electrons generated in Process 4 due to the collision of ions into the outer electrode (ion-induced secondary electrons from outer electrode) was also performed. The energy of the secondary electrons for titanium can be either 9 eV or 24 eV. Case 4 is directed toward 9 eV secondary electrons as a function of the azimuthal angle α and elevation angle β of 0°, 9 eV secondary electrons as a function of the elevation angle β and azimuthal angle α of 60°, 24 eV secondary electrons as a function of the azimuthal angle α and elevation angle β of 0°, and 24 eV secondary electrons as a function of the elevation angle β and azimuthal angle α of 60°.

Results from modeling the TOF of electrons of Process 4 (ion-induced secondary electrons from outer electrode) indicate values in the order of microseconds. From these results we conclude that their contribution to the pump performance is minimal.

Energy may be added to orbiting electrons to increase an effective TOF of the electrons via the secondary electron processes described herein. For example, a cyclotron may be used to add energy to orbiting electrons. Each of the end caps of the ion pump may be split into two D-shaped pieces with a gap between the D-shaped pieces. The gap of the two end caps may be aligned. An RF voltage with a frequency equal to the desired electron rotational frequency may be applied between the D-shaped pieces to create a time-varying azimuthal electric field near the gap that accelerates the electrons.

Figure 57:
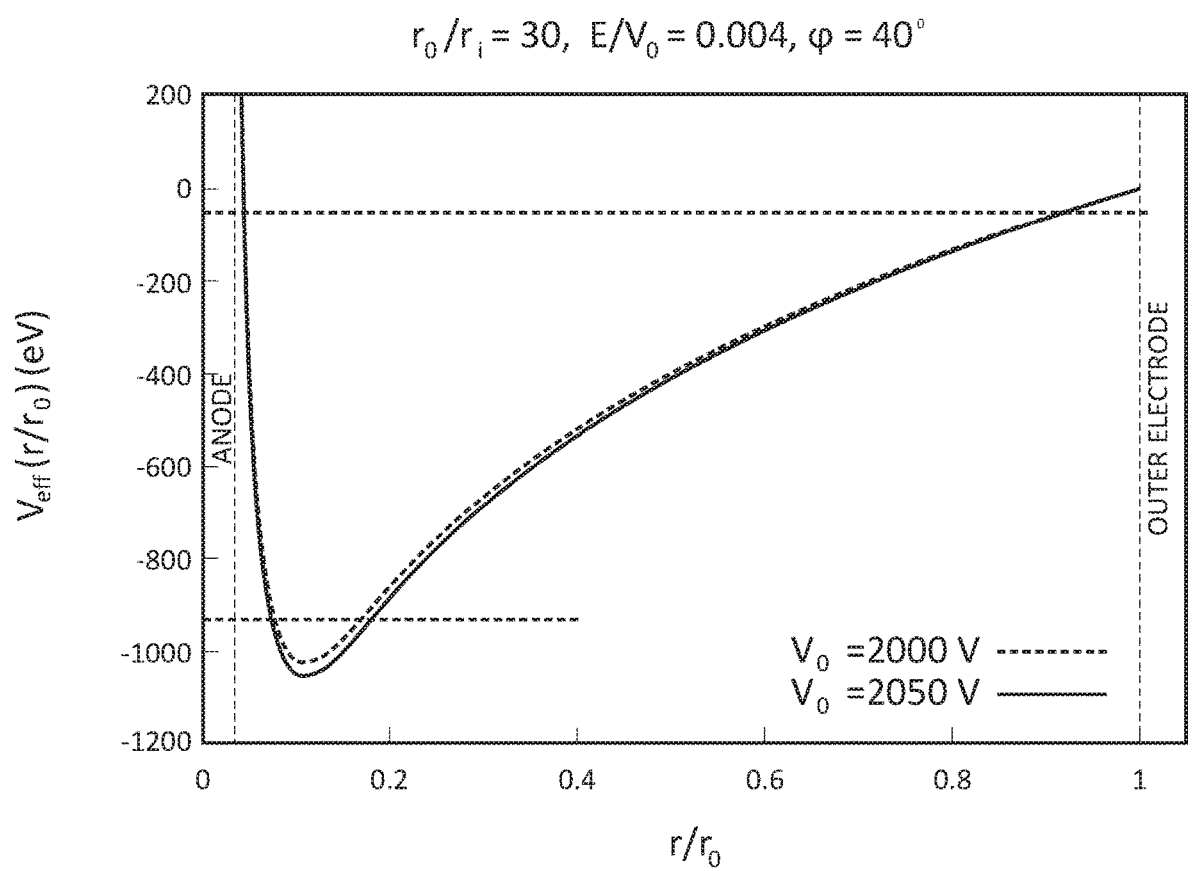
FIG. 57 is a plot of the effective voltage as a function of radial position for an example ion pump in which RF voltage is applied between an inner electrode and an outer electrode.

In another example, the RF voltage may be applied between the inner electrode and the outer electrode to allow a time-varying radial electric field. The frequency of the RF voltage may be equal to the desired radial round-trip frequency. FIG. 57 is a plot of the effective voltage as a function of radial position for an example ion pump in which RF voltage is applied between an inner electrode and an outer electrode. As FIG. 57 shows, the modulation to the inner electrode voltage has the greatest effect on the potential near its minimum. For an electron orbiting at low energy (lower dashed line), the time-varying field interacts strongly with the electron over its full orbit. However, for an electron orbiting at high energy (upper dashed line), the time-varying field interacts strongly with the electron for small fraction of its orbit. The efficiency of adding energy to the electron decreases as the electron energy increases, giving a mechanism that impedes the addition of too much energy.

Figure 58:
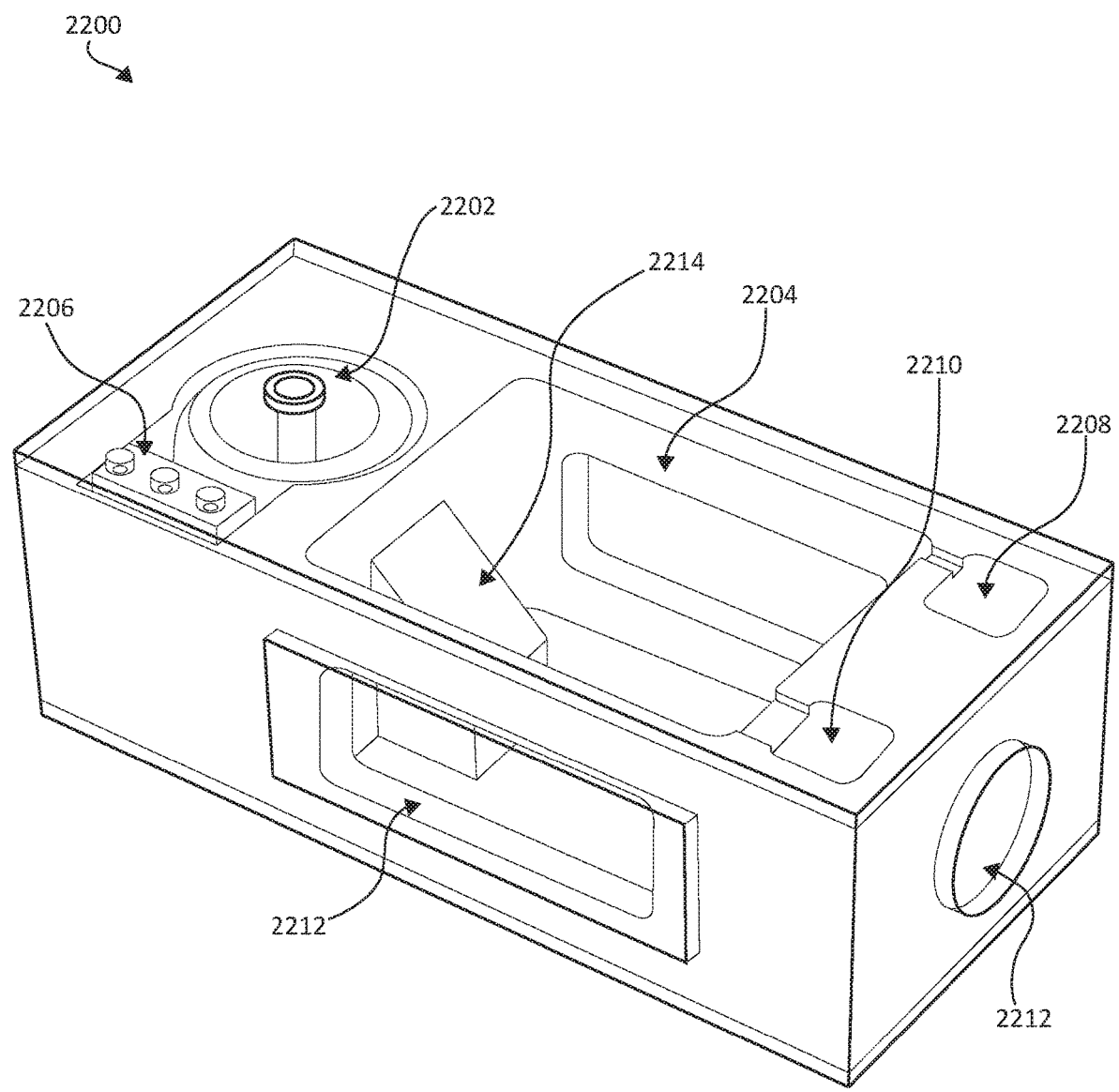
FIG. 58 is a perspective view of an example integrated system that includes a magnet-free ion pump and a cold-atom physics chamber.

In some example, the magnet-free ion pump may be used with a cold-atom physics chamber. For example, FIG. 58 is a perspective view of an example integrated system 2200 that includes a magnet-free ion pump 2202 and a cold-atom physics chamber 2204. Integrated system 2200 also includes a Spindt cold-cathode electron beam source 2206, an alkali source/dispenser 2208, and optional getter 2210, side optical windows 2212, and internal optics 2214, which may include mirrors, waveplates, or the like. By achieving small size, low weight, and low power, magnet-free ion pump 2202 may enable integrated system 2200 to be relatively small and low power. In some examples, integrated system 2200 may be man-portable.

The breakdown voltage in vacuum is determined by Paschen's law, which is a function of the gas pressure (vacuum) and the spacing between the inner electrode and outer electrode. For the proposed operating pressures of less than $10^{-9}$ torr, gaps of tens of microns can be used without the risk of electrical breakdown inside the vacuum for voltages greater than 5 kV, so the magnet-free ion pump millimeter dimensions are not predicted to pose any discharge issues.

In some examples, a high-voltage glass/silicon electrical feedthrough used to conduct current to the inner electrode and/or the cold cathode. The maximum operating voltage of a high-voltage glass/silicon electrical feedthrough is determined by the dielectric breakdown of glass (Pyrex glass) and air, and by the physical dimensions. The dielectric breakdown for Pyrex glass occurs at about $13 \times 10^6$ V/m, and the dielectric breakdown for air occurs at about $3 \times 10^6$ V/m. For planar glass/silicon feedthroughs, the typical spacing gives a maximum operating voltage of about 12 kV, limited by the dielectric breakdown of air. This maximum voltage is about 10× the voltage that may be used for the ion pump described herein.

The electron current orbiting in the ion pump may produce a magnetic field. Basic analysis of a wire loop model shows the magnetic field in the center of the loop is on the order of 10 μG. The magnetic field strength outside this "wire loop," in the position where an atomic sensor would be located, drops off considerably at least as a function of 1/r. Such a small magnetic field strength may affect the field-independent alkali atom hyperfine transition at the nHz level, or about $10^{-20}$ of the hyperfine transition, which is negligible for the sensors envisioned. In addition, the ion pump may be turned off during critical atomic sensor measurements if needed. This should be viewed in comparison to typical sputter-ion pumps, in which kilogauss magnetic fields are utilized from permanent magnets that are, of course, always present.

Various examples have been described. These and other examples are within the scope of the following claims.

What is claimed is:

1. An apparatus, comprising:
an outer electrode defining an inner volume and a central axis extending from a top of the outer electrode to a bottom of the outer electrode, wherein the outer electrode is configured to receive injected electrons through at least one aperture, and wherein the outer electrode comprises a wall defining an inner surface curved toward the central axis near the top and the bottom of the outer electrode; the at least one aperture being disposed on a curved portion of said inner surface curved toward the central axis; and
an inner electrode positioned in the inner volume,
wherein the outer electrode and inner electrode are configured to electrostatically confine the received electrons in orbits around the inner electrode in response to an electric potential between the outer electrode and the inner electrode, and wherein the apparatus does not include a component configured to generate an electron-confining magnetic field.

2. The apparatus of claim 1, wherein the inner electrode is positioned at about the central axis.

3. The apparatus of claim 1, wherein the wall defines the at least one aperture extending through the wall, and wherein the at least one aperture defines a direction of travel of the electrons around the central axis.

4. The apparatus of claim 2, wherein the at least one aperture is positioned proximate at least one of the top or the bottom of the outer electrode, and wherein a diameter of the inner surface at an axial middle of the outer electrode is greater than each of a diameter of the inner surface at the top of the outer electrode and a diameter of the inner surface at the bottom of the outer electrode.

5. The apparatus of claim 3, wherein the inner surface of the outer electrode comprises a getter material configured to adsorb gases from the inner volume, and wherein the inner surface is configured to shield adsorbed gases from ions.

6. The apparatus of claim 1, further comprising a cylindrical grid positioned between the outer electrode and the inner electrode.

7. The apparatus of claim 5, wherein the wall comprises a plurality of fins oriented substantially parallel to the central axis, and wherein each of the plurality of fins is axially rotated in the direction of travel of the electrons.

8. The apparatus of claim 3, wherein the wall is segmented, and further comprising an enclosure outside the outer electrode.

9. The apparatus of claim 8, wherein the inner surface of the outer electrode comprises a first getter material, and wherein an inner surface of the enclosure comprises a second getter material, different from the first getter material.

10. The apparatus of claim 3, wherein a shape of the inner surface of the outer electrode is generally cylindrical, barrel-shaped, egg-shaped, or spherical, and wherein the shape of the inner surface of the outer electrode is configured to improve operation of the apparatus.

11. The apparatus of claim 2, further comprising:
a top end cap proximate to the top of the outer electrode; and
a bottom end cap proximate to the bottom of the outer electrode,
wherein the top end cap and bottom end cap are configured to receive a negative potential, and
wherein each of the top end cap and the bottom end cap is axially spaced from the outer electrode to permit background gasses from outside the ion pump to enter into the inner volume.

12. The apparatus of claim 1, wherein the apparatus has an outer volume of less than 30 cubic centimeters.

13. A system, comprising:
an electron source configured to inject electrons;
an electrode assembly coupled to the electron source, wherein the electrode assembly comprises:
an outer electrode defining an inner volume and a central axis extending from a top of the outer electrode to a bottom of the outer electrode, wherein the outer electrode is configured to receive injected electrons through at least one aperture, and wherein the outer electrode comprises a wall defining an inner surface curved toward the central axis near the top and the bottom of the outer electrode; the at least one aperture being disposed on a curved portion of said inner surface curved toward the central axis; and
an inner electrode positioned in the inner volume,
wherein the electrode assembly is configured to electrostatically confine the electrons within an internal volume defined by the electrode assembly,
wherein the outer electrode and inner electrode are configured to electrostatically confine the received electrons in orbits around the inner electrode in response to an electric potential between the outer electrode and the inner electrode,
wherein the electron source is coupled to the electrode assembly and configured to inject the electrons through the at least one aperture, and
wherein the system does not include a component configured to generate an electron-confining magnetic field.

14. The system of claim 13, wherein the electron source is a Spindt cathode electron beam source, and wherein the Spindt cathode electron beam source is configured to inject the electrons at a divergence half-angle less than 25 degrees Celsius (° C.) horizontally.

15. The system of claim 13, further comprising a controller configured to:
control the electric potential between the outer electrode and the inner electrode; and
control an electron energy of the electron source.

16. The system of claim 13, wherein the outer electrode is grounded.

17. The system of claim 15, wherein the controller is configured to control a power source coupled to the inner electrode to produce the electric potential between the inner electrode and the outer electrode.

18. The system of claim 17, wherein the electric potential is configured to produce ion energies in the inner volume between 500 electron volts (eV) and 3 kiloelectron volts (keV).

19. The system of claim 15, wherein the controller is further configured to control a second power source to change an injection energy of the electrons.

20. The system of claim 15,
wherein the at least one aperture includes a mesh over an inner opening of the at least one aperture, and
wherein the controller is further configured to:
control the electron source to inject the electrons through pulsations; and
apply a voltage to the mesh based on the pulsations.

21. The system of claim 13, wherein the injected electrons have an effective time of flight of greater than 0.1 microseconds (µs).

22. The system of claim 13, further comprising a sealed housing configured to contain the outer electrode, the inner electrode, and the electron source, wherein the sealed housing defines a sensor, and wherein the sensor further comprises one or more chambers fluidically coupled to the inner volume of the cylindrical outer electrode.

23. The system of claim 22, wherein the chamber is a cold atom physics chamber.

24. The system of claim 22, wherein the sensor further comprises an alkali source.

25. The system of claim 22, wherein the sensor further comprises a getter.

26. The system of claim 22, wherein the sensor has a volume less than 25 cubic centimeters.

27. The system of claim 22, wherein the sensor is part of at least one of an atomic clock, a gyroscope, an accelerometer, a navigation unit, or an ultra-low vacuum sensor.

28. A method, comprising:
receiving, by an ion pump and from an electron source, electrons through at least one aperture, wherein the ion pump comprises:
an outer electrode defining an inner volume and configured to receive injected electrons through the at least one aperture, wherein the outer electrode comprises a wall defining an inner surface, and wherein a diameter of the inner surface at an axial middle of the outer electrode is greater than each of a diameter of the inner surface at a top of the outer electrode and a diameter of the inner surface at a bottom of the outer electrode; the at least one aperture being disposed on a curved portion of said inner surface curved toward the central axis; and
an inner electrode positioned in the inner volume; and
creating, by the ion pump, an electric potential between the outer electrode and the inner electrode,
wherein the electric potential is configured to confine the electrons in orbits around the inner electrode, and
wherein the ion pump does not include a component configured to generate an electron-confining magnetic field.

29. The method of claim 28, further comprising controlling an electron energy of the electron source.

30. The method of claim 28, further comprising controlling a power source coupled to the inner electrode to create the electric potential between the outer electrode and the inner electrode.

31. The method of claim 28, further comprising controlling a second power source to change an injection energy of the electrons.

32. The method of claim 28, wherein the at least one aperture includes a mesh over an inner opening of the at least one aperture, and wherein the method further comprises:
controlling the electron source to inject the electrons through pulsations; and
applying a voltage to the mesh based on the pulsations.

* * * * *